United States Patent
Suzuki

(10) Patent No.: US 10,513,052 B2
(45) Date of Patent: Dec. 24, 2019

(54) METHOD FOR MANUFACTURING MOLDED ARTICLE AND DEVICE FOR MANUFACTURING MOLDED ARTICLE

(71) Applicant: Yasuhiro Suzuki, Suzuka (JP)

(72) Inventor: Yasuhiro Suzuki, Suzuka (JP)

( * ) Notice: Subject to any disclaimer, the term of this patent is extended or adjusted under 35 U.S.C. 154(b) by 293 days.

(21) Appl. No.: 15/306,015

(22) PCT Filed: Apr. 24, 2015

(86) PCT No.: PCT/JP2015/062611
§ 371 (c)(1),
(2) Date: Oct. 21, 2016

(87) PCT Pub. No.: WO2015/174255
PCT Pub. Date: Nov. 19, 2015

(65) Prior Publication Data
US 2017/0043503 A1    Feb. 16, 2017

(30) Foreign Application Priority Data

May 11, 2014    (JP) .................................. 2014-098214

(51) Int. Cl.
*B29B 7/94*    (2006.01)
*B29C 48/00*    (2019.01)
(Continued)

(52) U.S. Cl.
CPC ................. *B29B 7/94* (2013.01); *B29B 7/72* (2013.01); *B29B 7/7404* (2013.01); *B29B 7/823* (2013.01);
(Continued)

(58) Field of Classification Search
CPC ...................................................... B29B 7/94
See application file for complete search history.

(56) References Cited

U.S. PATENT DOCUMENTS 3,808,300 A * 4/1974 Miyamoto .......... B29C 44/3442
264/51
6,007,236 A * 12/1999 Maguire ................... B01F 3/18
366/141
(Continued)

FOREIGN PATENT DOCUMENTS

CH          679564 A       3/1992
JP       H05-017516 A      1/1993
(Continued)

OTHER PUBLICATIONS

Extended European Search Report dated Dec. 18, 2017.
(Continued)

*Primary Examiner* — Joseph A Miller, Jr.
(74) *Attorney, Agent, or Firm* — Yokoi & Co., U.S.A.; Toshiyuki Yokoi

(57) ABSTRACT

[Problem] The present invention relates to a manufacturing method for obtaining a molded article having an expanded layer in the molded article, wherein an expanding agent and device used to manufacture a resin having expansion properties, and a means for increasing expansion ratio are provided.

[Solution] In the present invention, an expanding agent placed in a heating cylinder of a molding machine is configured as a liquid, the volume of the expanding agent is controlled, and the expanding agent is injected into a molten resin in the heating cylinder of the molding machine. The volume of the injected expanding agent can thereby be accurately measured each time. When a low-boiling liquid such as water, an alcohol, or an ether is used as the injected expanding agent, all of the liquid is vaporized by the temperature of the heating cylinder of the molding machine, and no residue thereof is therefore left in the molded article. When sodium bicarbonate water is used as the injected expanding agent, solvent water vaporizes and water vapor
(Continued)

also becomes expandable gas, which is less expensive than using sodium bicarbonate as the expanding agent for a master batch using the resin that is to be molded.

8 Claims, 27 Drawing Sheets

(51) Int. Cl.

| | |
|---|---|
| *B29C 39/24* | (2006.01) |
| *B29B 13/02* | (2006.01) |
| *B29C 39/00* | (2006.01) |
| *B29C 45/00* | (2006.01) |
| *B29B 7/74* | (2006.01) |
| *B29C 45/18* | (2006.01) |
| *B29C 45/17* | (2006.01) |
| *B29C 45/34* | (2006.01) |
| *B29C 44/34* | (2006.01) |
| *B29C 48/29* | (2019.01) |
| *B29B 7/72* | (2006.01) |
| *B29B 7/82* | (2006.01) |
| *B29B 7/88* | (2006.01) |
| *B29K 105/00* | (2006.01) |
| *B29L 31/44* | (2006.01) |
| *B29L 31/34* | (2006.01) |
| *B29K 9/06* | (2006.01) |
| *B29K 23/00* | (2006.01) |
| *B29K 25/00* | (2006.01) |
| *B29K 27/06* | (2006.01) |
| *B29K 33/00* | (2006.01) |
| *B29K 67/00* | (2006.01) |
| *B29K 77/00* | (2006.01) |
| *B29C 44/40* | (2006.01) |
| *B29C 44/42* | (2006.01) |
| *B29C 44/50* | (2006.01) |
| *B29K 105/26* | (2006.01) |
| *B29K 101/10* | (2006.01) |
| *B29K 105/04* | (2006.01) |
| *B29L 31/30* | (2006.01) |

(52) U.S. Cl.
CPC .............. *B29B 7/826* (2013.01); *B29B 7/88* (2013.01); *B29B 13/02* (2013.01); *B29C 39/003* (2013.01); *B29C 39/24* (2013.01); *B29C 44/3446* (2013.01); *B29C 45/0001* (2013.01); *B29C 45/174* (2013.01); *B29C 45/1816* (2013.01); *B29C 45/34* (2013.01); *B29C 48/0012* (2019.02); *B29C 48/022* (2019.02); *B29C 48/29* (2019.02); *B29B 7/82* (2013.01); *B29C 44/40* (2013.01); *B29C 44/42* (2013.01); *B29C 44/50* (2013.01); *B29C 2045/1722* (2013.01); *B29K 2009/06* (2013.01); *B29K 2023/06* (2013.01); *B29K 2023/12* (2013.01); *B29K 2025/06* (2013.01); *B29K 2027/06* (2013.01); *B29K 2033/12* (2013.01); *B29K 2067/003* (2013.01); *B29K 2067/006* (2013.01); *B29K 2077/00* (2013.01); *B29K 2101/10* (2013.01); *B29K 2105/0005* (2013.01); *B29K 2105/0067* (2013.01); *B29K 2105/0088* (2013.01); *B29K 2105/041* (2013.01); *B29K 2105/26* (2013.01); *B29L 2031/30* (2013.01); *B29L 2031/34* (2013.01); *B29L 2031/44* (2013.01)

(56) References Cited

U.S. PATENT DOCUMENTS

| | | | |
|---|---|---|---|
| 6,220,745 B1 * | 4/2001 | Kobayashi | B29C 48/92 366/83 |
| 2004/0012107 A1 | 1/2004 | Xu et al. | |
| 2005/0143479 A1 | 6/2005 | Xu et al. | |
| 2005/0280175 A1 * | 12/2005 | Tachauer | B29C 31/06 264/167 |
| 2010/0086636 A1 | 4/2010 | Xu et al. | |
| 2011/0274900 A1 * | 11/2011 | Megally | B29C 44/1228 428/215 |

FOREIGN PATENT DOCUMENTS

| | | |
|---|---|---|
| JP | H08-103919 A | 4/1996 |
| JP | 2001-216029 A | 8/2001 |
| JP | 2002-337186 A | 11/2002 |
| JP | 2004-044650 A | 2/2004 |
| JP | 2004-050566 A | 2/2004 |
| JP | 2005-029749 A | 2/2005 |
| JP | 2005-125767 A | 5/2005 |
| JP | 2005-532939 A | 11/2005 |
| KR | 1020040067694 A | 7/2004 |

OTHER PUBLICATIONS

International Search Report for PCT/JP2015/062611 dated Aug. 4, 2015.

PCT written opinion dated Aug. 4, 2015.

\* cited by examiner

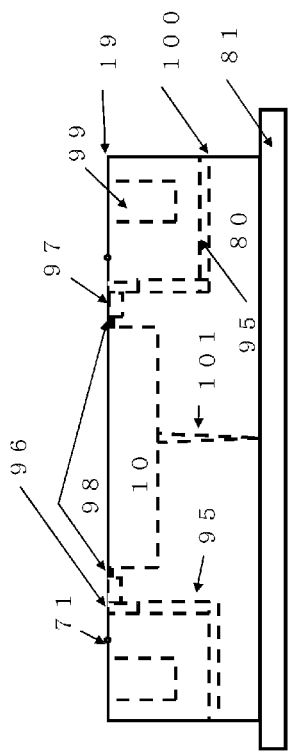
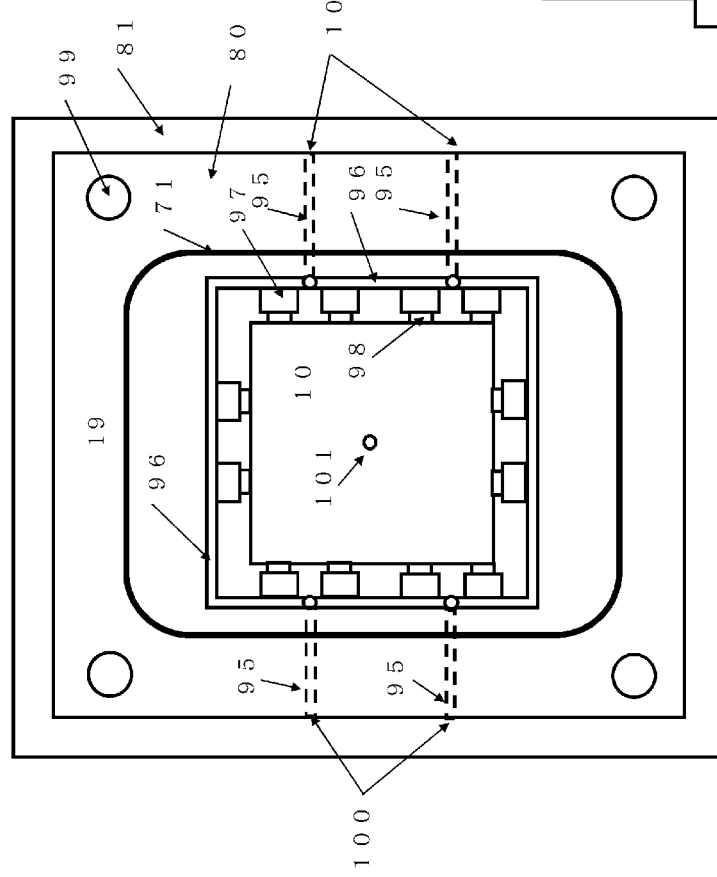

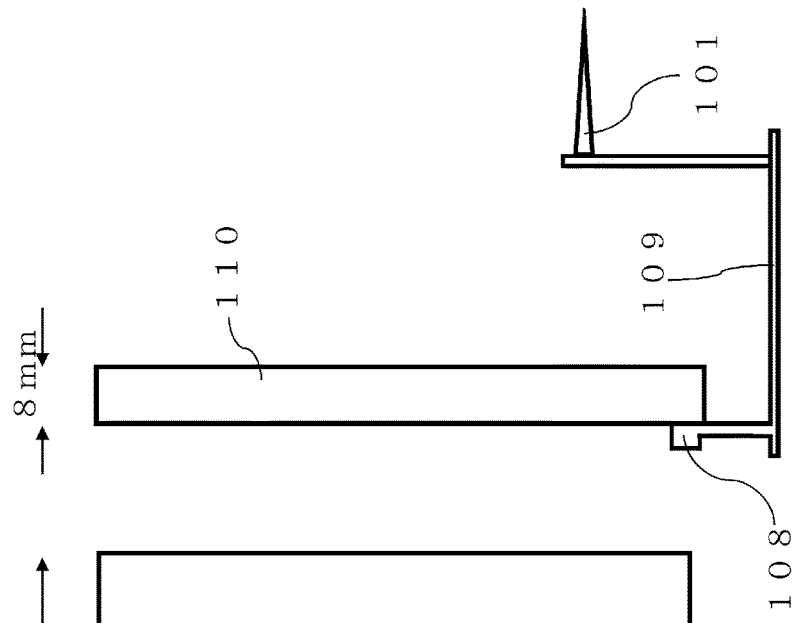
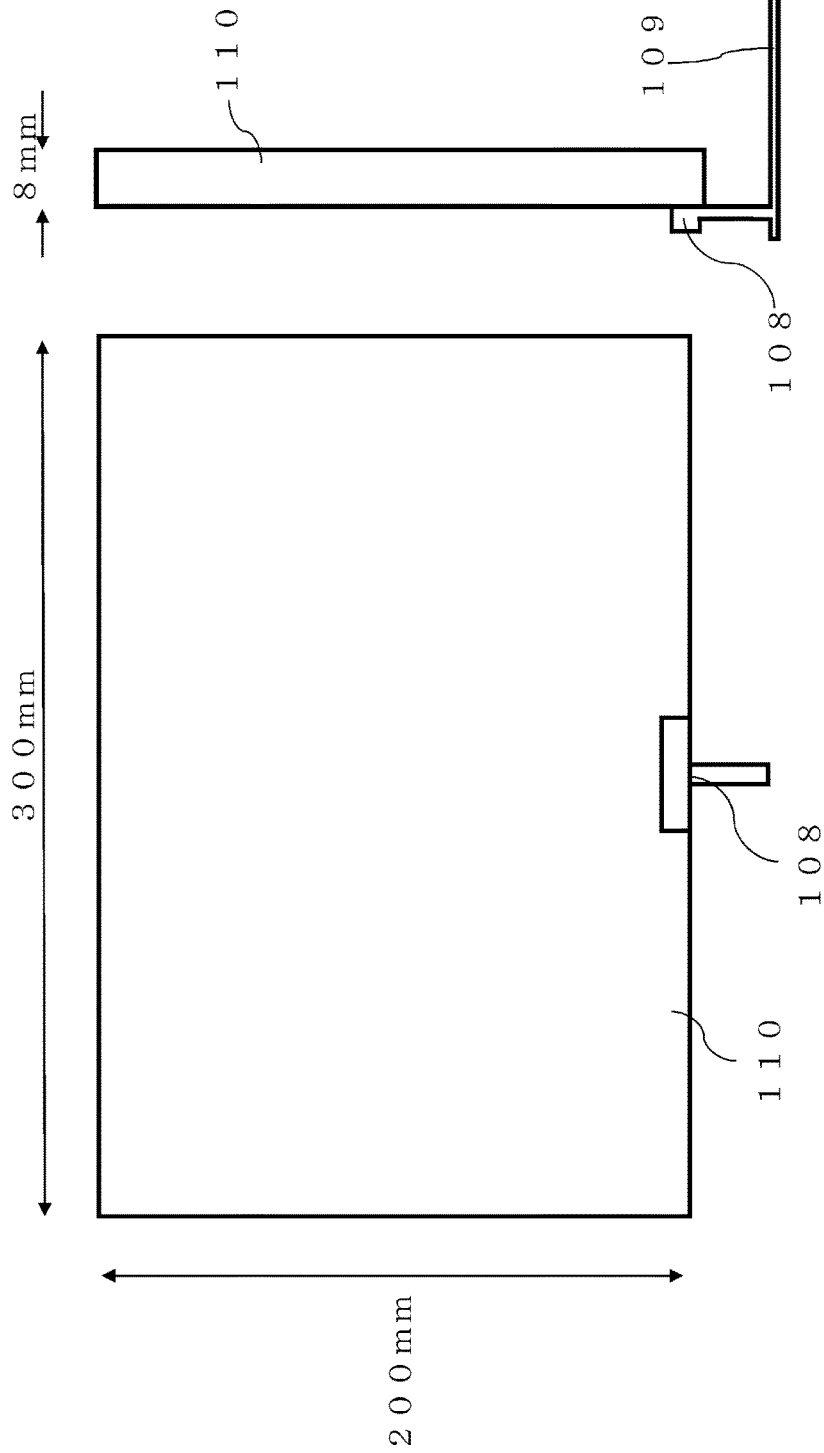
Fig. 27A
Fig. 27B

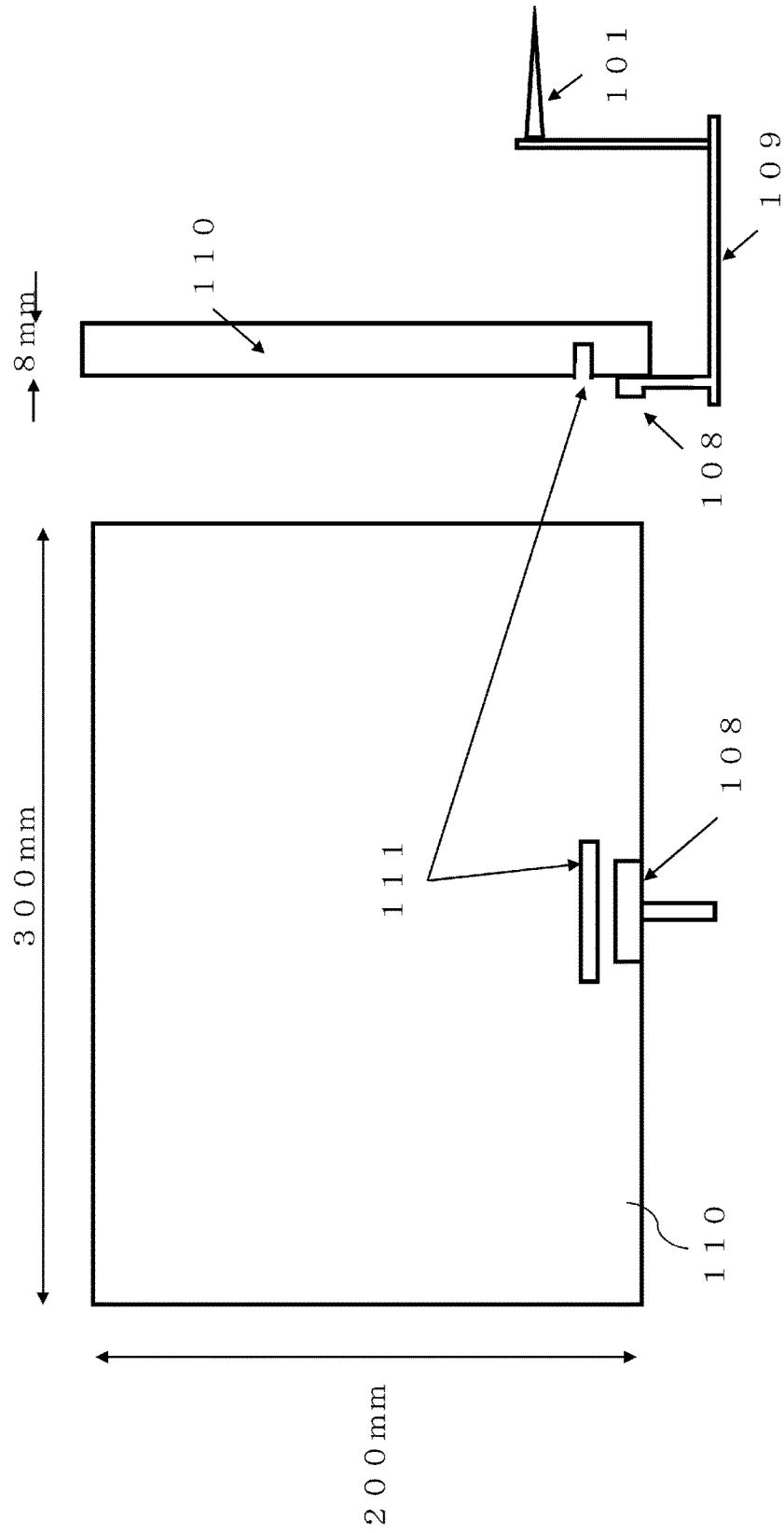

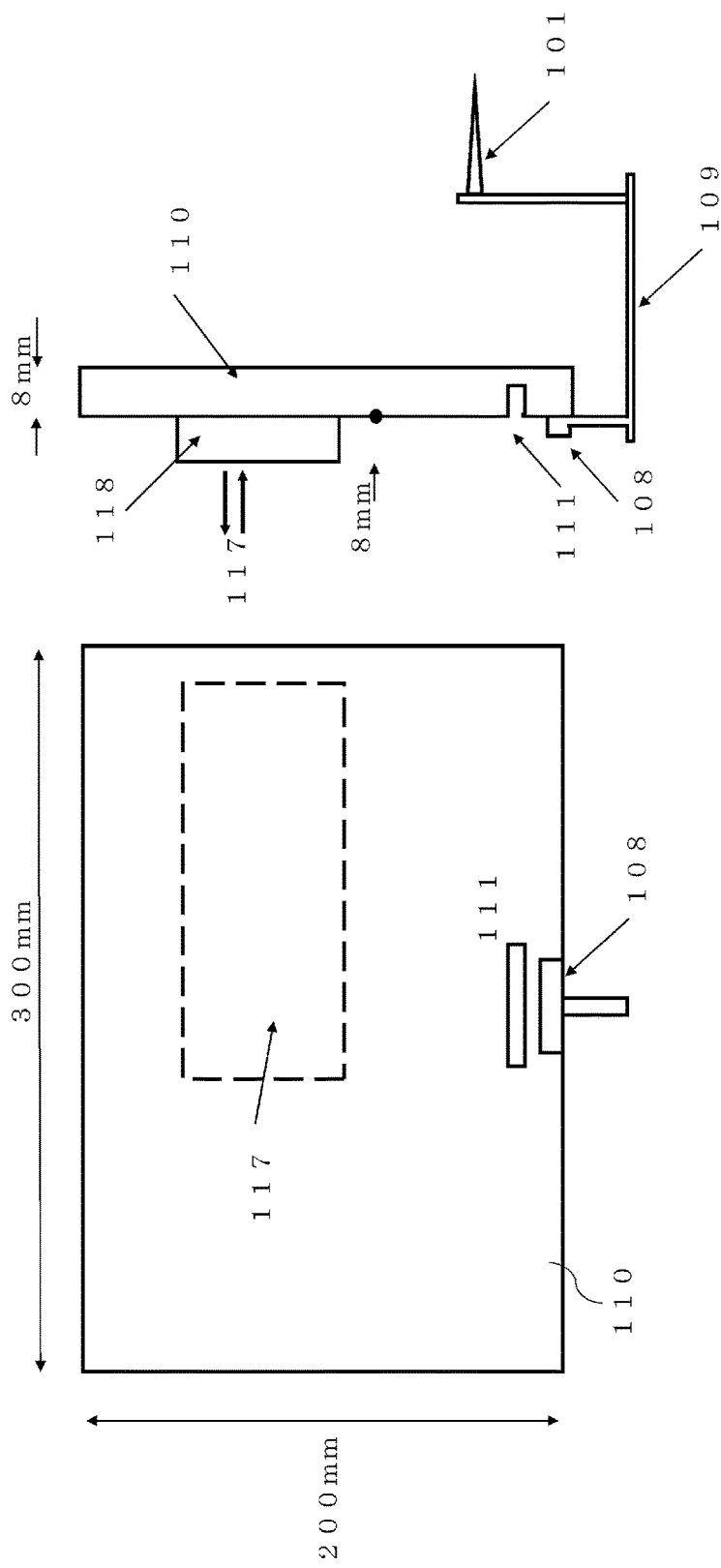

METHOD FOR MANUFACTURING MOLDED ARTICLE AND DEVICE FOR MANUFACTURING MOLDED ARTICLE

TECHNICAL FIELD

The present invention relates to the method for manufacturing molded article and to the device of manufacturing molded article.

BACKGROUND ART

Patent document 1 describes the method for foam injection molding comprising firstly a step of a short-shot injection (leaving a void) of injection material composed of a resin and an expanding agent into the mold cavity with an installed insert, and secondly a step of filling the void by the expanding action due to foaming of expanding agent, wherein the resin is composed of a base resin and a low-molecular-weight resin which is of the same type as the base resin but has a molecular weight lower than that of the base resin.

PRIOR ART DOCUMENTS

Patent Documents

Patent document 1: Japanese published unexamined application No. H08-103919

DISCLOSURE OF THE INVENTION

Problems to be Solved by the Invention

The object of the invention is to stabilize the quality of foam-molded articles.

Means for Solving Problem

The manufacturing method according to the claim 1 is characterized by the fact that it comprises: a step of injecting a predetermined volume of a liquid into a molten resin, the liquid having a vaporization temperature lower than a temperature of the molten resin in a heating cylinder; a vaporization step of vaporizing the liquid injected into the molten resin in the heating cylinder; and a step of injecting the molten resin containing the vaporized liquid into a mold cavity, or pouring the molten resin containing the vaporized liquid into a cast, or extruding the molten resin containing the vaporized liquid through a die.

The manufacturing method according to the claim 2 is characterized by the facts that: the liquid of claim 1 contains a substance having a pyrolysis temperature lower than the temperature of the molten resin in the heating cylinder, and in the vaporization step, the liquid and the substance injected into the molten resin are vaporized in the heating cylinder.

The manufacturing method according to the claim 3 is characterized by the fact that it comprises: a step of injecting separately a predetermined volume of a first liquid and a predetermined volume of a second liquid into a molten resin in a heating cylinder, the first liquid containing a hydrogen carbonate or a carbonate, the second liquid containing an organic acid; a step of causing a reaction in the heating cylinder between the first liquid and the second liquid both injected into the molten resin to generate a gas; and a step of injecting the molten resin containing the gas into a mold cavity, or pouring the molten resin containing the gas into a cast, or extruding the molten resin containing the gas through a die.

The manufacturing method according to the claim 4 is characterized by the fact that it comprises: a step of injecting a predetermined volume of a liquid into a vaporizer, the liquid having a vaporization temperature lower than a temperature of a molten resin in a heating cylinder; a vaporization step of vaporizing the liquid injected into the vaporizer in the vaporizer; a step of injecting the vaporized liquid into the molten resin in the heating cylinder; and a step of injecting the molten resin containing the vaporized liquid into a mold cavity, or pouring the molten resin containing the vaporized liquid into a cast, or extruding the molten resin containing the vaporized liquid through a die.

The manufacturing method according to the claim 5 is characterized by the fact that: the liquid of claim 4 contains a substance having a pyrolysis temperature lower than a temperature of the vaporizer; and in vaporization step, the liquid and the substance which are injected into the vaporizer are vaporized in the vaporizer.

The manufacturing method according to the claim 6 is characterized by the fact that it comprises: a step of injecting separately a predetermined volume of a first liquid and a predetermined volume of a second liquid into a vaporizer, the first liquid containing a hydrogen carbonate or a carbonate, the second liquid containing an organic acid; a step of causing a reaction in the vaporizer between the first liquid and the second liquid both injected into the vaporizer to generate a gas; a step of injecting the gas into a molten resin in a heating cylinder; and a step of injecting the molten resin containing the gas into a mold cavity, or pouring the molten resin containing the gas into a cast, or extruding the molten resin containing the gas through a die.

The device for manufacturing molded article according to the claim 7 is characterized by the fact that it comprises: a liquid injection device for injecting a predetermined volume of a liquid into a molten resin, the liquid having a vaporization temperature lower than a temperature of the molten resin in a heating cylinder; and an injection device for injecting the molten resin containing a gas into a mold cavity, or a casting device for pouring the molten resin containing the gas into a cast, or an extruding device for extruding the molten resin containing the gas through a die, the gas being generated in the heating cylinder by vaporization of the liquid injected into the molten resin.

The device for manufacturing molded article according to the claim 8 is characterized by the fact that the liquid of claim 7 contains a substance having a pyrolysis temperature lower than the temperature of the molten resin in the heating cylinder; and the injection device, the casting device or the extruding device vaporizes the liquid and the substance in the heating cylinder.

The device for manufacturing molded article according to the claim 9 is characterized by the fact that it comprises: a liquid injection device for injecting separately a predetermined volume of a first liquid and a predetermined volume of a second liquid into a molten resin in a heating cylinder, the first liquid containing a hydrogen carbonate or a carbonate, the second liquid containing an organic acid; and an injection device for causing a reaction in the heating cylinder between the first liquid and the second liquid both injected into the molten resin to generate a gas and injecting the molten resin containing the gas into a mold cavity, or a casting device for causing the reaction in the heating cylinder between the first liquid and the second liquid both injected into the molten resin to generate a gas and pouring the molten resin containing the gas into a cast, or an extruding device for causing the reaction in the heating cylinder between the first liquid and the second liquid both injected into the molten resin to generate a gas and extruding the molten resin containing the gas through a die.

The device for manufacturing molded article according to the claim 10 is characterized by the fact that it comprises: a vaporizer for vaporizing a liquid; a first liquid injection device for injecting a predetermined volume of a liquid into the vaporizer, the liquid having a vaporization temperature lower than a temperature of a molten resin in a heating cylinder; a second liquid injection device for injecting the vaporized liquid in the vaporizer into the heating cylinder; and an injection device for injecting the molten resin containing the vaporized liquid into a mold cavity, or a casting device for pouring the molten resin containing the vaporized liquid into a cast, or an extruding device for extruding the molten resin containing the vaporized liquid through a die, the vaporized liquid being injected into the molten resin by the second injection device.

The device for manufacturing molded article according to the claim 11 is characterized by the fact that the liquid of claim 10 contains a substance having a pyrolysis temperature lower than the temperature of the molten resin in the heating cylinder, and the vaporizer vaporizes the liquid and the substance.

The device for manufacturing molded article according to the claim 12 is characterized by the fact that it comprises: a vaporizer for generating a gas by causing a reaction between a first liquid containing a hydrogen carbonate or a carbonate and a second liquid containing an organic acid; a first liquid injection device for injecting separately a predetermined volume of the first liquid and a predetermined volume of the second liquid into the vaporizer; a second liquid injection device for injecting the gas in the vaporizer into a molten resin in a heating cylinder; and an injection device for injecting the molten resin containing the gas into a mold cavity, or a casting device for pouring the molten resin containing the gas into a cast, or an extruding device for extruding the molten resin containing the gas through a die.

Effects of the Invention

The methods for manufacturing molded articles according to the claims 1, 2 and 3 are able to stabilize the quality of foam-molded articles in comparison with the case where a predetermined volume of liquid is not injected into the molten resin.

The method for manufacturing molded articles according to the claims 4, 5 and 6 is able to stabilize the quality of foam-molded articles in comparison with the case where a predetermined volume of liquid is not injected into the device for generating gas.

The device for manufacturing molded articles according to the claims 7, 8 and 9 is able to stabilize the quality of foam-molded articles in comparison with the case where a predetermined volume of liquid is not injected into the molten resin.

The device for manufacturing molded articles according to the claims 10, 11 and 12 is able to stabilize the quality of foam-molded articles in comparison with the case where a predetermined volume of liquid is not injected into the device for generating gas.

BRIEF DESCRIPTION OF THE DRAWINGS

FIG. 25A is a plan view of the mold. FIG. 25B is a lateral view of the mold in FIG. 25A.

FIG. 27A is a plan view of a molded article. FIG. 27B is a lateral view of the molded article in FIG. 27A.

FIG. 28A is a plan view of a molded article. FIG. 28B is a lateral view of the molded article in FIG. 28A.

FIG. 30A is a plan view of a molded article. FIG. 30B is a lateral view of the molded article in FIG. 30A.

MODES FOR CARRYING OUT THE INVENTION

First of all, the terms employed in the present invention shall be defined.

"Mold cavity" signifies a space or a volume to be filled with at least either a resin provided with foaming properties or a resin without foaming properties in injection molding, block molding or cast molding.

Furthermore, "inside of mold cavity" or "inside of cavity" signifies the interior part, space or volume of the mold cavity.

"Injection" signifies an action or an operation (process) of filling the mold cavity with at least either a resin provided with foaming properties or a resin without foaming properties.

"Filling" signifies an action of introducing into the mold cavity at least either a resin provided with foaming properties or resins without foaming properties.

A filling with a volume smaller than the volume of the mold cavity is called "short-shot" or "short-molding".

A filling with a volume equivalent to the volume of the mold cavity is called "full-shot" or "full-pack".

A filling with a volume larger than the volume of the mold cavity is called "over-shot" or "over-pack".

In the case where a pressure keeping is used to reduce sink marks or to improve transcription performance, the use of pressure keeping is clearly specified.

The distinction between "pressurized" and "non-pressurized" processes in the case of block molding is clearly specified by indicating the presence or the absence of pressure such as "non-pressurized after filling" or "pressurized after filling".

"Injection (liquid injection, gas injection)" signifies a process through which a liquid or a gas is introduced (poured) forcibly into a system by means of, for example, a pump or a syringe.

"Addition" signifies simply an action of mixing or supplementing and has, hence, a broader sense than "injection". Namely, "injection" is included in "addition". In particular, when a liquid foaming agent or a foaming gas is to be injected into a thermoplastic resin undergoing plasticization and metering in the heating cylinder, it is difficult to inject the liquid foaming agent or the foaming gas unless the injection pressure is increased to a level higher than the pressure of the molten thermoplastic resin in the heating cylinder. Consequently, as shown in the below described FIG. 1, FIG. 2 and FIG. 3, the present invention employs a device capable of regulating the quantity of injection of the liquid foaming agent or of the foaming gas.

Figure 2:
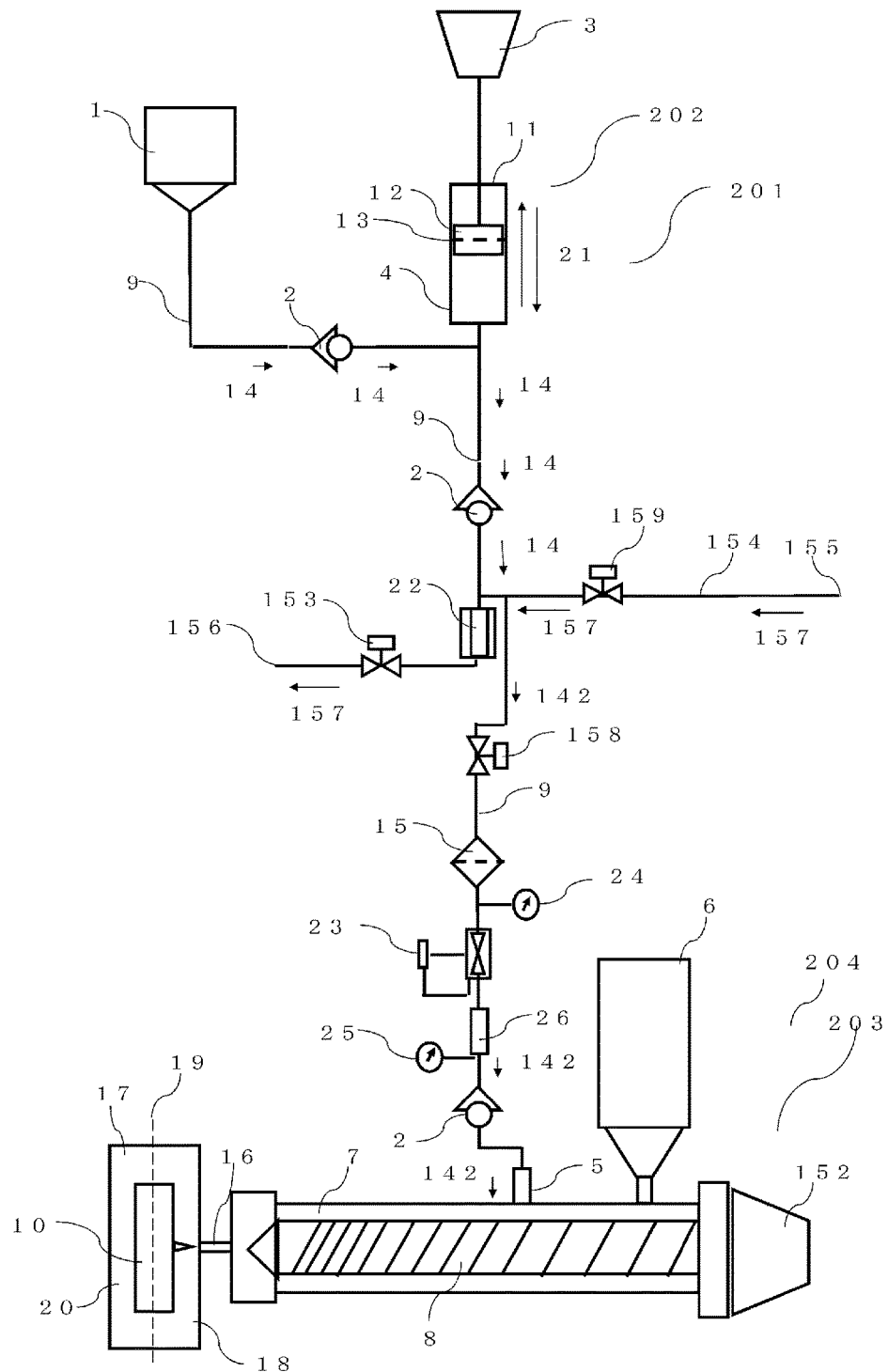
FIG. 2 is a schematic view of a device for manufacturing molded article.

Incidentally, FIG. 2 represents an injection device equipped with an apparatus for vaporization and chemical reaction (vaporizer/generator unit) 22 which enables to generate a foaming gas at least either by vaporization or by pyrolysis of liquid foaming agents under a thermal effect.

The vaporizer/generator unit 22 is equipped with a cleansing mechanism for eliminating residues therein.

The cleansing of residues in the apparatus for vaporization and chemical reaction 22 is carried out by the following procedures. In FIG. 2, the automatic on-off valve 158 which is open at foam-molding stage is closed to prevent the cleansing liquid from flowing into the heating cylinder 7. The normally closed automatic on-off valve 159 is opened to let in the cleansing liquid into the vaporizer/generator unit 22, and the automatic on-off valve 153 for discarding the cleansing liquid is opened, and then the cleansing liquid, for example water and an organic solvent such as ethanol, is introduced into the apparatus. The vaporizer/generator unit 22 is filled with the cleansing liquid which, if necessary, is heated to facilitate the dissolution of residues in the vaporizer/generator 22, and stirred externally by ultrasonic vibration, or air or nitrogen gas is introduced to cause bubbling to accelerate the dissolution of foaming residues, and finally the cleansing liquid is discarded to outside through the outlet port 156.

After finishing these procedures, air or nitrogen gas is let in through the inlet port 155 to expel with the pressure of gas (air or nitrogen gas) the cleansing liquid remaining in the vaporizer/generator unit 22 and in the piping 154, and when these parts are dried, the cleansing of the vaporizer/generator unit 22 is completed.

As cleansing liquid, it is desirable to use the same solvent used in the device but a different type of substance may also be used. Since the residues occurring when sodium bicarbonate or a hydrogen carbonate salt such as potassium bicarbonate has been pyrolyzed are carbonates, besides the dissolution with water, they can be eliminated also through causing a chemical reaction by introducing an aqueous solution of an organic acid like that of citric acid.

Figure 3:
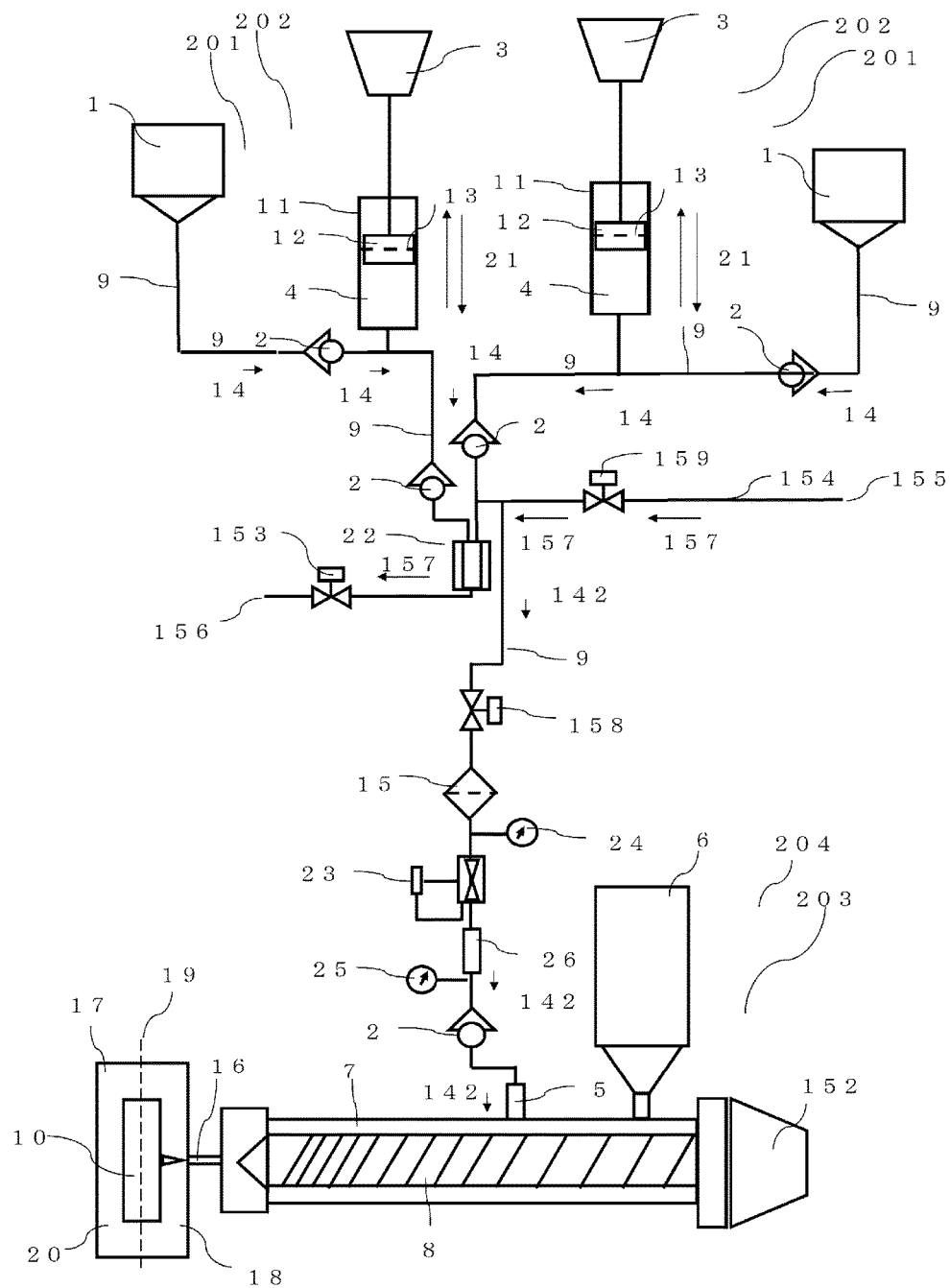
FIG. 3 is a schematic view of a device for manufacturing molded article.

FIG. 3 is a schematic representation of a device for manufacturing molded articles equipped with the vaporizer/generator unit 22, wherein liquid foaming agents are mixed to generate a foaming gas through gasifying by at least either chemical reaction or heating. Where the foaming gas is carbon dioxide, since it is liquefied if a pressure is applied at a temperature below the critical temperature, in order to inject the generated carbon dioxide gas as it is into the heating cylinder, it is necessary to heat the device section starting from the vaporizer/generator unit 22 and leading to the heating cylinder.

Moreover, the vaporizer/generator unit 22 is equipped with a cleansing mechanism to eliminate the residues occurring therein.

"Plasticization" signifies a process by which a thermoplastic resin is heated, melted and kneaded by means of a screw, etc. in the heating cylinder, or it is heated and melted.

"Fusion", "melting" and "smelting" signifies the process wherein a substance is heated and turned into a liquid state. In other words, "Fusion", "melting" and "smelting" signifies the change of phase wherein a substance in solid phase is heated and changed into a substance in liquid phase.

The temperature at which a solid changes into a liquid is called a melting point. While a thermoplastic resin has no melting point, there is a concept called softening point which is similar to the melting point. "Fusion" signifies a process wherein a thermoplastic resin is heated up to the softening point. In the present invention, the terms "fusion", "melting" and "smelting" are treated as synonyms.

"Heating cylinder" signifies a device which houses a screw therein and is equipped with heaters on external parts when it is used for processing a thermoplastic resin, in a plasticization device, kneading device or an injection device in an injection molding machine, or in a plasticization device, a kneading device or an extrusion device in an extruder. The heating cylinder is also called a barrel, cylinder, housing, casing, etc. In the case of processing a thermosetting resin, the exterior part of "heating cylinder", where necessary, is equipped with at least either a heater or a cooler.

"Injection into the heating cylinder" signifies that a provision is made so that the heating cylinder is fabricated to install a fill port (valve) 5 as shown in FIGS. 1-3, FIGS. 34-36, FIG. 38, FIG. 39 or FIGS. 5-7, and that at least either a liquid foaming agent or a foaming gas is injected into the resin in the heating cylinder. The present invention describes a variant method wherein at least either a liquid foaming agent or a foaming gas is injected into the molten resin inside the heating cylinder through a hole provided at the rear end of the screw and through the screw, but the invention is not intended to limit the application to this variant.

In the case where at least either a liquid foaming agent or a foaming gas is injected into the thermoplastic resin pellets before plasticization in the heating cylinder, it is desirable to place a cap at the bottom of the hopper each time a molding operation (a shot) is carried out to seal the cylinder and prevent the foaming gas from escaping out of the cylinder.

In case where a certain surplus fraction of the liquid foaming agents (for example the water as solvent in an aqueous solution of sodium bicarbonate) has returned (flowed back) to the vicinity of the bottom part of hopper, there arises a problem wherein the liquid foaming agent at a high temperature fuses a fraction of pellets and the pellets are bonded together. When this problem arises, the molding materials cannot be injected into the mold cavity, etc. (introduced into the heating cylinder). As a means to avoid this problem, a hole can be pierced in the heating cylinder at a location close to the hopper in order to drain or expel the surplus fraction of liquid foaming agent (solvent such as moisture) spontaneously or by an enforced means (for example suction by vacuum, etc.).

"Resin within the heating cylinder" signifies a thermoplastic resin or a thermosetting resin that is in a solid state and in a form of pellet, bulk, powder, etc. having not yet been heated and melted, or that is in the course of plasticization, or that is in a molten state after the completion of plasticization.

"Foam molding" signifies, in the case of thermoplastic resin, the process of fabricating a molded article with a foamed structure by means of one of the following methods (A)-(E).

(A) UCC method
(B) MuCell method
(C) The method of injecting the gas, which is generated by gasifying, pyrolyzing or reacting chemically the liquid foaming agents of the present invention in the outside of the heating cylinder, into the heating cylinder to provide the expandability or foaming capacity to the molten resin within the heating cylinder.
(D) The method of injecting the foaming agents of the present invention including for example water, alcohols, an aqueous solution of sodium bicarbonate, potassium bicarbonate, citric acid, sodium citrate, etc. into the heating cylinder to provide the expandability or foaming capacity to the molten resin within the heating cylinder.
(E) The method of using the solid foaming agents of the present invention including powder of sodium bicarbonate, powder of citric acid and powder of azodicarboxylate amide, or using the masterbatch of the solid foaming agent prepared by mixing these solid foaming agents with a resin having the quality equivalent to or compatible with that of the resin to be molded to provide the expandability or foaming capacity to the molten resin in the heating cylinder.

"Foam molding" signifies, in the case of thermosetting resin, the process of fabricating a molded article with a foamed structure, wherein commercially available foaming agents or liquid foaming agents are mixed with the basic ingredient of resin and the mixture is heated before, during or after filling the mold to cause foaming by means of vaporization, pyrolysis or chemical reactions, etc.

In the foam molding, a foaming agent capable of presenting all 3 properties of gas, solid and liquid can be used singly or in combination with other types of agents.

In the case where a liquid foaming agent is used for a thermoplastic resin, the gas useful (effective) for foaming is generated through the following steps: an optimum volume of agent for the weight of molded article is measured out (metered); the metered agent is injected into the thermoplastic resin in the heating cylinder; the injected agent at least either gasifies, pyrolyzes or reacts chemically, due to at least either the temperature of and in the heating cylinder, the temperature of the molten thermoplastic resin in the heating cylinder or the temperature of the mold; or the injected agent is made to, without the need for heating, at least either decompose or react chemically.

The generated gas is at least either finely dispersed or dissolved under pressure into the thermoplastic resin in the heating cylinder. In that way, the thermoplastic resin inside the heating cylinder becomes a thermoplastic resin presenting the expandability. By injecting such a resin into the mold cavity, we can manufacture molded articles with a foamed structure, or by extruding the resin through a die we can obtain foam-molded articles.

In other words, "foam molding" signifies the actions or processes for obtaining a body of foamed structure by making the liquid foaming agent at least either dispersed or dissolved into the resin inside the heating cylinder and consequently by making the agent generate a useful foaming gas by means of the mold temperature. In particular, the latter feature is mainly utilized in the block molding or cast molding of thermoplastic resins, or in the molding processing of thermoplastic resins.

Like a liquid, the "gas" is a fluid, wherein the thermal motion of molecules exceeds the inter-molecular force and hence molecules are able to move more freely than in the liquid state. In a gas, the variation of volume as a function of temperature and pressure is great. Furthermore, a gas does not have fixed dimensions of volume, and if the gas is put in a container, the gas fills the container, and the gas is highly mobile and by nature tends to expand always. The density of a gas is smaller than a liquid or a solid and the gas can be compressed with ease. The volume of the gas is proportional to temperature and inversely proportional to pressure.

"Steam" signifies an entity that is in the state of gas that has been created by vaporization of a liquid substance or by sublimation of a solid substance. In particular, a substance with a temperature below the critical temperature is called gas phase.

"Vaporization" signifies a phenomenon wherein a substance changes from a solid or liquid state to a gas state. Vaporization is either evaporation or boil. Evaporation is a phenomenon wherein the vaporization takes place at the surface of a liquid, while boil is a phenomenon wherein the vaporization takes place inside a liquid. The boiling point signifies the temperature at which the boil takes place. The boiling point becomes higher when the pressure increases.

"Condensation" signifies a physical change wherein a gas turns into a liquid, and is also called liquefaction. "Condensation point" signifies the temperature at which a gas turns into a liquid. The condensation point becomes higher when the pressure increases. The condensation point of water is particularly called "dew-point (dew-point temperature)". When water condenses on the surface of a solid, the phenomenon is called "dew condensation". When an aqueous solution of sodium bicarbonate is used as a liquid foaming agent, the solvent water appears on the surface of the mold as dew condensation, since the surface temperature of the mold is lower than the dew-point. To reduce the dew condensation, the surface temperature of the mold is raised. If the surface temperature of the mold is raised above the dew-point, there occurs no more of dew condensation.

Incidentally, when the system of OGCP is applied, since the dew-point temperature becomes higher, the surface temperature of the mold has to be raised further.

The problem of condensation of solvent on the mold surface is solved by using a liquid foaming agent with a lower boiling point such as diethyl ether.

By using a liquid foaming agent that has been prepared by mixing a substance with a low boiling point with a substance with a high boiling point, such as a mixture of diethyl ether, water and ethanol, the problem of dew condensation of solvents is alleviated, because the consumption of substances with a higher boiling point is reduced.

"Liquid" has a state wherein molecules exert their own attraction force to each other, is mobile, changes its shape in conformity with that of a container. While the liquid presents the properties as a fluid same as the gas, the Pascal's law applies to the liquid because its compressibility is low as compared with the gas. A liquid maintains an almost constant density and, unlike a gas, does not expand to fill the entire volume of a container. The liquid has particular properties such as the ability to form its own surface, and as a special property presents the surface tension. Intuitively speaking, if a substance has a fixed geometry, it is a "solid", if it has no fixed geometry but a fixed volume, it is a "liquid", and if it has neither a fixed geometry nor a fixed volume, it is a "gas".

"Liquid foaming agent" signifies a substance that presents the properties of a liquid as described above at a designated temperature of its own in the range between 40° L below zero and +150° C., and under a designated pressure in the range between 0.01 MPa and 25 MPa.

A liquid foaming agent needs to be liquid only at the stages where it is used normally, for example when it is injected into the heating cylinder, or at the stage where it is injected into the vaporizer/generator unit 22 shown in FIGS. 2 and 3. In the present invention, it is required for a liquid foaming agent to enable to measure an injection volume in proportion to, for example, an aliquot in weight of resin per shot in injection molding with a thermoplastic resin, or to the weight of extruded resin per fixed duration of time in extrusion process with a thermoplastic resin.

Consequently, in the present invention the liquid foaming agent can be one of those liquid substances represented by water, an alcohol, mixed solution of water and an alcohol, carbonated water, aqueous solution of a hydrogen carbonate, aqueous solution of a carboxylic acid, aqueous solution of a carboxylate, an ether, mixed solution of water and an ether, etc. as well as other liquid substances that are derived by mixing one of these substances as a main ingredient with other added substances, including emulsions, suspensions, sols and gels. Incidentally, in the present invention, the qualifiers, "liquid" and "in a liquid form", are synonymous.

"Injected volume" signifies that the volume of a liquid foaming agent to be injected is specified in proportion to a fixed weight of resin.

"Volume" signifies cubic volume (vol), weight (wt) or mass (mass) that is determined by means of a measuring device including a syringe, a balance, etc. Since the force to generate the acceleration of gravity on the earth is of an approximately constant value of 9.8 Newton (N), weight and mass are assumed to be synonymous.

"Control (regulation)" signifies the action by which a predetermined volume of a liquid foaming agent is injected into a fixed volume of resin.

"Meter" or "charge" signifies the action by which a volume is measured out by a certain means. In the molding process also, the term "meter" is used and signifies the action by which it is possible to measure out a volume of resin by means of selection of the rotational speed or the distance of retrogression, etc. of the screw.

"To cause foaming" signifies the action by which a liquid foaming agent or a commercially available foaming agent, by means of a physical change such as vaporization, pyrolysis, chemical reaction, etc., generates a gas useful for foam molding, for example, water vapor, vapor (gas) of an alcohol, vapor of an organic solvent, carbon monoxide, carbon dioxide, nitrogen gas, or hydrogen gas, etc.

In other words, "to cause foaming" signifies a phenomenon wherein a foaming gas that has been compressed in the resin by external pressure, for example the force due to IGCP, OGCP, back-pressure, injection pressure, etc. (the state wherein a compressed gas is at least either finely dispersed or dissolved under pressure in the resin), as a result of reduction or removal of the external pressure, increases its volume or the foaming gas dissolved under pressure turns into a gas.

Moreover, "to cause foaming" includes also a case where a thermoplastic resin provided with foaming properties foams when it is extruded out of the heating cylinder or a case where a thermosetting resin foams when it is heated in the mold cavity. "To cause foaming" signifies also the process wherein a foaming gas is generated when a liquid foaming agent or a solid foaming agent gasifies, pyrolyzes or reacts chemically.

In the case of thermoplastic resin, "foaming" signifies the process wherein, after the molten resin has been impregnated with foaming gas by means of at least either fine dispersion or dissolution under pressure, the pressure is reduced to form foaming cells at least either in the inner part or on the surface of the thermoplastic resin.

In the case of thermosetting resin, "foaming" signifies the process wherein a foaming agent is heated to make it evaporate, pyrolyze or react chemically and thus generate a foaming gas to form foaming cells at least either in the inner part or on the surface of the thermosetting resin.

The molded articles thus presenting a foamed layer either in the inner part or on the outer part are called foam molded-articles.

"Foaming resin" signifies a thermoplastic resin in a molten state that has been impregnated with a foaming gas useful for foam molding, wherein the gas is at least either finely dispersed or dissolved under pressure in the resin.

In other words, "foaming resin" signifies a thermoplastic resin or a thermosetting resin that contains at least either a liquid foaming agent or a commercially available foaming agent.

In the present invention care is taken to describe as accurately as possible the state of the concerned resin in respect to its foaming properties by stating that it is provided with foaming properties or that it contains at least either a liquid foaming agent or a commercially available foaming agent. Thus there appear such phrasings as: "molten thermoplastic resin provided with foaming properties"; "thermoplastic resin containing a foaming agent", or "thermosetting resin containing a foaming agent".

"Foam-molded article" signifies a resin molded article presenting noncontiguous foamed cells in the inner part, processed by using a thermoplastic resin or a thermosetting resin provided with foaming properties. The size of foamed cells is less than 1,000 µm (micron, micrometer). In the present invention, a product presenting a mixture of both foamed cells and hollow portions also is considered as a foam-molded article.

"Combined usage" signifies that a factor is not used alone but used together or in combination with at least another one. For example, in the description of the present invention, a number of molding methods are mentioned. These molding methods are effective when any one of them is applied alone, but it can also be used together with another method, and the combined usage is adopted to obtain a synergic effect or it is possible to expect the improvement of efficiency for one factor or for both factors. Moreover, regarding liquid foaming agents, one of them is not used alone but used in combination with several ones. They may sometimes be used in combination with commercially available foaming agents.

"Foaming agents" are classified roughly as either physical foaming agents or chemical ones, wherein each category is classified into the inorganic group and the organic group, respectively. Among all categories of "foaming agents", those of pyrolysis type of inorganic group of chemical foaming agents include: hydrogen carbonates, carbonates, nitrites, hydrogen compound carboxylic acids, carboxylates; those of pyrolysis type of organic group include: azo compounds, hydrazine derivatives, semicarbazide compounds, azide compounds, nitroso compounds, triazole compounds, etc.; and those of chemical reaction type include isocyanate compounds. In the present invention, in order to identify clearly the nature of a foaming agent, distinction is made among "liquid foaming agent", "commercially available foaming agents", and "solid foaming agent".

Regarding commercially available foaming agents, for example as masterbatches of foaming agent, there are Polythlene, Fineblow (both are trade names, solids in the form of pellets), etc.

The masterbatch of foaming agent is prepared by using an inorganic or organic foaming agent and the end-use resin, etc.

Foaming agents of inorganic group include, for example, those carbonates represented by sodium carbonate; hydrogen carbonates represented by sodium hydrogen carbonate and potassium hydrogen carbonate; carboxylic acids, carboxylates, organic acids, and organic acid salts represented by sodium dihydrogen citrate and potassium dihydrogen citrate, etc.

Foaming agents of organic group include, for example, ADCA (azodicarboxylic acid amide, azodicarbonamide), MCA (hydrodicarboxylic acid amide, hydrodicarbonamide), barium azodicarboxylate, OBSH [p,p'-oxybis (benzenesulfonyl hydrazide)], DPT (dinitroso pentamethylene tetramine), and AIBN (azobisisobutyronitrile), etc.

Detailed information on foaming agents and foam molding is described in a book titled "Foam molding technology with different types of polymers" published by Technical Information Institute, Co., Ltd. in August 1993.

The properties and condition of foaming agents that are applicable and useful to the present invention is not in the form of pellet or powder but in a liquefied state (liquid). A liquid enables to measure and control its volume by means of a device like a syringe or a plunger pump or a diaphragm pump capable of verifying the flowrate.

Foaming agents applicable to the present invention are those substances that are able to gasify, pyrolyze or react chemically by a thermal effect, or to cause a chemical reaction simply by mixing together without any thermal effect, to generate a foaming gas.

As liquid foaming agents, we can cite water, monovalent alcohols, polyhydric alcohols, ethers, esters, ketones, aliphatic hydrocarbons, aromatic hydrocarbons, etc. One of them can be used alone or also in a solution mixed with any number of others.

Liquid foaming agents include also azeotropic mixtures such as a mixed solution of 96 wt (weight) % of ethanol and 4 wt % of water.

Incidentally an "azeotropic mixture" presents an azeotropic point when mixed substances interact each other as if they are a single substance. For example the mixture of water and ethanol that the present invention employs is an azeotropic mixture. In a certain case where an azeotropic mixture is used as a liquid foaming agent, one substance may function as the foam-nucleating agent.

Moreover, as an example of liquid foaming agent, it is possible to cite: an aqueous solution of a carbonate (e.g. sodium carbonate, potassium carbonate, etc.), hydrogen carbonate (bicarbonate, e.g., sodium hydrogen carbonate, potassium hydrogen carbonate, etc.), nitrite, nitrate, carboxylic acid (e.g., citric acid, malic acid, tartaric acid, etc.), carboxylate (sodium dihydrogen citrate, potassium dihydrogen citrate, etc.) or sodium azide; a mixed solution of an aforementioned monovalent alcohol and an organic solvent, e.g., pentane or hexane; a mixed solution of an aforementioned aqueous solution of an aforementioned carbonate, hydrogen carbonate, carboxylic acid or carboxylate and an alcohol.

The concentration of an aqueous solution of these salts needs to be that at which no precipitation takes place under a normal condition.

In the case where precipitation takes place with an aqueous solution of these salts, the solution is heated and the precipitate is dissolved again.

The aqueous solution of these salts may be used while it is heated in order to increase the solubility. For example, because the solubility of sodium bicarbonate or potassium bicarbonate rises when the temperature increases, the cistern 1 in FIGS. 1-3 and the syringe 11 containing the liquid foaming agent as well as the ductwork conducting the liquid are heated as need arises with a view to raising the solubility. Regarding the FIGS. 34-36 and the FIG. 39, the cistern 1 and the diaphragm pump 145 containing the liquid foaming agent as well as the ductwork conducting the liquid are heated as need arises with a view to raising the solubility.

Furthermore, since the foaming agents such as ADCA and DPT of the pyrolysis type in the organic group are insoluble in water, alcohols and the organic solvents of low boiling point which are useful for foam molding, they are used as solid phase in suspensions, and water and the organic solvents of low boiling point useful for foam molding are used to make up emulsions. These preparations can be injected into the heating cylinder by using the means described in the present invention, e.g., the devices in FIG. 1, FIG. 2, FIG. 34 and FIG. 35. An aqueous solution of carbon dioxide (carbonated water) and other substances like liquefied carbon dioxide, liquefied propane and liquefied butane are also useful foaming agents.

Even without any thermal effect, for example the carbon dioxide generated by the contact between a basic compound including carbonate and hydrogen carbonate in a solid form or in an aqueous solution and an aqueous solution of an inorganic acid or an organic acid can also be used as a foaming gas if the device of the FIG. 3 is used. Therefore, any one of the substances involved is in a liquid form, they are considered as liquid foaming agents.

Since the carbon dioxide gas liquefies if it is to be injected into the heating cylinder under a pressure at a temperature below the critical point, the vaporizer/generator unit 22 in the FIG. 3 and FIG. 36 and the subsequent ductwork up to the heating cylinder are heated to a temperature above the critical point.

The above mentioned reaction can be effected without using the manufacturing system of FIG. 3, for example, through an alternative means whereby the carbon dioxide gas is generated by injecting into the heating cylinder a solid hydrogen carbonate or an aqueous solution of the hydrogen carbonate as well as a solid citric acid or an aqueous solution of citric acid, wherein the injected volume of respective liquid ingredients is controlled.

Moreover, by means of the system of the FIG. 3, it is also possible to generate the hydrogen gas by causing a contact between a metal and an acid or basic substance, in order to utilize the hydrogen gas as a foaming gas.

In the next place, the way how to use the liquid foaming agents applied to the present invention is described.

A liquid foaming agent is in a liquid form when it is put to use, and when it is injected into the heating cylinder 7 or into the vaporizer/generator unit 22 shown in the FIG. 1, FIG. 2, FIG. 35, FIG. 36 and FIG. 38, it generates a foaming gas due to a thermal effect entailing at least a physical change like vaporization, pyrolysis or a chemical reaction. Moreover, a liquid foaming agent causes foaming action by mixing it with a resin and heating the mixture in the mold cavity.

In concrete terms, we can cite as an example of a liquid foaming agent a single substance or a combination of at least two out of the following list of substances: water, carbonated water; aliphatic alcohols like methanol, ethanol, propanol, butanol and decanol, e.g., primary, secondary or tertiary monovalent alcohols, polyhydric alcohols wherein the carbon number is less than 20, preferably less than 14; aliphatic ethers like diethyl ether, methyl propyl ether, ethyl propyl ether, methyl butyl ether, ethyl butyl ether; other ethers like aromatic ethers and cyclic ethers like tetrahydrofuran; aliphatic hydrocarbons like pentane, hexane; aromatic hydrocarbons like benzene, toluene, xylene; ketones represented by n-butanone (methyl ethyl ketone, MEK); esters like ethyl acetate, butyl acetate; substances called organic solvents selected from chlorides of aliphatic hydrocarbons including methylene chloride, chloroform, carbon tetrachloride, etc.

A liquid foaming agent to be injected into the heating cylinder so as to be evaporated and generate a foaming gas needs to have a boiling point lower than the molten resin temperature as in the case of water, an alcohol, or ether.

Since the possibility of condensation of a portion of a foaming agent on the mold surface is lower if the surface temperature is higher than the dew point of the foaming agent in use, the occurrences of sink marks due to such a condensation are less frequent when the mold surface temperature is kept higher than the dew point.

The substances or materials that are possibly used as a foaming agent include: a mixed solution of water and any one of those organic solvents described above; a mixture of different organic solvents; a mixed solution of water or an organic solvent and a carbonate, one of those bicarbonates represented by sodium bicarbonate and potassium bicarbonate, a nitrite, a nitrate salt, one of those borohydrides represented by sodium borohydride, one of those inorganic azides represented by sodium azide, one of those organic acids represented by carboxylic acids with a chemical formula of R—COOH represented by acetic acid, lactic acid, oxalic acid and citric acid; an aqueous solution or suspension of a basic metal salt of an above mentioned carboxylic acid; an emulsion of water added with a surface-active agent and a substance insoluble in water like benzene, xylene; a suspension of powder of ADCA, HDCA or DPT in water, an alcohol or an ether.

A liquid foaming agent used in the present invention may also be called "foaming agent in a liquid form", "foaming agent in a liquid state".

In the case where a liquid foaming agent is prepared as an aqueous solution of a hydrogen carbonate represented by sodium bicarbonate and potassium bicarbonate, an organic acid like citric acid, or a citrate, and the prepared agent is injected into the heating cylinder of a molding machine so as to cause vaporization, pyrolysis or a chemical reaction to generate a foaming gas, it is desirable that both the temperature of pyrolysis of solute and that of vaporization of solvent are below that of the molten resin.

A foaming agent is made to gasify or to pyrolyze, etc., by means of the heat of the heating cylinder.

In certain methods, as shown in the FIG. 2 and FIG. 3, before a foaming agent is injected into the heating cylinder 7, it is measured out for a fixed volume and fed to the vaporizer (evaporator, carburetor)/generator unit 22, in which the controlled volume of the agent vaporizes or undergoes pyrolysis for generating the useful gas to be injected into the heating cylinder 7.

In the case where a liquid foaming agent undergoes pyrolysis to generate a foaming gas before it is injected into the heating cylinder 7, since the residues of foaming substances remain in the vaporizer/generator unit 22 without being mixed in molded articles, the problem of residues in foam molded articles can be solved.

In the case of a thermosetting resin, a liquid foaming agent is mixed beforehand into the end-use thermosetting resin, and the foaming action can be made to occur at the heating stage inside the mold cavity in the injection molding or at the stage of heating the die in the extrusion molding.

The composition and concentration of a liquid foaming agent are determined, for example, by the mixing ratio of at least two substances for mixing selected from water, alcohols and esters, concentration or injection volume of sodium bicarbonate in soda water. Moreover, the injection pressure of a foaming agent is determined by the type of resin to be used, molding conditions, molding method and shapes of molded articles.

Incidentally, in the preparation of these mixtures or water solutions, it is necessary to take account of solubility of solutes.

Among the liquid foaming agents, the aqueous solution of carbonates and hydrogen carbonates generate carbon dioxide by the contact with inorganic acids and organic acids. In cases of this type of liquid foaming agents using a chemical reaction, it is necessary to determine respective quantities by taking account of the chemical equivalent and the molar equivalent of an acid that reacts with basic substances like carbonates and hydrogen carbonates.

Figure 36:
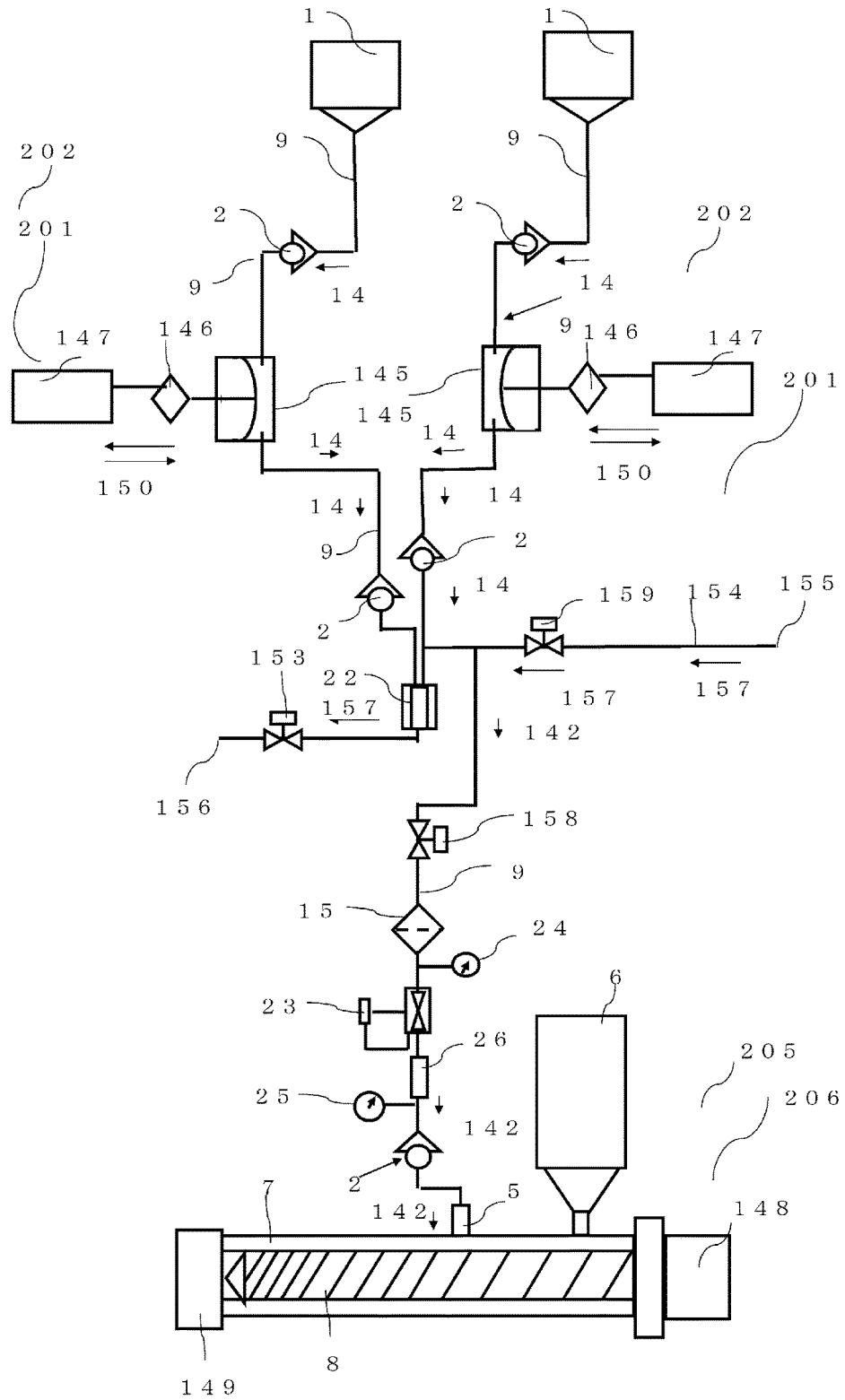
FIG. 36 is a schematic view of a device for manufacturing molded article.

The device for manufacturing molded articles as shown in the FIG. 3 and FIG. 36 is used in the cases as described above where the carbon dioxide is generated by a reaction between a carbonate or a hydrogen carbonate and an inorganic or an organic acid, and the generated gas is utilized as a foaming gas. In certain cases where a liquid agent is an aqueous solution, the vaporizer/generator unit 22 may be heated to turn the evaporated solvent water into a foaming gas as well as to cause a simultaneous chemical reaction.

In the cases where an alcohol or an ether is used as a liquid foaming agent, the enhanced fluidity of a molten thermoplastic resin provided with foaming properties enables to produce functions and effects which make it possible to carry out a low-pressure molding and/or to improve the transcription performance in injection molding processes.

In the cases where we use as a liquid foaming agent water, an alcohol, an ether, sodium bicarbonate water, an aqueous solution of potassium bicarbonate, citric acid, citric sodium, etc., the reactions taking place in the process of generating a foaming gas, i.e., vaporization or pyrolysis, are all endothermic and hence provide an effect to lower the temperature of molten thermoplastic resin provided with foaming properties. Consequently, in the case where such an agent is used together with another element having a high calorific value like DPT, it is possible to reduce the problem of burn that arises on the molded articles of thermoplastic resin when DPT alone is used. Moreover, since the consumption of DPT is reduced, an economic effect (cost reduction for molded articles) is achieved.

Liquefied carbon dioxide or liquefied nitrogen, because it is a liquid, may be used depending on the means of molding process. The solid substances presenting the properties of sublimation, like dry ice and naphthalene, can be used as a foaming agent, and hence they can be used in combination with other liquid foaming agents.

"Foaming gas" signifies a gas generated by evaporation, pyrolysis or chemical reaction of a commercially available foaming agent represented by ADCA, or a gas generated by a similar process of a liquid forming agent.

Judging from the pressure and the resin temperature prevailing in the heating cylinder and the mold (temperature of moldable resin) and the temperature of the mold or the die, a foaming gas can be any gas that is in a gas state and able to foam the resins described in the present invention, at a temperature higher than 75° C. and under a pressure of 1 atm. (760 mm/Hg). In particular, water vapor, carbon monoxide, carbon dioxide gas, hydrogen gas, nitrogen gas and vapors of alcohols (ethanol and isopropanol (IPA) are preferable to methanol, considering the toxicity), vapors of ethers, vapors of organic solvents like pentane and hexane, propane gas and butane gas, etc. are useful.

A foaming gas can be used alone, but as the mode of action to resin differs depending on types of gas, like fine dispersion or dissolution, several types of gasses may be mixed in certain applications.

Next, the injection device for liquid foaming agents is described in reference to figures.

Figure 1:
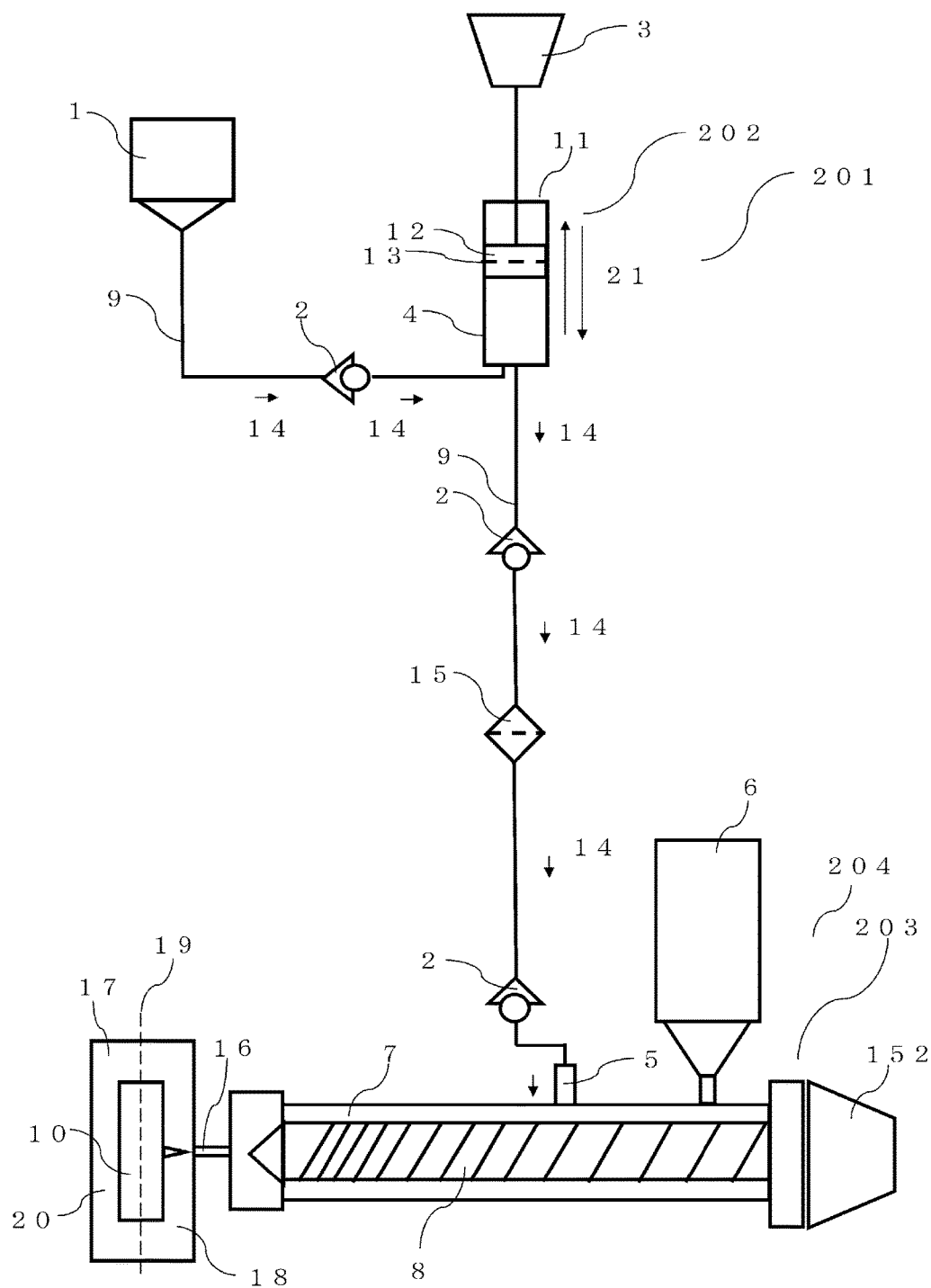
FIG. 1 is a schematic view of a device for manufacturing molded article.

In order to make the description understandable, the use of a liquid foaming agent in the injection molding of thermoplastic resin shown in the FIG. 1 is explained.

A liquid foaming agent is measured out for an optimum volume of aliquot for a single shot of injection, which is injected directly into the thermoplastic resin in the heating cylinder 7 to be made to at least either vaporize, pyrolyze or react chemically due to the heat of the heating cylinder 7. The injection of a foaming agent into the heating cylinder 7 is effected normally through the fill port 5 provided on the heating cylinder 7 respectively.

The device 201 for manufacturing molded articles shown in FIG. 1 is to be described. The code 1 is the cistern to contain a liquid foaming agent.

A liquid forming agent contained in the cistern 1 is conducted through the ductwork 9 to the liquid injection device 4 by the gravity of its own weight and the suction action of the liquid injection device 4, or by the pressure applied in advance to the inside of the cistern 1.

The liquid injection device 4 is so configured, by means of a driving device 3 of the plunger 12, e.g., servomotor, hydraulic cylinder or pneumatic cylinder, as to measure out the volume of aliquot of foaming agent to be injected into the volume of thermoplastic resin to be metered (plasticized) during the following stroke.

The liquid injection device 4 is so configured as to enable either to inject into the heating cylinder 7 the volume of an aliquot of the liquid foaming agent for a single shot, or to measure out a large volume of multiple aliquots of the agent at a time and then inject only a volume of an aliquot required for a single shot of the agent.

In the case of injection molding, the injection of agent into the heating cylinder 7 is carried out in the following manners:

(a) By injecting into the cylinder 7 the total volume at a time or in several aliquots;

(b) By injecting continuously in concert with the start and the finish of metering process;

(c) Injection is started after a predetermined period of time has elapsed since the start of metering and stopped after a predetermined period of time has elapsed since the start of injection;

(d) Injection is started after a predetermined period of time has elapsed since the start of metering and stopped at the time coinciding with the termination of metering; and (e) Injection stops with a delay of a little while after the completion of metering.

In the extrusion molding, normally the injection is carried out continuously.

When the plasticization (metering) of thermoplastic resin is started, the external driving device 3 of the plunger 12 is activated to lower the plunger 12 and to start to inject a liquid foaming agent into the heating cylinder 7. The fill port (valve) 5 is configured so that the molten thermoplastic resin in the heating cylinder 7 may not flow back to the liquid injection device 4 even when the pressure of the resin rises, e.g., as shown in the FIGS. 10-19.

The code 6 is the hopper containing the material; the code 7 is the heating cylinder; the code 8 is the screw that plasticizes a thermoplastic resin, mixes it with a foaming agent, causes the mixture to foam with a generated gas, and disperses finely or dissolves the gas under a pressure into the molten thermoplastic resin; the code 16 is a shutoff nozzle that is provided to prevent the drooling of nozzle during the metering; the code 10 is the mold cavity.

The liquid injection device 4 for injecting a liquid foaming agent into the heating cylinder 7 consists of a syringe (cylinder) 11 and a plunger (pumping element) 12.

The plunger 12 is linked to a driving device 3 of the plunger 12 and the injection of a liquid foaming agent into the heating cylinder starts as soon as the driving device 3 receives a signal for starting the metering from the injection molding machine 204, or after an elapse of a certain period of time following the signal reception.

Concerning the injection speed (injection volume per unit of time), the total volume required for a single operation can be injected at a time, but it is preferable to synchronize it with at least either the metering speed or the position of the screw 8 of the injection molding machine. The injection is terminated before the metering (rotation of screw 8) ends, when it ends or with a delay of a little while after it has ended.

In addition to the syringe 11 (upper part of FIG. 1), the plunger 12 is equipped with a plunger ring 13 so as to prevent the foaming agent from leaking. The plunger ring 13 can be a conventional O-ring, but it is preferable to use a type of product which increases the sealing capacity when a pressure is applied to it such as Omniseal (trade name) or Bariseal (trade name) presenting sliding properties and made of Teflon (registered trademark) or a high-density PE or a metal. The plunger ring 13 can be a single piece of product but it is desirable to use multiple pieces of product made of multiple types of material to improve the sealing capacity.

With a view to reduce the deviation of plunger stroke, it is recommendable to provide a means such as a slide ring (not illustrated).

Figure 35:
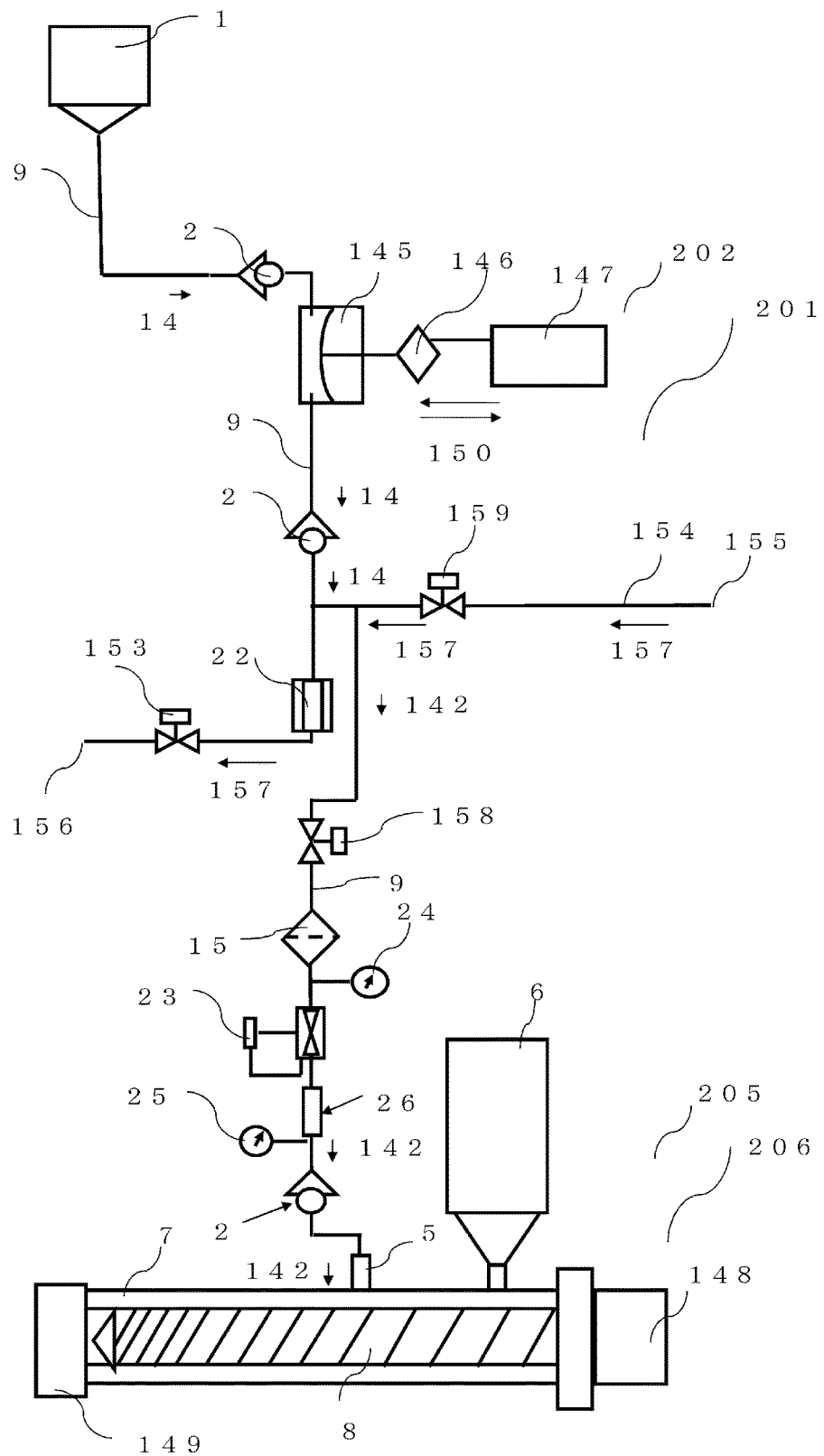
FIG. 35 is a schematic view of a device for manufacturing molded article.

FIG. 2 and FIG. 35 represent the device for manufacturing molded articles derived from the device 201 for manufacturing molded articles of FIG. 1 by equipping it with a vaporizer/generator unit 22.

The vaporizer/generator unit 22 is first filled with a liquid foaming agent and then heated externally by a device like a heater and made to at least either vaporize, pyrolyze or react chemically to generate a foaming gas.

In the embodiment 2 and the embodiment 27, the heating by a high-frequency induction was used. The pressure of the generated foaming gas is, as need arises, regulated by the pressure control valve 23, and the gas is injected into the heating cylinder 7. In the case where the flowrate needs to be regulated, the flowrate control valve 26 is provided. Incidentally, the code 24 is a pressure gauge to measure the pressure of foaming gas before the injection and the code 25 is a pressure gauge to measure the pressure of the foaming gas to be injected into the heating cylinder.

By applying the concept of the vaporizer/generator unit 22 as shown in the FIG. 2 and FIG. 35, the problem of residues remaining in molded articles is solved even in the case of using ADCA, for example, if powder of ADCA is fed into the vaporizer/generator unit 22 and then heated externally to cause pyrolysis of ADCA, and the generated gas only is injected into the heating cylinder 7, and the residues from the foaming reaction are retrieved and discarded. If the generated foaming gas is conducted through a body of water on its way, ammonia gas present in the foaming gas can be removed.

In the case of molding a thermoplastic resin wherein the liquid foaming gas is water, an alcohol or an ether, the use of vaporizer/generator unit 22 is not always required, and the liquid foaming agent can be injected directly into the heating cylinder 7 and gasified, etc. As a matter of course, even in the case of molding processes of thermoplastic resin, a foaming agent can be gasified, etc. in the vaporizer/generator unit 22 and the generated foaming gas may then be injected into the heating cylinder 7.

Incidentally, as the need arises, the generated gas is injected into the heating cylinder 7 after its pressure has been adjusted by means of the pressure control valve 23. If the regulation of flowrate is required, it is desirable to provide the flowrate control valve 26.

FIG. 3 and FIG. 35 represent the device to generate a foaming gas useful for foam molding by a chemical reaction of a liquid foaming agent. Here the description shall be made to present a means to generate the carbon dioxide gas by a chemical reaction between the sodium bicarbonate water and an aqueous solution of citric acid.

The sodium bicarbonate water is fed into the cistern 1 on the left side the FIG. 3, an aqueous solution of citric acid is fed into the cistern 1 on the right side the FIG. 3, and the equivalent amounts of respective chemicals needed for the chemical reaction are measured out by the plunger pump 12.

Subsequently, each plunger is operated to inject into the vaporizer/generator unit 22 the sodium bicarbonate water and the aqueous solution of citric acid to generate the carbon dioxide gas in the vaporizer/generator unit 22.

The pressure of the carbon dioxide gas is regulated by the pressure control valve (regulator) 23 and the gas is injected into the heating cylinder 7.

If the regulation of flowrate of the gas is required, a flowrate control valve 26 is provided. By applying this system and filling the vaporizer/generator unit 22 with, e.g., $CaCO_3$, and by using an acid like hydrochloric acid to generate the carbon dioxide gas, the generated gas can be used also as a foaming gas.

Furthermore, if this system is applied, the hydrogen generated by the contact of metal zinc with hydrogen chloride or by that of metal aluminum with an aqueous solution of sodium hydroxide also can be used as a foaming gas.

The device for manufacturing molded articles shown in the FIGS. 1-3, FIG. 38 is an injection molding machine 204. The device for manufacturing molded articles shown in the FIGS. 34-36, FIG. 39 is an extruder 206. The foaming resin obtained by this device can be used also in block molding under atmospheric pressure (non-pressurized) or under a pressurized condition, cast molding, calendar molding, laminating molding, etc. to manufacture molded articles.

Incidentally, the code 2 in the FIG. 1 is a check valve, serving for preventing backflow.

Moreover, the devices for manufacturing molded articles illustrated in FIGS. 1-3, FIG. 38, FIGS. 34-36 and FIG. 39 can be used also for manufacturing molded articles by using a thermosetting resin. In this case, mainly the mold or die is heated.

In FIGS. 1-3, FIG. 38, descriptions were made in regard to the cases of injection molding.

In the cases of extrusion molding, as it is needed to continuously inject a liquid foaming agent into the molten resin in the heating cylinder 7, we can choose either to install multiple injection devices 4 and operate them in turn or to exchange the injection device with one that can be operated continuously, including gear pump, diaphragm pump and plunger pump. If the phenomenon of pulsation in injection occurs, it is also possible to insert a cushion tank (not shown) on the downstream side after the pump to alleviate the pulsation. FIGS. 34-36 and FIG. 39 show the cases of extrusion molding wherein a diaphragm pump 145 is adopted as the injection device.

Aforementioned descriptions for FIGS. 1-3, FIG. 38 presented the process of measuring out a volume of aliquot of liquid foaming agent for each shot of injection molding.

Alternatively, it is also possible to measure out a large volume of liquid into the liquid injection device 4 at a time (charge the device) and then control the injection volume by the action of the driving device 3, e.g. in the case where a servomotor is chosen, by its movement.

In particular, in the case where a volume of liquid foaming agent needed for several shots is stored at a time and injected in several aliquots, an automatically operated valve (not shown) is provided as the need arises on the upstream side of the fill port 5.

Figure 34:
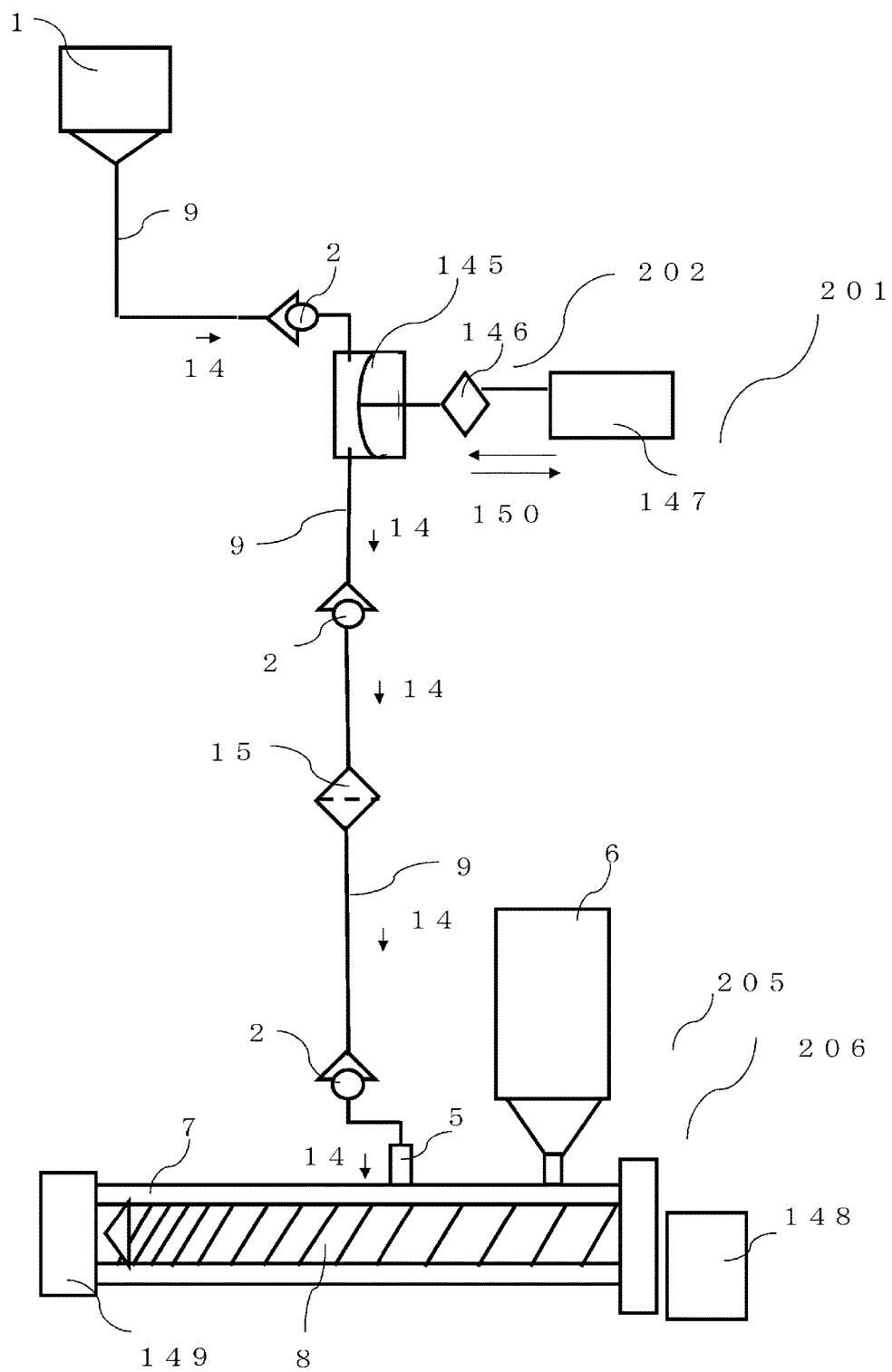
FIG. 34 is a schematic view of a device for manufacturing molded article.

The means for injecting a single type of liquid foaming agent into the heating cylinder 7 are shown in FIG. 1 for injection molding and in FIG. 34 for extrusion molding.

Figure 5:
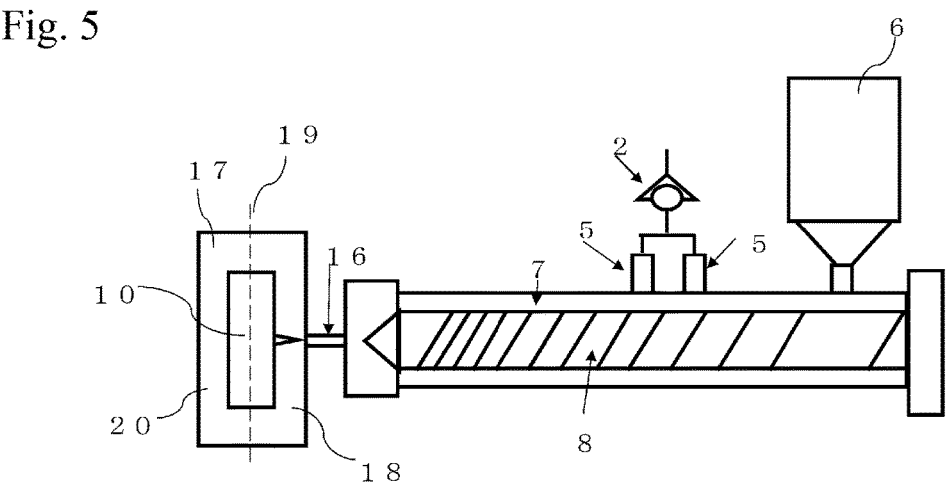
FIG. 5 is a schematic representation of the mounting of the fill port.
Figure 6:
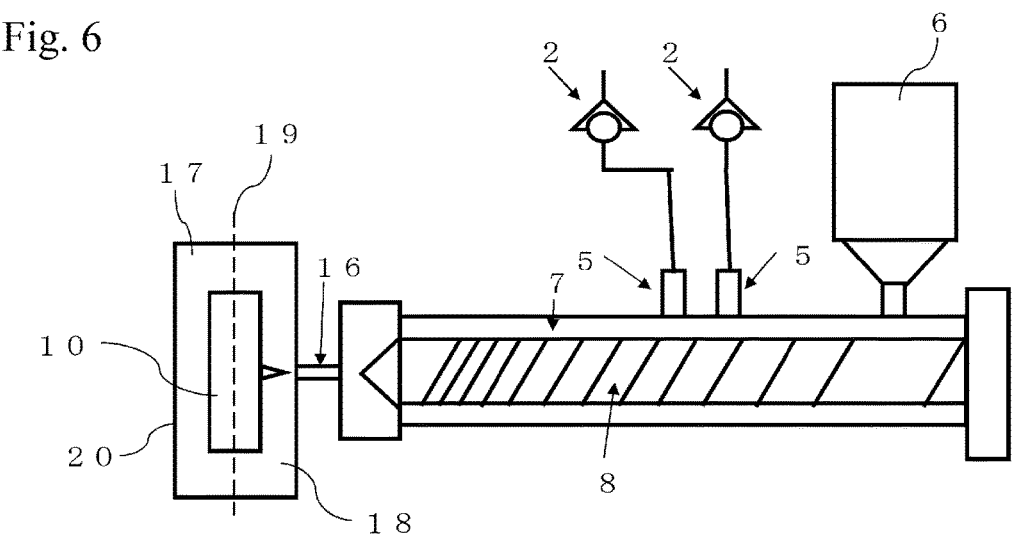
FIG. 6 is a schematic representation of the mounting of the fill port.
Figure 7:
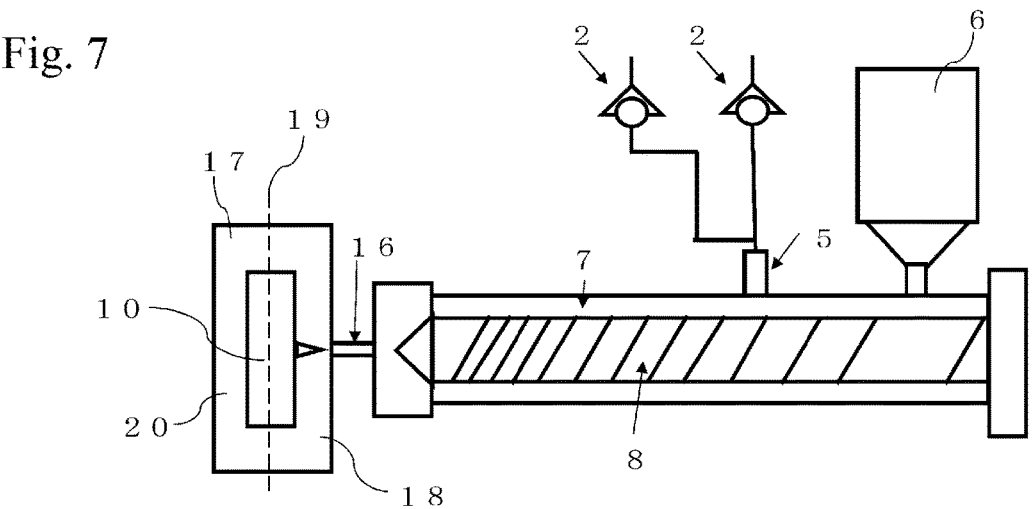
FIG. 7 is a schematic representation of the mounting of the fill port.

In order to inject two or more types of liquid foaming agent into the heating cylinder 7, the cistern 1 and the liquid injection device 4 are provided in the number of types of liquid foaming agent to be used. Then each type of liquid foaming agent can be either mixed with others before the inlet (on upstream side) of a fill port 5 to be injected into the heating cylinder or injected into the heating cylinder 7 separately through one of the several fill ports 5 provided on the heating cylinder 7 (FIGS. 5,6 and 7).

In the case where only one type of liquid foaming agent is used, the number of fill ports does not need to be one, and the liquid foaming agent may be injected through a number of fill ports 5.

The locations for providing (mounting) several fill ports 5 on the heating cylinder, can be either at a uniform distance from the end of the heating cylinder 7 or at different distances from it, and when they are at a uniform distance, they can be positioned at any point in the circumference of the heating cylinder 7.

Figure 4:
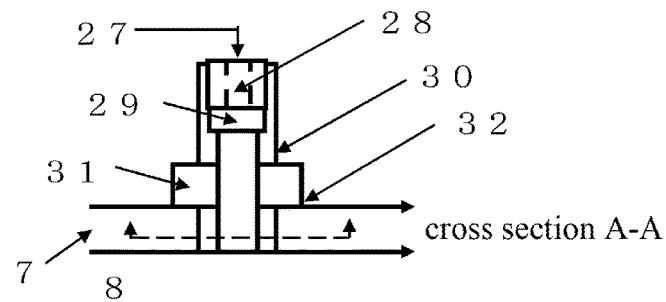
FIG. 4 is a schematic view of a fill port.

Incidentally, FIG. 4 presents the details of a fill port 5.

A liquid foaming agent does not necessarily need to be a mixed solution but, for instance, water and ethanol can be injected into the heating cylinder 7 separately through different fill ports 5.

FIG. 5 illustrates by example a configuration wherein a type of liquid foaming agent is injected through two fill ports 5 that are provided on the heating cylinder 7.

FIG. 6 illustrates by example a configuration wherein two types of liquid foaming agent are injected separately through two fill ports 5 that are provided on the heating cylinder 7.

In this case, respective foaming agents can be injected either simultaneously or otherwise.

FIG. 7 illustrates a configuration wherein a fill port 5 is provided on the heating cylinder 7 and two different types of liquid foaming agent are injected through the fill port 5. In this case, the injection of each type of foaming agent does not need to be simultaneous or otherwise.

FIG. 5 and FIG. 6 present two fill ports but more than two fill ports 5 can also be provided. Moreover any combination of FIGS. 5-7 can also be implemented.

Those substances including ADCA, HDCA, DPT, etc. are difficult to dissolve or insoluble in water and alcohols. Consequently, when they are to be used, dope cement is prepared by using a resin compatible with the end-use resin and they are dispersed into the cement. The dope cement can be used as it is, but in certain cases, before it is used, water or an alcohol may be added first to adjust the viscosity to bring it to a level enabling the injection of the cement.

In the following section, the descriptions are made to present a method for preparing a liquid foaming agent for use in ABS resins by means of dope cement.

An appropriate amount of n-butanone is added to pellets of a SAN resin compatible with ABS, and the mixture is left at room temperature to make dope cement. ADCA powder is mixed into it to make a liquid foaming agent in a form of suspended sol containing ADCA. In order to adjust the viscosity, if it is too high, a substance like n-butanone is added, if it is too low, another high-viscosity dope cement of SAN prepared separately is added. As the base resin of dope cement is a SAN resin, a liquid foaming agent using the dope cement containing ADCA can be used as a liquid foaming agent for those resins presenting compatibility with SAN, ABS, PC, etc. If PS is used instead of SAN, the product can be used as a liquid foaming agent for resins like PS, HIPS (high impact polystyrene), m-PPE, etc.

In cases of an auxiliary foaming agent, a foam-nucleating agent [foam-initiating agent (material)], and a foaming agent of reaction type, in addition to the above mentioned means to inject several agents separately into the heating cylinder 7, other means are possibly available whereby these materials alone are made to impregnate the end-use resin, a masterbatch is created by using the end-use resin, or they are fused with the end-use resin and kneaded together.

For example, each of sodium bicarbonate and citric acid is used to prepare an aqueous solution separately which is injected into the heating cylinder 7 as shown in FIG. 6 or FIG. 7, and mixed with each other in the heating cylinder 7 to cause a chemical reaction and generate a foaming gas.

It is also possible to cause a chemical reaction in the heating cylinder 7 by using citric acid as a masterbatch and an aqueous solution of a hydrogen carbonate as a liquid foaming agent. As a matter of course, the manufacturing device of FIG. 3 also can be used.

Regarding ADCA, auxiliary foaming agents and foam-nucleating agents, etc. that are insoluble in water or alcohols can be used by the means whereby they are used as a suspension by dispersing them in a liquid foaming agent. Since the suspension liquid separates if is left alone, the injection is made while a measure is taken to prevent the liquid from separating by such means as mechanical agitation or other means like bubbling (air agitation) (FIG. 8).

Figure 8:
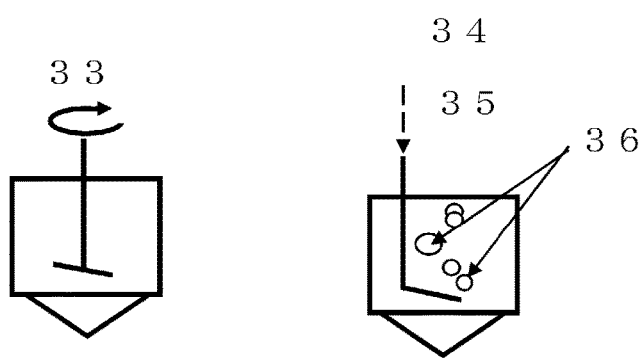
FIG. 8 is a schematic representation of the means for stirring the foaming agent.

Incidentally, FIG. 8 illustrates the means for agitation of foaming agents. These mechanisms are used mainly in the cistern 1 containing a liquid foaming agent.

The most useful gas for foam molding is water vapor, carbon dioxide gas, or nitrogen gas.

In the present invention, the water vapor can be generated with ease by evaporation of water, pyrolysis of a hydrogen carbonate, a carboxylic acid, etc. or by a chemical reaction of these substances with an organic acid, etc.

The nitrogen gas can be obtained by pyrolysis of those inorganic azides represented by sodium azide, ADCA, DPT, etc. Although the toxicity of azides is feared, they are used as aqueous solutions easy to handle by making use of devices shown in FIG. 1, FIG. 2, FIG. 34 and FIG. 35 to generate the nitrogen gas. As the toxicity is low with ADCA and HDCA, they are made to impregnate a masterbatch of foaming agent or the pellets of end-use resin. In this manner, the nitrogen gas needed for foaming action is obtained by a conventional means, and by using them in combination with a liquid foaming agent, the consumption of masterbatch of a foaming agent can be reduced.

The vapor of an alcohol or that of an ether can be used as a useful foaming gas. The vapor of an alcohol or that of an ether can be generated by heating and evaporating a liquid alcohol or ether.

In the present invention, a liquid foaming agent can be used also in combination with aforementioned MuCell, etc.

For example, if the nitrogen gas is injected into the heating cylinder 7 in a gas form and the carbon dioxide gas is generated by injecting an aqueous solution of sodium bicarbonate, it is possible to obtain a mixed gas of nitrogen gas, carbon dioxide gas and water vapor. Consequently, to a certain extent, the problems associated with MuCell, etc, i.e., variation in injection volume (variation in injection volume of gas whereof only the pressure is controlled) etc., can be alleviated.

"Auxiliary foaming agent" signifies a substance that is used with a view to lowering the pyrolysis temperature of a foaming agent or to accelerating the pyrolysis thereof. As auxiliary foaming agents in the organic group we can cite zinc stearate, barium stearate, metallic soap, urea, zinc oxide, etc. and inorganic and organic acids that are used for degradation of carbonates and hydrogen carbonates can also be called an auxiliary foaming agent.

"Foam-nucleating agent (foam-core agent, foam-initiating nucleating agent)" signifies a substance that is mixed with an end-use resin or a liquid foaming agent used in the present invention, with a view to causing the end-use resin to foam or to forming finely foamed cells.

As foam-nucleating agents we can cite, for example: oxides including silica, talc, alumina, titanium oxide, zinc oxide, magnesium oxide, etc.; carbonates including lithium carbonate, sodium carbonate, potassium carbonate, zinc carbonate, calcium carbonate, barium carbonate, magnesium carbonate, etc.; sulfates including calcium sulfate, barium sulfate, etc.; hydrogen carbonates including sodium hydrogen carbonate, calcium hydrogen carbonate, ammonium hydrogen carbonate, etc; alkali metal salts of hydroxy acid used as a foaming agent represented by sodium dihydrogen citrate (monosodium citrate), monohydrogen disodium citrate (disodium citrate), trisodium citrate (trisoda citrate), dihydrogen potassium citrate (monopotassium citrate), monohydrogen dipotassium citrate (dipotassium citrate), tripotassium citrate (3-potassium citrate), etc.; furthermore ADCA, DPT, OBSH, etc. that are foaming agents.

It is preferable to mix those foam-nucleating agents (e.g., talc, alumina, magnesium oxide, calcium carbonate, calcium sulfate, barium sulfate, etc.) which are insoluble in the ingredients of a liquid foaming agent (e.g., water, alcohols, ethers, etc.) with the end-use resin (resin to be used in molding the product). Among substances used in molding other than those foam-nucleating agents, the additives (e.g., colorants) also have effects as a foam-nucleating agent.

"Expansion factor" is a value derived by multiplying by 100 the quotient obtained by dividing the difference in weight between the solid molded article and the foam molded article by the weight of the solid molded article. An expansion factor is a reference value used to judge whether foamed layers have been formed to create a body of foamed structure.

"Mixing ratio of foaming agent" is the ratio wherein the unity of weight or volume of a liquid foaming agent is compared with the weight or volume of the end-use resin, and expressed by the proportion of a foaming agent contained in the end-use resin.

For instance, when 2 wt % or 2 vol (volume) % of liquid foaming agent is used, the ratio is expressed as 2:100 (or 1:50 or 1/50), or alternatively as 2 wt % or 2 vol (volume) %.

"Injection volume" signifies the volume of a liquid foaming agent to be mixed in the end-use resin and is synonymous with "mixing ratio of foaming agent". Even when commercially available foaming agents or other masterbatches are used, the term "mixing ratio of foaming agent" or "injection volume" is also used.

The articles to which the present invention is applied are those resin molded articles irrespective of material, shape or intended end-usage in particular as long as they are processed by extrusion molding, injection molding, cast molding or block molding.

In the articles used in OA equipment, home electric appliances or game machines, styrene-based resins and polymer alloys or polymer blends containing styrene-based resins are mainly used.

In the articles used in automobiles, olefin-based resins or polymer alloys or polymer blends containing olefin-based resins are mainly used.

In the articles used in housing, furniture or sundry goods, styrene-based resins, olefin-based resins, polyvinyl-based resins represented by polyvinyl chloride, polymer alloys and polymer blends containing thermoplastic resins like ester-based or amide-based resins. Moreover, in the articles used in housing, furniture or sundry goods, thermosetting resins are mainly used.

The present invention is intended to be applied also to the molded articles using a reclaimed material processed as a new molding material that has been processed starting from the resins, particularly thermoplastic resins retrieved from the market, and improved in quality and denatured.

Since the foam molding, compared with the solid molding, can achieve a higher level of dimensional stability (accuracy in reproduction of dimensions in molded articles) to such an extent as it does not use the pressure keeping, it is suited for the use of recycled (reclaimed) materials of thermoplastic resins.

The types of resin that can be used in the present invention are listed in the database on properties in the Handbook of commercial trade of plastic molding materials (Ver. 1999, Ver. 2012) published by The Chemical Daily Co., Ltd.

The present invention can be applied to any type of thermoplastic resin as long as it is used for molding.

As thermoplastic resins, we can cite, for examples: polystyrene-based resin produced by polymerizing styrene-based monomers, for example, polystyrene (PS), high impact (impact-resistant) polystyrene (HIPS); styrene-derived resin which is a copolymer of nitrile-based monomer/styrene-based monomer, e.g., copolymer of acrylonitrile-styrene (AS); resin comprising nitrile-based monomer/styrene-based monomer/butadiene-based rubber, e.g., acrylonitrile butadiene styrene copolymer (ABS); styrene-based rubbers including AES having converted butadiene-based rubber into olefin-based rubber, ASA (AAS) having converted butadiene-based rubber into acryl-based rubber; polyolefin-based resins represented by polyethylene (PE), polypropylene (PP); polyphenylene ether (PPE), polyphenylene ether with denatured styrene (m-PPE); furthermore, engineering plastics denatured by resins including PPE, polycarbonate (PC), polyamide (PA), polysulfone (PSF), polyetherimide (PEI), polymethyl methacrylate (PMMA); and polyester resins including polyethylene terephthalate (PET), polybutylene terephthalate (PBT); and vinyl-based resins of polyvinyl chloride (PVC).

Two or more types of thermoplastic resins or thermoplastic elastomers can also be mixed to concoct a polymer alloy or a polymer blend. A polymer alloy or a polymer blend is concocted, for example, through the kneading by the screw in an extruder, etc.

As resins applicable to the present invention, thermosetting resins are also available.

In the case of thermosetting resins, as the temperature prevailing in the heating cylinder does not reach the level that causes foaming of a liquid forming agent, the foaming is caused by at least either vaporization or pyrolysis at the temperature prevailing in the mold cavity.

Thermosetting resins include: urea resin, melamine, phenol, polyester (unsaturated polyester) and epoxy, etc.

There are two types of elastomer i.e., the thermosetting type of elastomer (TSE) comprising urethane-rubber-based elastomer, fluorine-contained rubber-based elastomer, silicon-rubber-based elastomer, and the thermoplastic type of elastomer (TPE) comprising styrene-based elastomer, olefin-based elastomer, polyvinyl chloride-based elastomer, urethane-based elastomer and amide-based elastomer.

TSEs are, as in the case of a thermosetting resin or that of below-described rubbers, made to foam due to evaporation, pyrolysis, etc. of a foaming agent by means of the temperature in the mold cavity. Moreover TSEs are, in the case of extrusion molding, made to foam due to evaporation, pyrolysis, etc. of a foaming agent by heating the die.

As rubbers we can cite: natural rubber; diene rubbers including SBR, IR, BR, CR and NBR; and non-diene rubbers including silicon rubber, butyl rubber, EPM, EPDM, polyurethane rubber, acrylic rubber, fluorine-contained rubber, polysulfide rubber, epichlorohydrin rubber, chlorosulfonated polyethylene rubber, etc.

These rubbers form crosslinking when they are heated after filling the mold cavity. A rubber develops a body of foamed structure when a liquid foaming agent vaporizes or pyrolyzes and causes foaming due to the effect of temperature (crosslinking temperature) prevailing at the moment.

For the resins to which the present invention is applied, as long as the concerned product does not adversely affect the function of the system, the compounding chemicals described in the "Handbook of compounding chemicals for rubbers and plastics" published by Rubber Digest Co., Ltd. in March 1989 [newest edition], December 2003 [2nd revised edition] can be used.

Other resins and additives to be used for compounding the end-use resin include: colorant, dye, reinforcing agent (glass fiber, carbon fiber), bulking agent (carbon black, silica, titanium oxide, talc), heat-resisting agent, anti-aging agent, oxidation-degradation inhibitor, antiozonant, antiweathering (light resistant) agent (ultraviolet absorber, light stabilizer), plasticizer, auxiliary foaming agent, foam-nucleating agent, lubricant, friction reducer, internal mold release agent, mold release agent, antifog additive, crystal nucleating agent, flame retardant, auxiliary flame retardant, flow modifier, antistatic agent, compatibilizing agent, etc.

"Resin" signifies all of the thermoplastic resin (TPR), thermosetting resin (TSR), TSE, TPE, and rubber.

The thermoplastic resins and TPE that present thermoplasticity are called "thermoplastic resin".

The thermosetting resins, rubber and TSE that present thermosetting properties are called "thermosetting resin".

Molding processes that are practicable in the present invention include: injection molding, extrusion molding, compression molding, cast molding, block molding etc. These molding processes and other practicable molding processes are described in the "Dictionary of practical plastic molding processes", 1st edition Mar. 24, 1997, edited by the Editing Committee for "Dictionary of practical plastic molding processes", and published by the dictionary publishing center of Industrial Research Center of Japan.

Regarding the liquid foaming agents for the present invention, they are either injected directly into the resin in the heating cylinder on an extruder, injection molding machine, etc. or injected into the resin in the heating cylinder in a form of gas into which they have been converted first outside the heating cylinder.

In the case of extrusion molding of at least either a liquid foaming agent or a foaming gas is continuously injected into the molten thermoplastic resin. The injection volume of at least either a liquid foaming agent or a foaming gas is regulated so that a desired expansion factor may be obtained in relation to the extrusion speed (volume).

In the case of injection molding, the injection timing is synchronized with the molding cycle, and at least either a liquid foaming agent or a foaming gas is injected at the plasticization stage and the melting/kneading stage.

If at least either a liquid foaming agent or a foaming gas is injected at the bottom of hopper, the gas useful for foaming is allowed to escape through the hopper and the permeation of the gas in the molten resin in the heating cylinder is reduced. Therefore, at least either a liquid foaming agent or a foaming gas is injected into the molten resin in the heating cylinder, and kneaded strongly (with a high efficiency). Thus, at least either a liquid foaming agent or a foaming gas is dispersed finely and evenly or dissolved in the molten resin in the heating cylinder, enabling to obtain a molten resin provided with foaming properties. At the stages of plasticization and melting/kneading, care is taken to raise the back-pressure as high as possible to mix and knead strongly the resin in order to at least either disperse finely and evenly the foaming gas or dissolve it under pressure. As mentioned above, with a view to preventing the foaming gas from escaping through the hopper, it is also possible to close the hopper bottom with a cap.

In the case of molding with a thermosetting resin also, a liquid foaming agent is injected into the heating cylinder.

As the gas used for foaming in processes like MuCell is injected only under a prevailing pressure, the volume of gas in the thermoplastic resin in the heating cylinder cannot be regulated.

However, in the present invention, since the volume of a liquid foaming agent or a forming gas to be injected into the thermoplastic resin in the heating cylinder is controlled, the volume of foaming gas in the resin is constant. Consequently the articles to be molded by the method of the present invention have stable foaming power. This signifies the volume regulation of liquid foaming agent or foaming gas, and is one of the technical characteristics of the present invention.

The timing of plasticization of thermoplastic resin does not need to synchronize with the mold movement of the injection molding machine but it is preferable to delay the metering. In order to stabilize the molding process for each shot (stability of foaming power of thermoplastic resin provided with foaming properties), it is preferable to install a so-called metering delay timer to enable to open or close the mold while the metering proceeds.

Such an operation can be easily set up in the injection molding machine driven by electric power (electric motor) and having a toggle-type motor. Regarding the specific process of fusion and kneading of thermoplastic resin provided with foaming properties by injecting at least either a liquid foaming agent or a foaming gas at the stage of metering or plasticization, it is required to complete the process only before the injection step.

The injection of at least either a liquid foaming agent or a foaming gas is carried out through a fill port with a structure through which a liquid or a gas can pass but the passage of a molten resin is difficult (no backflow).

In the present invention, it is called "fill port" or "fill valve", and provided in the fusion zone (in the molten resin in the heating cylinder) etc. of the heating cylinder.

The locations where at least either a liquid foaming agent or a foaming gas is injected into the heating cylinder are the fill ports (valves) 5 illustrated in FIGS. 1-3, FIG. 38, FIGS. 34-36 and FIG. 39.

In FIG. 4, FIG. 9, FIG. 14 and FIG. 16, a fill port 5 is mounted on the heating cylinder 7 through a hole opened on the heating cylinder 7, the hole being threaded and into which the threaded (not shown) fill port 5 is inserted and fixed with a locking nut, for example by the fixing nut 31 for the purpose of fixing the port to the heating cylinder 7 as shown in FIG. 4, FIG. 9, FIG. 14 and FIG. 16.

Incidentally, FIGS. 9-19 are drawings presenting a detailed structure of fill port through which a liquid foaming agent or a foaming gas is injected into the heating cylinder 7.

Including other drawings as well, there are certain elements which are illustrated exceptionally in solid lines instead of broken lines to make the explanation comprehensible.

A fill port 5 has an inner core 29 and an outer hollow cylinder 30.

The inner core 29, as shown by the cross section A-A (details are shown in FIGS. 10-13), has a structure through which at least either a liquid foaming agent or a foaming gas can pass but a molten resin does not flow back.

Figure 9:
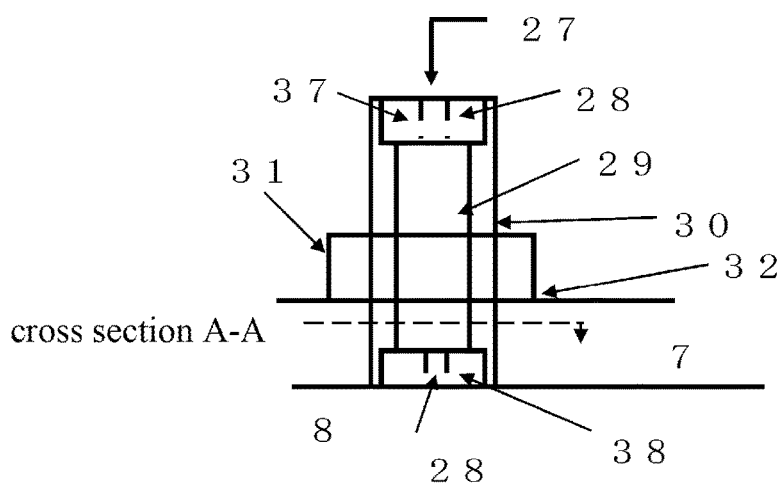
FIG. 9 is a schematic representation of the structure of the fill port.
Figure 10:
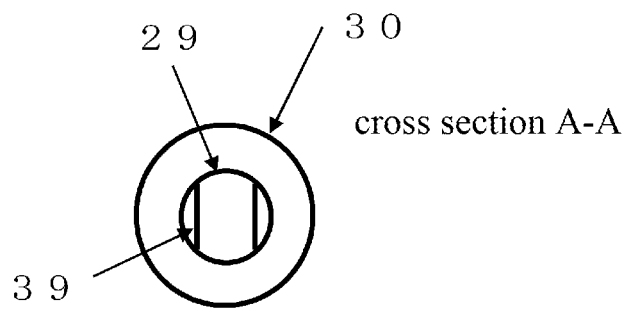
FIG. 10 is a cross-sectional view representing an example of the cross section on A-A plane of the fill port in FIG. 9.

FIG. 10 presents an example of the cross section A-A of the fill port of FIG. 9, showing a double structure wherein a D-Cut (partially cut circle) is made on two sides of the inner core 29 for providing a passageway for injection of at least either a liquid foaming agent or a foaming gas.

As shown in FIG. 10, the double-structured fill port has an inner core 29 and an outer hollow cylinder 30.

Both sides of the inner core 29 are machined to make a D-Cut through the empty space (clearance) of which a liquid foaming agent or a foaming gas passes and is injected into the heating cylinder 7. The clearance is $\frac{1}{1,000}$-1 mm.

Figure 11:
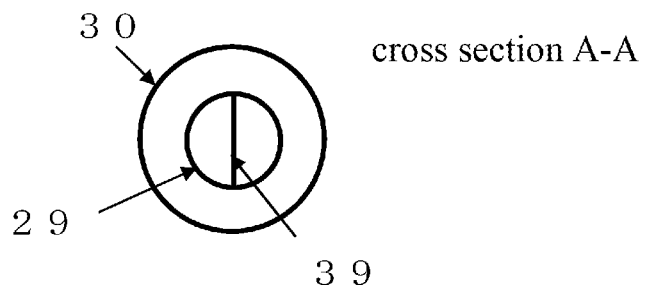
FIG. 11 is a cross-sectional view representing another example of the cross section on A-A plane of fill port in FIG. 9.

FIG. 11 is a drawing showing another example of the cross section A-A of the fill port in FIG. 9 presenting a double structure wherein the passageways for the injection of at least either a liquid foaming agent or a foaming gas are provided by splitting the inner core into two semicircular solid cylinders.

Figure 12:
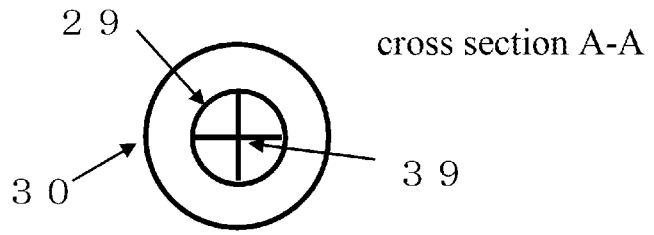
FIG. 12 is a cross-sectional view representing another example of the cross section on A-A plane of fill port in FIG. 9.

FIG. 12 is a drawing showing another example of the cross section A-A of the fill port in FIG. 9 presenting a double structure wherein the passageways for the injection of at least either a liquid foaming agent or a foaming gas are provided by splitting the inner core into four quarter circular solid cylinders.

At least either a liquid foaming agent or a foaming gas is injected into the heating cylinder through the clearance shown in FIG. 11 and FIG. 12.

Figure 13:
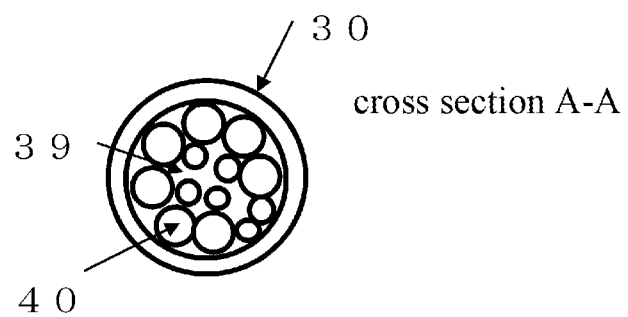
FIG. 13 is a cross-sectional view representing another example of the cross section on A-A plane of fill port in FIG. 9.

FIG. 13 is a drawing showing another example of the cross section A-A of the fill port in FIG. 9 presenting a double structure which houses a bundle of thin cylinders (core bodies) and wherein the passageways for the injection of at least either a liquid foaming agent or a foaming gas are provided through the clearances between thin cylinders.

As shown in the FIG. 13, the outer hollow cylinder 30 houses a bundle of thin core bodies 40. A liquid foaming agent or a foaming gas is injected into the heating cylinder 7 through clearances between core bodies 40. The adjustment of clearance is made by varying the size of core bodies 40.

These core and core bodies 40 are fixed by being sandwiched between the upper embedded fixing bolt 37 and the lower embedded bolt 38. The fixing bolts 37 and 38 are provided with holes or grooves of the code 28.

Figure 14:
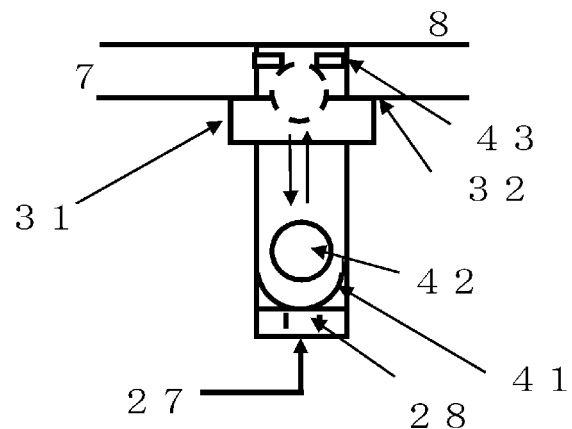
FIG. 14 is a schematic representation of the fill port.

FIG. 14 shows a drawing of detailed structure of a fill port for injecting a liquid foaming agent or a foaming gas into the heating cylinder wherein a ball check-valve is used.

The ball check-valve (spherical ball bearing) 42 lowers due to gravity and plugs the passage. By virtue of this action, the ball check-valve 42 is so configured as to prevent the molten resin provided with foaming properties in the heating cylinder from entering into, for example, the injection device shown in FIGS. 1-3 and FIG. 38 or the diaphragm pump shown in FIGS. 34-36 and FIG. 39, etc.

When a liquid foaming agent or a foaming gas is injected, the ball check-valve is lifted upward by the pressure of injection. Regarding the point of contact between the outer cylinder and the ball check-valve, the retainer 43 of the ball check-valve 42 is provided with grooves or clearances of the code 44 shown in FIG. 15. By virtue of this provision, a liquid foaming agent or a foaming gas can be injected into the resin in the heating cylinder 7 through these passageways. A small amount of resin is likely to accumulate at the end portion, but as the accumulated resin is pushed back into the heating cylinder by every injection, it creates no problem at all. This is called "self-cleaning effect".

Figure 15:
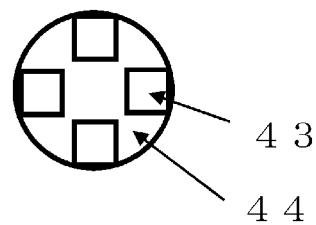
FIG. 15 is a schematic representation of the retainer of the ball-check valve 42 in FIG. 14.

FIG. 15 is a drawing to depict the retainer of ball check-valve 42 shown in FIG. 14.

Figure 16:
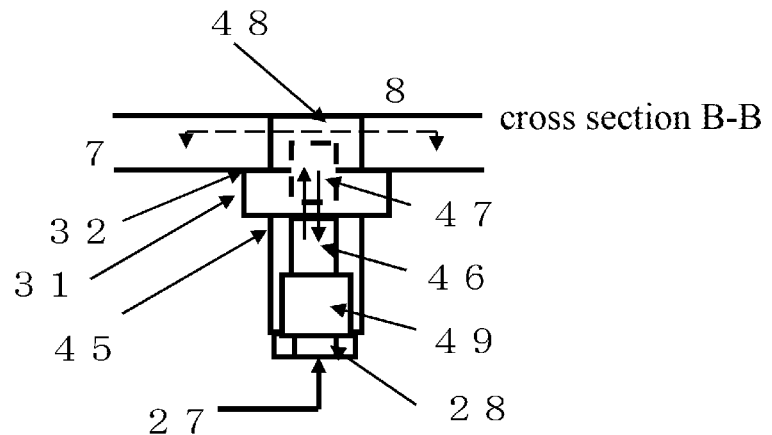
FIG. 16 is a schematic representation of the structure wherein the ball-check valve 42 in FIG. 14 is a cylindrical valve.
Figure 17:
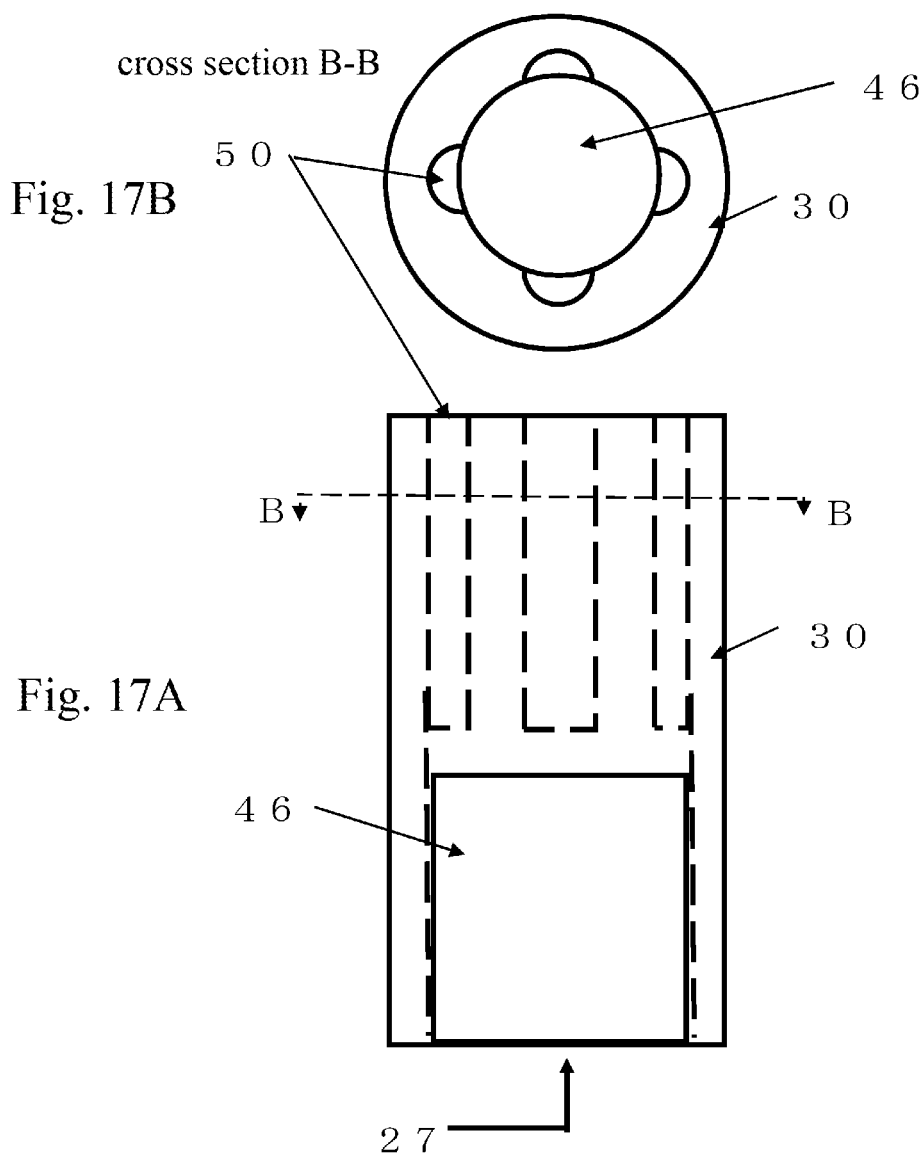
FIG. 17A is a schematic view of the cylindrical valve 46 in FIG. 16.
FIG. 17B is a cross-sectional view on the B-B plane in FIG. 17A.

FIG. 16 is a drawing to show the structure wherein the ball check-valve 42 in FIG. 14 has been replaced with a cylindrical valve. In order to conduct a liquid foaming agent or a foaming gas, the end portion is provided with grooves 50 as shown in FIG. 17 having the length slightly larger than the height of the cylindrical valve. By means of these grooves, when the cylindrical valve reaches the extreme end of advance due to the pressure of injection of at least either a liquid foaming agent or a foaming gas, the valve contacts these grooves 50 and creates the passageways or circuits, through which at least either a liquid foaming agent or a foaming gas is injected into the heating cylinder.

Incidentally, FIG. 17 is a drawing showing that, at the extreme end of advance of the cylindrical valve 46 in FIG. 16, the grooves are opened and the passageways are created for conducting at least either a liquid foaming agent or a foaming gas.

Once the injection of a liquid foaming agent or a foaming gas is completed, the cylindrical valve 46 returns to the position where no groove exists by the gravity and under the pressure of the mixed and kneaded resin impregnated with foaming gas. Consequently, no resin from the heating cylinder can enter into the injection device or pump.

The fill ports shown in FIG. 14 and FIG. 16 are mounted at a position located in the lower half portion of the heating cylinder so that the ball check-valve 42 and the cylindrical check-valve 46 may descend by their own gravity to close the circuit for injecting a liquid foaming agent or a foaming gas and to prevent the entry and reverse flow of the resin in the heating cylinder into the injection device.

Figure 18:
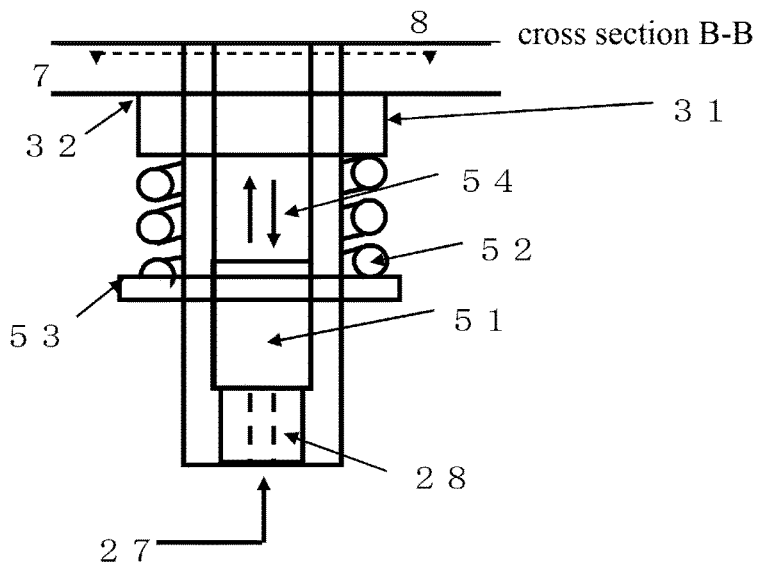
FIG. 18 is a schematic representation of the cylindrical valve 46 in FIG. 16.

FIG. 18 is a drawing to depict a mechanism wherein the cylindrical valve 46 in FIG. 16 on the fill port for injecting a liquid foaming agent into the heating cylinder is closed by a spring action.

As shown in FIG. 18, by providing a spring 52 on the cylindrical valve 46 in FIG. 16, when a liquid foaming agent or a foaming gas is injected, the spring is compressed by the injection pressure, the cylindrical valve advances, contacts the grooves 50 (FIG. 17) on the inner wall of the outer cylinder and opens the circuit, and the injection of a liquid foaming agent or a foaming gas is started. Once the injection of a liquid foaming agent or a foaming gas is completed, as the cylindrical valve 51 returns to the original position by the force of the spring 52 and closes the injection circuit, it prevents the resin in the heating cylinder from entering into the injection device and the injection pump. As this configuration does not have to consider the gravity, the fill port can be mounted also on the upper portion of the heating cylinder 7.

Figure 19:
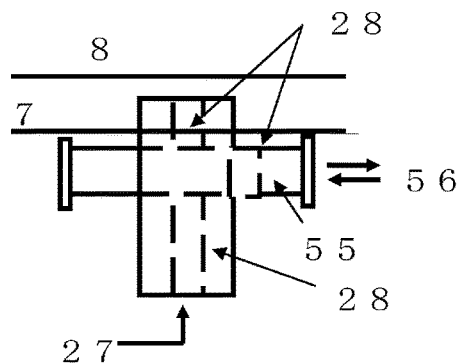
FIG. 19 is a schematic representation of an example of the fill port.

FIG. 19 is a drawing to depict a mechanically operated slide valve on the fill port for injecting a liquid foaming agent into the heating cylinder.

In this device, the slide valve is moved by a hydraulic, pneumatic or electrical action wherein the valve is opened upon receiving a signal "Open" from the device for injecting a foaming agent, and then the injection of a liquid foaming agent or a foaming gas is started. Once the injection of a liquid foaming agent or a foaming gas is completed, upon receiving a signal "Close", the slide vale is closed. The fill port on the heating cylinder 7 of an injection molding machine or an extruder, can be single in number but it can also be mounted on a multiple number of locations in a same area or in different areas.

In the case where a multiple number of fill ports are thus provided, a same liquid foaming gent or foaming gas can be injected or a number of different liquid foaming agents or foaming gasses, for example, water and ethanol, ethanol and water of sodium bicarbonate, water of bicarbonate and an aqueous solution of citric acid, etc. can be injected. The injection of at least either a liquid foaming agent or a foaming gas at each fill port can be started or stopped (completed) simultaneously or at a different timing with other fill ports.

In the case of extrusion molding of thermoplastic resin, by employing such measures as providing a mesh (strainer) at the end of the heating cylinder (barrel head) wherein the mesh size (roughness or size of mesh) is controlled, or narrowing of the nozzle bore to reduce the discharge rate or slowing down the extrusion speed, etc., a high back-pressure is developed, and the kneading performance of the molten resin inside the heating cylinder improves.

Moreover, if Dulmage structure is provided on the screw, the kneading performance improves, and by means of continuous mixing of a liquid foaming agent or a foaming gas, the forming gas disperses finely and evenly and dissolves under pressure into the molten thermoplastic resin in the heating cylinder.

In the case of injection molding of thermoplastic resin, during an operational cycle comprising mold clamping (closing), injection, cooling, mold opening, ejection of molded article (eject) and extraction of molded article, the so-called metering (plasticization) is carried out wherein the heat is applied to (made to affect) pellets of thermoplastic resin, etc. to melt, mix and knead it. During this process, with a view to making the foaming gas disperse finely and evenly and dissolve under pressure into the molten thermoplastic resin, a back-pressure is applied, and due to the back-pressure, the leakage of resin out from the nozzle on the molding machine takes place (the phenomenon is called also "drooling").

Figure 20:
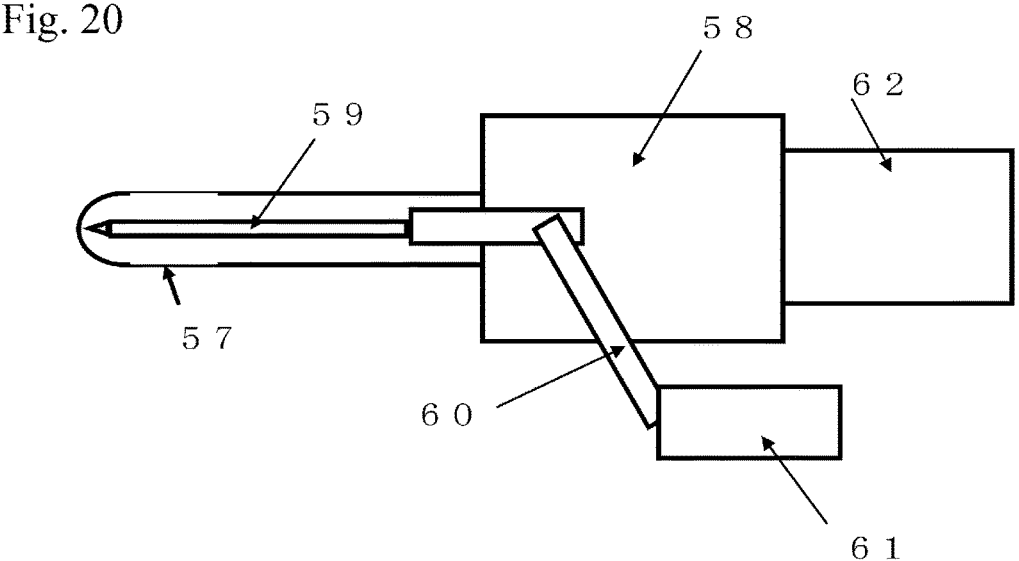
FIG. 20 is a schematic representation of an example of the shut-off nozzle.
Figure 21:
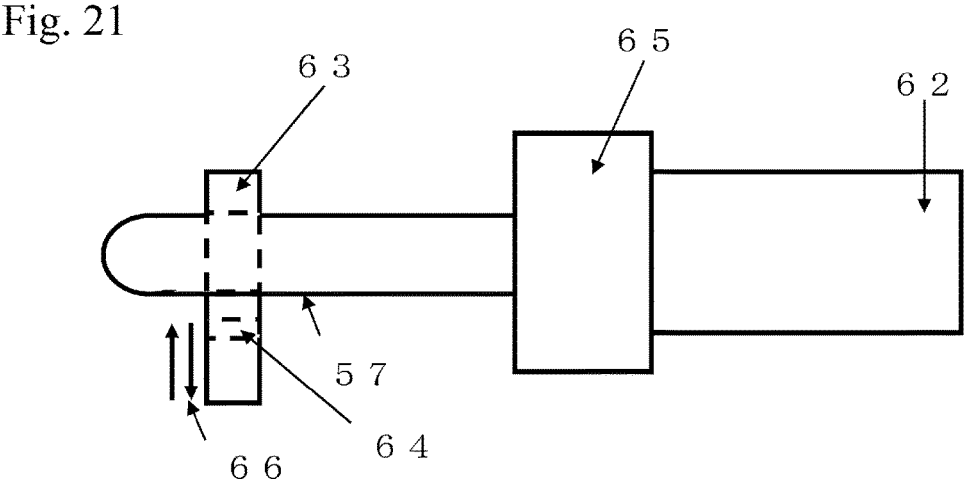
FIG. 21 is a schematic representation of an example of the shut-off nozzle.
Figure 22:
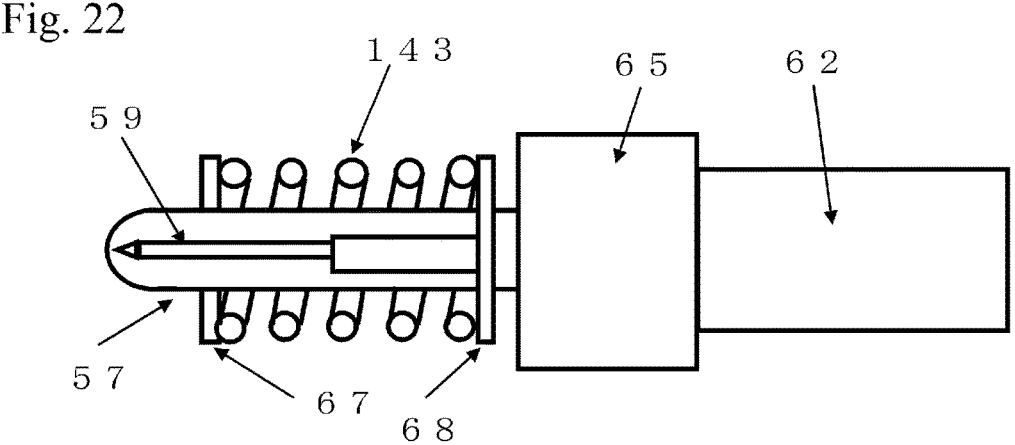
FIG. 22 is a schematic representation of an example of the shut-off nozzle.

In order to prevent this (leakage of resin), it is desirable to utilize a shutoff nozzle equipped with a needle type valve (FIG. 20), a rotary type valve or a slide type valve (FIG. 21) operated by a pneumatic (operation by using an air cylinder), hydraulic (operation by using a hydraulic cylinder) or mechanical (operation by using an electric motor or a solenoid) means, or a shutoff nozzle of spring-loaded pre-compressed type as shown in FIG. 22 wherein a needle is opened (recedes) by the injection pressure of the molten thermoplastic resin and is closed by the advance of needle forced by means of a loaded spring when the injection pressure is removed.

Incidentally, FIG. 21 is a drawing depicting a shutoff nozzle with a structure having a slide type valve operated mechanically.

In the injection molding machine or the extruder, etc. that processes a thermoplastic resin, because during the plasticization stage the foaming gas is generated from a liquid foaming agent by the heat of the heating cylinder, the system is so configured that, by setting the back-pressure a little higher, the generated foaming gas may disperse finely and dissolve under pressure into the molten resin in the heating cylinder to derive a molten thermoplastic resin provided with foaming properties.

In the case of injection molding machine, if the back-pressure is lifted after completing the measurement, the molten resin in the heating cylinder, as it is provided with foaming properties, foams and pushes back (reverse) the screw. Consequently, in the injection molding machine, after the completion of measurement, it is desirable to maintain the screw position without lifting the back-pressure and to keep on maintaining the back-pressure.

The present inventor named this manoeuver "back-pressure block" [end back-pressure (EBP)].

Incidentally, the setup value of back-pressure varies depending on types of resin. In the case where we use the injection molding machine equipped with a hydraulic pump with discharge pressure at 140 $kg/cm^2$, an approximate range of pressure indicated on a hydraulic pressure gauge of 5 $kg/cm^2$-30 $kg/cm^2$ or higher can be applied. Generally speaking, the pressure actually applied to the molten resin in the heating cylinder can be higher than approximately 10 $kg/cm^2$ or higher, and the optimum value is set by taking into account the time needed for measurement as well as the operational requirements of a single molding cycle.

In the case where the back-pressure is raised during the measurement, the melting and kneading performance improves but the time needed for completing measurement increases and hence limits the rate of unit molding cycle and reduces productivity. For this reason, the back-pressure is set at a value so as to complete the measurement by the injection time within a single molding cycle.

In regard to the above mentioned back-pressure block, if it is simply an application of a certain level of pressure acting on the screw after the completion of plasticization of the thermoplastic resin, the screw recedes due to the pressure of foaming in the heating cylinder (force generated by the tendency to foam of the thermoplastic resin provided with foaming properties in the heating cylinder). As a result of the receding action, the molding machine reacts with a force to push back the screw to the previous position. However, if this reactive force is too great, the screw may advance too far. On the other hand, if the reactive force is reduced, the above mentioned force by foaming will push back the screw (make it recede) and when it deviates from the position of completion of measurement, again it is made to advance.

As the screw migrates (oscillates) forward and backward in this way, if the injection is carried out at an advanced position of the screw, short mold is likely to occur, and if the injection is carried out at a retreated position, over-pack may result. While the problem is not limited to foam molding, the weight variation of molded articles leads to a low precision in dimensions (variation). Particularly in foam molding, this (screw oscillation) causes the variation not only in dimensions but also in the expansion factor.

The inventor has devised a system enabling the screw to stop at the position of completion of measurement by improving the back-pressure block in terms of hardware as well as software.

The shape of the screw of the injection molding machine or the extruder used for processing a thermoplastic resin shall be described.

In the case of an injection molding machine, it is preferable that the value L/D (the value obtained by dividing the screw length by the screw diameter) of the screw installed in the heating cylinder is larger than 15 or preferably than 18 as a higher kneading performance can be expected then. In the case of an injection molding machine, because the temperature increases due to shearing and the occurrence of burns is feared in certain types of resin, the best suited screw should be selected.

In designing the screw shape, as the need arises, with a view to augmenting the kneading performance and the adequate dispersion and pressurized dissolution of foaming gas, it is also possible to make the flight (groove (helical groove)) shallower for achieving a high degree of compression, to shorten the pitch, to double the flight, or to provide the Dulmage. The compression ratio is the rate of compressed volume per pitch of the groove and determined by taking account of the good balance between the condition of fusion of thermoplastic resin and the spontaneous heating due to shearing.

An injection molding machine can be designed also as one having two screws of high kneading performance that are often provided on an extruder for manufacturing pellets of thermoplastic resin. For example, in the case where two screws are provided for SODEC's screw preplasticating type injection molding machine, it is easy to produce injection-molded articles of, for example, PC/ABC alloy by carrying out the injection molding by blending either pellets or powder of polymers like PC and ABS. As the thermal history that a thermoplastic resin undergoes is less significant, the degradation of physical properties is less and therefore the number of pelletization steps in the extruder is saved and the operation becomes economical.

In the case of extruder, as the plasticization is carried out continuously, the operation can be performed by the screw with an ordinary value of L/D. In certain cases, where necessary, a double-grooved section or a Dulmage section may be provided in a single stage or in multiple stages.

In the case of an injection molding machine, for the purpose of plasticizing a thermoplastic resin evenly and obtaining high compression, a method is available, as in the case of Dynameltor of Meiki Co., Ltd., whereby the resin volume fed into the heating cylinder can be controlled at a constant level by providing a small feed screw at the bottom of the hopper and controlling its rotational speed. This method is applicable to an extruder as well.

The processing of a resin by using a liquid foaming agent can be implemented by a single method alone, but in certain types of combination with other molding methods, further novel functions and effects can be expected.

In the following sections, the methods applicable to the injection molding of the thermoplastic resin shall be described.

In the beginning, the representative techniques of foam molding in the injection molding of thermoplastic resins shall be described.

There are many of these techniques. For instance, we can cite: UCC method, SS (short shot) method, breathing-tool method, USM method, TAF method, mixed-process method, Allied Chemical Corp. method, EX-Cell-O method, Battenfeld method (sandwich molding, Co-SF), GCP method [with contents referred to as "OGCP" in the present invention], NSF (New-SF) method, MuCell, AMOTEC, etc.

The method of UCC (Union Carbide Corp.) of the USA is the technique whereby the molded articles of thermoplastic resin with foamed structure can be obtained by: providing foaming properties to the molten thermoplastic resin in the process of plasticization by injecting the nitrogen gas into it and agitating it; transferring the molten resin thus prepared to the accumulator and storing it therein; pushing down the accumulator to fill the mold cavity with the molten thermoplastic resin provided with foaming properties. The method resembles closely the MuCell method, etc.

The short-shot (SS) is a technique for carrying out a molding operation with a thermoplastic resin having foaming properties that have been provided by: mixing a physical or chemical foaming agent with pellets of thermoplastic resin; plasticizing and kneading the said mixture; creating foams by gasifying the said physical foaming agent or by pyrolyzing or processing otherwise the said chemical foaming agent by means of the heat in the heating cylinder of the injection molding machine. In the said technique, as the molten thermoplastic resin to fill the mold cavity is injected with a short-shot instead of with a full-shot and made to expand and foam in the mold, it is called the short-shot method.

The breathing-tool method is a technique to cause foaming in a thermoplastic resin with foaming properties injected into the mold cavity, by increasing the volume of mold cavity by moving a part of the mold after injection with a view to reducing the pressure of the molten thermoplastic resin injected into the mold cavity.

The similar effect is realized also in the case where a molten thermoplastic resin provided with foaming properties in the mold cavity is made to foam by reducing its pressure by retracting [backing (making a suck-back with)] the screw after feeding (injecting) into the mold cavity the thermoplastic resin provided with foaming properties.

The USM method and the TAF method are the techniques to cause foaming in the molten resin provided with foaming properties injected into the mold cavity by reducing the pressure after the said resin has been injected into the mold cavity, wherein the pressure is reduced by opening the parting line of the mold (PL: in this case, a "vertical parting line" is adopted with a view to preventing the leak of the resin provided with foaming properties in the mold cavity). The USM method is a technique of the USA and the TAF method is a foaming technique developed jointly by Toshiba Machine Co., Ltd. and Asahi-Dow Ltd. (Asahi Kasei Corp.).

The mixed-process method is a technique to create a thermoplastic provided with foaming properties by mixing a foaming agent and the molten non-foaming thermoplastic resin in a section within the nozzle on the injection molding machine. Moreover, in a certain application of the mixed-process method, the foaming properties may be created by mixing a foaming type thermoplastic resin and non-foaming type thermoplastic resin.

In the above-described methods, foams are formed as far as the surface, leaving swirl marks (foaming stripe pattern), flashes, silver streaks, etc. Consequently, in cases where the products are used as exterior articles exposed to human eyes, a surface treatment like painting was required.

Consequently, as a method to beautify the exterior appearance, the EX-CELL-O method is available wherein a plural number of nozzles are used to inject (fill the mold cavity with the melt) quickly at a high pressure before the surface foams and then the product is cooled and solidified to derive a clean surface.

As another method to beautify the exterior appearance, the Battenfeld method is available, wherein the mold is filled with melt while a layer of thermoplastic resin with foaming properties is being sandwiched between two layers of non-foaming thermoplastic resin.

In the injection molding process, swirl marks appear on the product surface, because foams are formed as soon as the injection of a molten resin with foaming properties starts. This situation is not different at all from that experienced when the MuCell method etc. or at least one of those conventional physical or chemical foaming agents is applied. These existing techniques can be applied for products for exterior usage where the swirl marks present no problem in the actual utilization or for the molded articles in which the swirl marks are utilized as an ornamental pattern. However, in the case where a pretty appearance is required, the articles are made to wait for dissipation of the internal gas first and then sandpapered (sanded) or painted as the need arises. In the case where there are swirl marks on the surface, the impact resistance is reduced due to the notch effect.

The means to eliminate swirl marks are described next.

Figure 23:
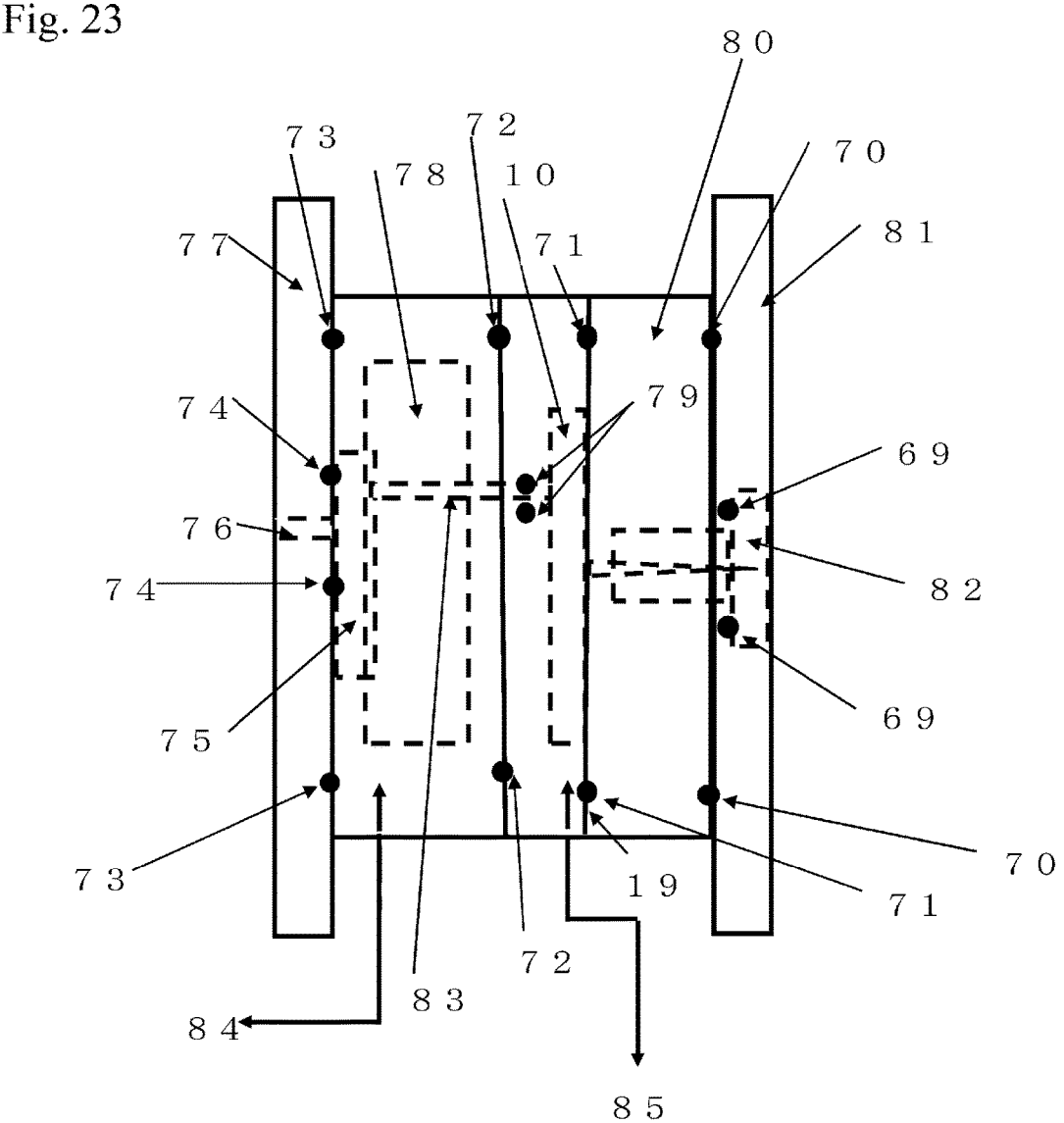
FIG. 23 is a schematic representation of a sealed mold.

There is the GCP (gas counter pressure) method for deriving a foam molded article with clean appearance, wherein by using the sealed mold described in FIG. 23 and FIG. 25, after the inside of the mold cavity is pressurized in advance by means of air, nitrogen gas or carbon dioxide gas (for example the pressurization gas 89 shown in FIG. 24), a molten thermoplastic resin provided with foaming properties is injected, and then the pressurization gas is blown out (discharged) to the atmosphere at a selected timing.

In the present invention, the GCP is differentiated into OGCP and IGCP, wherein the OGCP is applied to obtain a clean exterior (outer) appearance and the IGCP for deriving a molded article with a high expansion factor through an internal (inner) means of approach.

In the following paragraphs, the OGCP shall be described.

FIG. 23 is a drawing to show the structure of the sealed mold for carrying out the OGCP.

Figure 24:
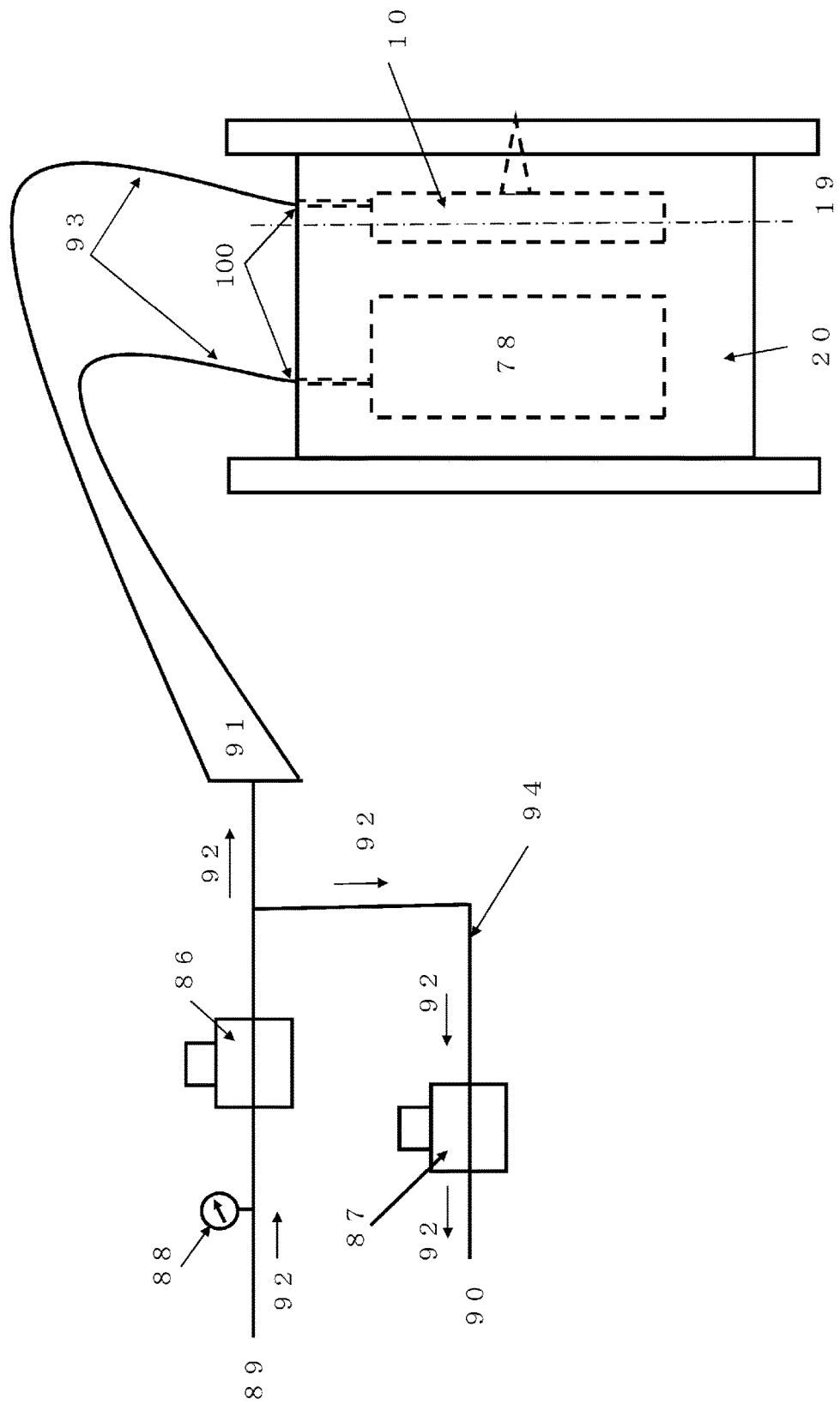
FIG. 24 is a schematic representation of the structure of a device to pressurize the inside of a mold cavity.

FIG. 24 is a drawing to describe the structure of the device for pressurizing the inside of the mold cavity for carrying out the OGCP.

The code 78 is the ejector box.

As shown by the code 79, instead of sealing each of ejector pins with an O-ring, the entire unit of ejector mechanism is enclosed in a form of box, and by this structure it has become possible to provide the sealing function and effect equivalent to or higher than those realizable by sealing respective ejector pins.

The code 79 illustrates by an example the structure for sealing the ejector pin by an O-ring.

The present invention does not use this sealing structure but has adopted a box structure shown as ejector box 78.

In order to distinguish this means (before injecting a molten thermoplastic resin provided with foaming properties into the cavity of sealed mold, the cavity is pressurized in advance) from another means (IGCP) to be described later, the present invention terms this means the OGCP (Outer Gas Counter Pressure).

The gas used in the OGCP needs not be a single type but several types of gas, for example, air and nitrogen gas or air and carbon dioxide gas can be mixed. In the case where discolorations and burns occur, as this means can lower the oxygen concentration, it is possible to avoid the said problem of discolorations and burns. The OGCP can be carried out only with nitrogen gas or carbon dioxide gas. Since the nitrogen gas is expensive, the inert nitrogen gas is used for the mold cavity that has a smaller volume and the inexpensive air is used for the ejector box that has a larger volume.

In the case where the alcohol vapor or the ether vapor is mixed with air or nitrogen gas, etc. and used in the OGCP, as these vapors dissolve into the resin at the end of flow, the transcription performance of resin improves. In such a case, if an alcohol or an ether is used as a foaming agent, the transcription performance of resin improves furthermore.

In order to obtain molded articles with a high expansion factor, there is available the NSF method that has been developed by Asahi Kasei Corp. (Asahi-Dow Ltd.), wherein the said OGCP is carried out by blowing the high pressure nitrogen gas through the nozzle of a molding machine into the molten thermoplastic resin provided with foaming properties injected into the mold cavity.

It has been mentioned that the OGCP technique is available as a means for obtaining the injection-molded articles presenting clean appearance. The OGCP signifies a molding method comprising the steps of: pressurizing in advance the sealed mold cavity wherein such parts as PL etc. have been sealed by using O-rings, thin rubber sheets etc., by means of gas including air, nitrogen gas, carbon dioxide gas etc. with a pressure higher than the atmospheric pressure; injecting a molten thermoplastic resin provided with foaming properties into the said mold; and discharging the said pressurized gas into the atmosphere. In the OGCP, the gas that is used first for pressurizing the sealed mold cavity for the purpose of suppressing the foaming of the resin provided with foaming properties is called "pressurization gas".

The pressure of a pressurization gas is determined by the additive amount of a foaming agent (liquid foaming agent, foaming gas, etc.), and if a larger amount of foaming agent is added, the foaming power increases and hence a higher pressure of the pressurization gas is required. The pressure is higher than 0.5 MPa, preferably than 0.8 MPa, and furthermore preferably than 1.0 MPa. Although the operation can be carried out at a pressure higher than 2.5 MPa, the molding at a high pressure entails dangers and at the same time, as the gas volume inside the mold cavity is larger, causes a short-shot mold or, when the air is used, as the oxygen amount increases to the same extent as the pressure is increased, the problem of discolorations and burns in molded articles is feared.

When the pressure in the mold cavity is lowered by blowing out or retrieving the pressurization gas inside the mold cavity at the moment: when the molten thermoplastic resin provided with foaming properties is injected into it partially or fully; when the injection is still in progress (the predetermined volume of injection is attained); immediately after completing the injection; or after an elapse of a predetermined length of time following the completion of the injection, the foaming power (a foaming gas in the thermoplastic resin that has so far been suppressed by the OGCP) causes foaming as a result of the removal of the external pressure (pressure of the pressurization gas). The molten thermoplastic resin provided with foaming properties that has already reached the mold surface by the time of blowout of the pressurization gas, having already got in touch with the mold surface, cooled and solidified, does not foam in the surface area. In the internal portion of the molded article where cooling and solidification have not yet been completed, the melt foams. A molded article obtained by this means has a non-foamed layer (skin) and an internal foamed layer, and presents clean appearance.

Descriptions shall be made on the sealed mold used in the OGCP technique in reference to FIG. 23. The PL is graved with a dovetail groove so that the O-ring 71 does not disengage. The interspaces around the knockout pins (the inlet holes 76 of the ejector rods of the molding machine), between the fixed (cavity) mold plate 80 and the mounting plate 81, between the spool bush 82 and the mounting plate 81 on the stationary side, and between the lower plate (holding plate of ejector pins) of the ejector plate 75 and the mounting plate 77 on the mobile (core) side, are also sealed with O-rings 69, 70, 72, 73 and 74. However, the O-rings 74 are set in a dovetail groove similar to that in the PL so that they don't disengage.

As shown by 79, each of the ejector pins can be sealed separately by an O-ring, but as there is a problem in the sealing effect of O-rings, if the entire unit of ejector pins and ejector plate 75 is enclosed in a box (ejector box 78) and sealed off (O-rings 72, 73), it is not needed to seal each of ejector pins separately, and consequently this configuration provides a better solution. It is needless to say that the mold equipped with a slide core is sealed by mounting O-rings on the PL surface etc. of the slide core similarly as for the PL. Rubber sheets can also be pasted instead of O-rings.

FIG. 24 shows an OGCP device. Upon receiving a mold closing command signal from the molding machine, the solenoid valve 86 for injecting the pressurization gas into the mold cavity and the ejector box is opened, and the gas (pressurization gas) compressed by a compressor etc., e.g., the air is injected into the mold cavity 10 and the ejector box 78 through the inlet port 100 of pressurized gas. This operation is also called pressurization [also precompression, compressed air, outer gas counter pressure (OGCP), etc.]. As mentioned above, these pressurization gasses are blown out by opening the blowout (atmospheric discharge) valve 87 while the injection of resin is still in progress or immediately after completing the injection, etc., simultaneously with or after the closing of the solenoid valve 86. The device in FIG. 24, as illustrated, can be utilized as a single unit for the inside of the mold cavity 10 as well as for that of the ejector box 78, and in certain cases where the size of a molded article becomes large, the device may be divided to provide one unit for the mold cavity 10 and the other unit for the ejector box 78 and to make the two units operate in parallel. The OGCP's entry into or exit from the mold cavity in FIG. 23 is carried out by way of the pressurization gas vent (degassing groove) 98 provided in the PL as shown in FIG. 25, and clearances around the ejector pin 83. 88 indicates a manometer for the pressurization gas, 89 indicates the pressurization gas compressed by a compressor etc. including the air, 90 indicates the pressurization gas discharged to the atmosphere, 10 indicates the mold cavity, and 100 indicates the entry or exit port of the pressurization gas into or from the ejector box 78 and the mold cavity 10. 92 indicates the flow of pressurization gas, 94 indicates the ductwork of pressurization gas, 93 indicates the flexible air-hose and 20 the mold.

FIG. 25 shows the structure for introducing or blowing out the pressurization gas into or from the mold cavity in the OGCP. 81 indicates the mounting plate on the stationary side, 80 indicates the mold plate on the stationary side, 71 indicates an O-ring in the PL. 95 indicates the circuit of entry and exit of pressurization gas, and 98 indicates the vent of pressurization gas having such a thickness as to allow the passage of the pressurization gas but not to allow that of the molten resin provided with foaming properties, wherein in the case of ABS, the vent is designed to have a thickness of less than 250 μm and a width of about 10 mm to 20 mm which varies depending on the shape of molded article, and a length of about 5 mm. The PL is provided with: gas groove 97 of the circuit of pressurization gas; pressurization gas circuit 96 of PL; mold cavity 10; PL 19; guide post 99; inlet port 100 for connecting with the OGCP device shown in FIG. 24 for entry or exit of pressurization gas into or from the mold; and spool 101. In the OGCP device, the flexible air-hose 93 in FIG. 24 is connected to the entry port 100 for pressurization gas, and the pressurization or the blowout of the mold cavity is carried out by way of the pressurization gas circuit 96, pressurization gas circuit 97 and the pressurization gas vent 98 of the PL in FIG. 25.

In order to obtain a foamed injection-molded article presenting clean appearance by means of the OGCP, the injection volume of the liquid foaming agent presented by the present invention and the additive amount of a commercially available foaming agent are important. In the case where the additive amount of a foaming agent is too large, the foaming cannot be controlled by the pressure of a pressurization gas, causing the surface to foam and swirl marks to appear. On the other hand, in the case where the additive amount of a foaming agent is too small, the foaming power is insufficient and the molded articles with visible sink marks result. This is the reason why it is necessary to control the volume of a liquid foaming agent and the additive amount of a commercially available foaming agent. In order to obtain a foam-molded article of thermoplastic resin having clean appearance in the case where the OGCP is applied, the control of the injection volume of a liquid foaming agent and the additive amount of a commercially available foaming agent in proportion to the volume of thermoplastic resin is one of the necessary conditions.

A molded article obtained by this means has a structure having a clean skin layer on the surface and an internal foamed layer. The OGCP possesses the function and effect to suppress the foaming of the resin provided with foaming properties injected into the mold cavity by exerting a pressure from an external source (outer).

There is a report that in the case where the carbon dioxide gas is used for the OGCP, the gas dissolves into the molten thermoplastic resin in the mold cavity and the melt mobility improves. Furthermore, in the case where the carbon dioxide gas is used as a foaming gas, the mobility of a molten resin provided with foaming properties improves. Furthermore, in the case where the OGCP is used for the injection molding of a composite material such as an ABS resin containing 20 wt % of glass fiber, it provides the function and effect of reducing the floating of glass fiber.

(Means of Obtaining a Clean Surface)
(Practices in the Battenfeld Method)

The Battenfeld method is a type of injection molding technique consisting of two injection units wherein the one unit has a molten thermoplastic resin without foaming properties plasticized and the other unit has a thermoplastic resin containing a foaming agent plasticized, and firstly the thermoplastic resin without foaming properties is injected into the mold cavity and later the thermoplastic resin provided with foaming properties is injected into the said thermoplastic resin without foaming properties. The Battenfeld method enables to obtain a molded article with a clean surface since the operation is carried out so that the injected materials may flow through the mold cavity while the inner portion (inner core layer) of thermoplastic resin with foaming properties is sandwiched (inserted) between the surface skin layers of non-foaming thermoplastic resin. However, the Battenfeld method produces an article with unclean appearance if the intended article has a complex shape or openings, because the inner core layer appears to the surface. Besides, as the inner core layer does not reach the endpoint of resin flow, a thick skin layer only is formed and sink marks appears. These are fatal defects of the Battenfeld method.

The problem of sink marks can be solved by making the skin layer also with a thermoplastic resin with foaming properties in combination with application of the OGCP technique to obtain molded articles of clean appearance without sink marks.

A molded article without sink marks having a highly-foamed inner part can be obtained by using the liquid foaming agent of the present invention in the skin layer as well as in the core layer, increasing the amount of the liquid foaming agent injected into the core layer and injecting it into the skin layer in a moderate amount just enough to prevent sink marks. Needless to say, an equal amount of liquid foaming agent can be injected into the core layer as well as into the skin layer.

The foaming agent used for the skin layer needs not be restricted to a liquid foaming agent but a physical or chemical agent can be used as well, and the use of a liquid agent in the inner layer, or the use (specification) of the opposite disposition is also possible.

It is also practicable to adopt the combination of a liquid foaming agent used in the skin layer and a thermoplastic resin provided with foaming properties that has been prepared by a method such as MuCell and is used in the core layer.

(Means to Increase the Expansion Factor)
(Breathing Tool Method)

In the injection molding process, it is possible to obtain a molded article with a high expansion factor by reducing, in order to facilitate foaming of the melt, the pressure of the molten thermoplastic resin provided with foaming properties that has been injected into the mold cavity, by moving a part of the mold to increase the volume of the mold cavity (this is called "breathing") after it has been fully filled with the molten thermoplastic resin provided with foaming properties.

Breathing can be made at a single point or at several points. In the case where breathing is made at several points, it can be made simultaneously or at staggered timings.

The same effect as breathing can be expected by maneuvers in which first the ejector pin is kept at an advanced position and later retracted simultaneously with or at a delayed time after the injection of a molten thermoplastic resin provided with foaming properties. As a matter of course, the movement of the said ejector pin can be used in combination with breathing. The application in combination with the OGCP enables to obtain molded articles with clean appearance.

(Dummy Shape)

Figure 26:
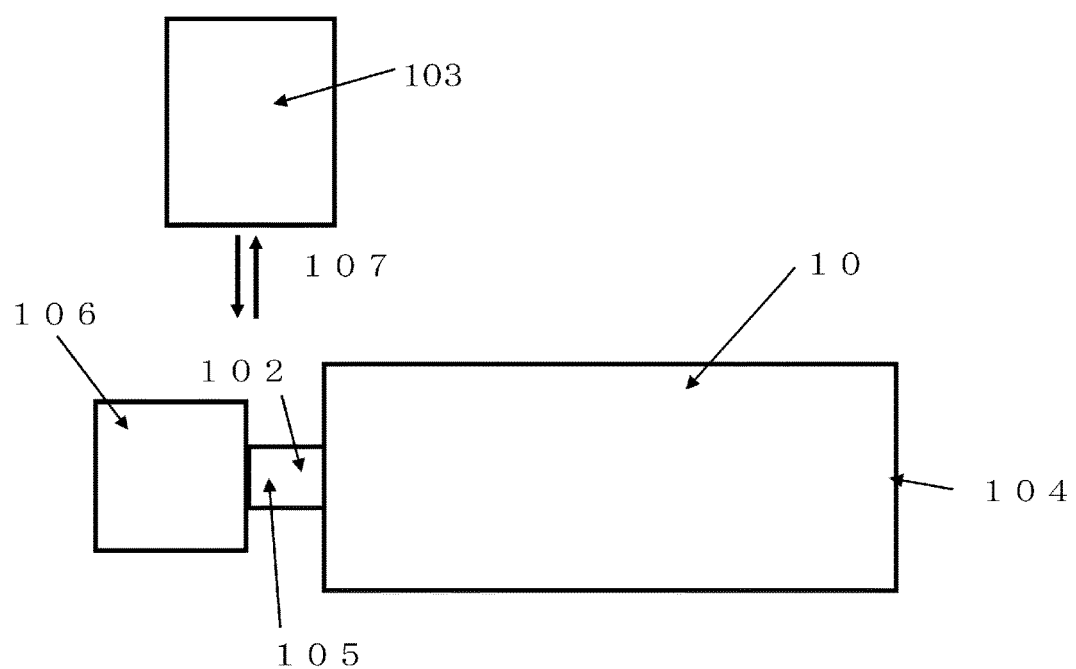
FIG. 26 is a schematic representation to describe the concept of dummy configuration.

FIG. 26 is a diagram to illustrate the concept of a dummy shape 106 provided on the mold. A shape having nothing to do with the shape of a molded article (dummy shape, disposable shape, or disposable cavity) is provided within the mold cavity for injection molding 10. If a molten thermoplastic resin provided with foaming properties is injected into the mold cavity 10 as well as into the dummy shape 106 illustrated in FIG. 26 so as to fill only partially the latter, since such an injection in respect to the total spatial volume of mold cavity including the dummy shape results only in a short-shot, the injection pressure of the molten resin provided with foaming properties decreases and the foaming process is facilitated.

An opening-closing gate 102 is provided in the passageway before the dummy shape. If the gate 102 is kept closed before injection but opened simultaneous with or a little later than the injection of a molten resin provided with foaming properties by means of the driving device 103 of the opening/closing gate to reduce the pressure of the molten resin provided with foaming properties, the foaming process is facilitated.

The dummy shape can be plural in number. In the case where an opening/closing gate is provided, the timing of opening the opening/closing gate can be simultaneous or at staggered timings with the injection of the molten resin. The resin in the dummy shape 106 can be crushed and used as it is or pelletized as needed for reuse (recycling). If the OGCP is applied in combination with the dummy shape, molded articles with clean appearance can be obtained. The application in combination with the IGCP enables to obtain molded articles having hollows and a high expansion factor.

(Suck-Back of the Screw)

In injection molding, if the screw is retracted to a predetermined position immediately or after the elapse of a certain period of time after the injection of a molten resin provided with foaming properties into the mold cavity (suck-back after injection), the pressure of the molten resin provided with foaming properties injected into the mold cavity decreases and the foaming process is facilitated. If the OGCP is applied in combination with the suck-back of the screw, molded articles with clean appearance can be obtained. In the IGCP, the execution of suck-back can improve the expansion factor.

[TAF {Toshiba Machine Co., Ltd./Asahi-Dow Ltd. (Present Day Asahi Kasei Corp.) Foam}, USM. $H^2M$ (Higher Hollow Mold)]

In the injection molding process, TAF and USM are foaming techniques wherein the mold is opened (make the core go back, retract the core, make a recession, make the mold recede) to cause foaming, and USM is a technique for obtaining molded articles with a high expansion factor wherein the recession is carried after the injection of the molten thermoplastic resin into the sealed mold cavity that has been pressurized in advance by the OGCP. The recession movement can be carried out on the cavi (stationary) side as well.

The $H^2M$ is a method, after having injected a non-foaming thermoplastic resin into the mold cavity and after having temporarily suspended mold-clamping or reduced mold-clamping force, to have a large (higher) hollow created within a molded article by opening the mold by means of the expansion pressure (pressure to create hollows) developed by creating hollows within a molded article through effecting the expansion of a molten thermoplastic resin provided with foaming properties by the pressure of a highly compressed gas that has been injected into the mold cavity through at least one of the three access means in the injection molding machine, i.e., nozzle, spool runner and direct access to the mold cavity. The method enables to create a rib at any part within a hollow by opening a part of the mold at a delayed timing by a certain mechanical or an alternative action. Needless to say, the method can be applied by using a foaming thermoplastic resin. Incidentally, in TAF, USM and $H^2M$ as well, the application in combination with the OGCP enables to obtain molded articles with clean appearance. It is a type of injection molding process technique for obtaining foam molded articles of a thermoplastic resin, wherein a thermoplastic resin provided with foaming properties is injected with a short-shot into the sealed mold described in the OGCP that has been pressurized in advance at around 1 MPa, and then high pressure nitrogen gas is injected to expand (inflate, blow) the resin to fill the mold cavity completely with it in every hole and corner, and then the pressurizing gas is blown out, and the nitrogen gas in the molded article is blown out or retrieved, to reduce the inside pressure and make the foaming start toward the inner portion. The technique enables to obtain molded articles with clean appearance and a high expansion factor.

[Gas-Assist (Hollow) Molding]/[Inner Gas Counter Pressure (IGCP)]

While all of those techniques including GaSty Category 2 disclosed by the present inventor, AGI, Sympress, GIM, Airmold, Gain Technology, etc. relate to the hollow injection molding of non-foaming thermoplastic resin, they are applied to the injection molding process of thermoplastic resins provided with foaming properties.

A molten thermoplastic resin provided with foaming properties is injected into the mold cavity with a short-shot or a full-shot, and then a compressed high pressure gas is injected directly into (the inside of) the resin provided with foaming properties filling at least one of the three access means in the injection molding machine, i.e., nozzle, spool runner and direct access to the mold cavity, at plural points where needed, to create hollows. If then the injected gas is blown out or retrieved before the inner portion of the molten thermoplastic resin provided with foaming properties cools down and solidifies completely (while the resin is still in a molten state and presents capacity to foam), as the pressure suppressing the foaming of the foaming gas within the thermoplastic resin provided with foaming properties is reduced, the said gas starts to foam toward the inner hollow part of the molded article. The present invention calls this process the pressurization from the inner portion (inside) [(inner gas counter pressure (IGCP)]. The application of this means enables to obtain a molded article having a hollow portion as well as a foamed portion and a molded article with a high expansion factor. The application of this method in combination with the OGCP enables to obtain molded articles with clean appearance.

[Gas Injection Press (Compressed Air) Molding]

As a means for improving the transcription conforming to the mold in the injection molding process, there are such methods as GaSty category 3, GPM (gas press mold) and GPI (gas press injection, injection compressed air molding [also simply called "compressed air molding"]), wherein after the mold cavity has been filled with a non-foaming thermoplastic resin, a high pressure gas is made to affect a part or the entire part of the surface of a molded article (the clearance between the molten thermoplastic resin and the mold cavity), from at least either the stationary side or the mobile side of the surface of the molten thermoplastic resin within the mold cavity. These methods can be applied by using a foaming thermoplastic resin as well, wherein, if a high pressure gas is used at first to push (press) the molten thermoplastic resin provided with foaming properties injected into the mold cavity against, for example, the stationary side and then if at a selected timing the high pressure gas is blown out to the atmosphere, as the pressure suppressing the foaming is removed, the resin starts to foam as in the case of IGCP. This method is expected to provide the effects similar to those of breathing tool, TAF, USM, $H^2M$ and the like (producing molded articles with a high expansion factor). The application in combination with the OGCP enables to obtain articles with clean surface. In certain cases where the gas pressure is high, or a molded article is thick, the gas acting on the surface (for example the compression from the cavity side) may penetrate into the molded article.

In addition to aforementioned techniques, diverse techniques for foam molding process in the injection molding have been developed, including the methods for: obtaining molded articles with clean appearance by providing a heat-insulating barrier on the surface of the mold cavity to slow down the cooling and solidifying speed of a molten resin provided with foaming properties; obtaining molded articles with clean appearance by heating in advance the mold surface with superheated steam or by high-frequency induction heating, and by injecting the melt while the mold surface is kept at a high temperature, so as to melt (fuse) again the foamed surface, and the like.

(Means to Make the Surface Clean)

It is also possible to combine the aforementioned techniques for injection molding of thermoplastic resins provided with foaming properties with other methods including for example, Heat and Cool, RHCM, BSM (bright surface mold), Steam Mold, and means wherein the mold surface is provided with a heat-insulating barrier, and on top of such cases of combination, other techniques like OGCP can be added as well.

(Other Injection Molding Processes)

There are other molding processes that can be applied using thermoplastic resins provided with foaming properties, including: PFP (partial frame process) disclosed by Nippon Steel & Sumikin Chemical Co., RFM [RP Topla (running), Floating core Molding], PIM (press-injection-molding) of Fuji Xerox Co., Ltd., Allied Chemical method, 2-layer molding, 2-color molding, multicolor molding, multilayer molding, mixed color molding, injection compression molding, cast molding, rotational molding, transfer molding, compression molding, SPMold, tandem molding, press molding, and DSI (die slide injection). Certain methods may also be able to be applied in combination with at least one of those including OGCP, IGCP, and the like.

(Molding Conditions, Etc. In the Injection Molding)

The conditions of injection (filling) into the mold cavity in the injection molding of a thermoplastic resin provided with foaming properties are a high speed and a high pressure. The filling of resin by using neither pressure keeping nor cushion is a normal practice, but if a low level of pressure keeping, for example, about 30% of the highest (maximum) injection pressure for 0.5 second is applied, the reaction to the filling of the mold cavity with resin (action to push back the screw) is alleviated and the filling pressure is stabilized, and consequently the weight variation is reduced and it becomes possible to obtain a foam molded resin article with high dimensional precision and of high quality. If sink marks occur in the foam molding in the injection molding of a thermoplastic resin, measures are taken, such as decreasing the measurement, raising the temperature of the molten thermoplastic resin provided with foaming properties, increasing the mobility in the molten state, etc. The main factors influencing the dimensions of a foam molded article of thermoplastic resin in the injection molding are the temperature of the molten resin provided with foaming properties, the surface temperature of the mold, and the cooling time inside the mold cavity.

[Extrusion Molding]

The liquid foaming agent of the present invention can also be used in the application to the extrusion molding for manufacturing a foamed sheet or the extrusion molding of irregular-shaped (type) article.

(Block Molding)

"Block molding" signifies the case where a resin provided with foaming properties is poured into a cast and covered with either a pressurized or non-pressurized cap.

In the case with a thermoplastic resin, it is either heated to melt to make a thermoplastic resin provided with foaming properties by using a liquid foaming agent or firstly mixed with a foaming agent and then heated in the mold to cause foaming. In the case with a thermosetting resin, it is mixed with a liquid foaming agent and made to foam by heating the mold. In a certain case, a crosslinking agent may be added and heated to cause crosslinking simultaneously with foaming.

[Cast Molding]

"Cast molding" is a molding method whereby a resin provided with foaming properties is poured into a cast, and resembles very closely the aforementioned block molding. In the case with a thermoplastic resin, a resin provided with foaming properties by heating and melting is poured into a cast in a molten state to cause foaming. In the case with a thermosetting resin, it is mixed with a liquid foaming agent and filled into the mold and made to foam by heating the mold.

A foamed polyethylene is obtained by mixing a polyethylene with benzoyl peroxide and a liquid foaming agent, and heating and melting the mixture to cause foaming simultaneously with forming crosslinking. A foamed polypropylene is obtained through similar steps by using a polypropylene. The polyethylene and polypropylene, etc. obtained by this method can be used in block molding and extrusion molding.

(The first form of embodiment)

A liquid foaming agent of the present invention can be applied in the Co-SF. In this case, a liquid foaming agent of the present invention is used to provide forming properties to a thermoplastic resin of the core layer but the outer skin layer can be left as a solid layer. In the case where the sink marks at flow ends become a problem, the skin layer also is made of a thermoplastic rein provided with foaming properties. In such a case, either a commercially available foaming agent or a liquid foaming agent can be used.

Moreover, in order to obtain clean appearance, it is needed to use the OGCP. In order to improve the expansion factor, it is needed to use it in combination with any one of other techniques such as dummy shape, breathing tool, USM, TAF, H²M or the like.

(The second form of embodiment)

Regarding a liquid foaming agent of the present invention, the nitrogen gas generated by reaction due to contact between NaBH4 and an acid, etc. can be used as a foaming gas. Incidentally, for the nitrogen gas generation, the devices shown in FIG. 3 and FIG. 35 can be used.

(The third form of embodiment)

If an emulsion type liquid foaming agent prepared by emulsifying an organic solvent (e.g., pentane) in water by using a surfactant is agitated as shown in FIG. 8 and kept homogeneous until it is injected into the heating, it can be applied also in extrusion molding or in injection molding.

(The 4th form of embodiment)

As ADCA is insoluble in water and alcohols, if a suspension type foaming agent suspending it in a solvent is agitated as shown in FIG. 8 and kept homogeneous until it is injected into the heating, it can be applied also in extrusion molding or in injection molding.

(The 5th form of embodiment)

A thermoplastic resin provided with foaming properties by using a liquid foaming agent can be put into practical use (applied) also in the injection molding of a 2-layer molded article. In concrete terms, it is possible to manufacture a molded article of 2-layer structure having a solid front side (solid layer) and a foam-molded back side, by first molding a solid surface (front side, decorative side) layer and then rotating or inverting it and injecting onto the back side of the said solid article a thermoplastic resin provided with foaming properties.

Needless to say, in order to improve the expansion factor of molded articles, the 2-layer molding technique can be used also in combination with any one of other techniques such as dummy shape, breathing tool, USM, TAF, H²M or the like. Furthermore, it is also possible to carry out the foam molding for obtaining a clean surface by using the OGCP, the blow molding in the solid layer as well as in the foamed layer, or to carry out the GPI.

(The 6th form of embodiment)

The thermoplastic resin provided with foaming properties by using a liquid foaming agent can be used in the techniques for obtaining molded articles with clean appearance by increasing the surface temperature of the mold including HEAT & COOL, BSM, Steam Mold, etc. Furthermore, by using the OGCP, molded articles with clean appearance can be obtained. What's more, the combination with other techniques like USM, TAF and the like as shown in the aforementioned 5th embodiment is possible also in the 6th embodiment.

For heating the mold in the method such as HEAT & COOL, a magnetic fluid can be used as well by a process in which the temperature of such a fluid is raised by high-frequency induction heating or by electromagnetic induction, and the said magnetic fluid is used as a heat medium. The raise of the surface temperature of mold through such means produces such effects as reduction of the occurrence of swirl marks and diminution of the amount of condensation of a liquid foaming agent on the mold surface, etc.

(The 7th form of embodiment)

By using a thermoplastic resin provided with foaming properties by a liquid foaming agent, it is also possible to carry out a molding process of various types, i.e., in-mold transcription, film transcription, in-mold molding, insert molding, outsert molding, etc.

(The 8th form of embodiment)

The mobility of a thermoplastic resin provided with foaming properties is higher than that of a non-foaming type thermoplastic resin. Consequently, for manufacturing molded articles requiring a faithful transcription conforming to the mold such as lens, mirrors, light guide plates, etc., the thermoplastic resin is provided with foaming properties by using a substance leaving no residue such as an alcohol, an ether, the carbon dioxide gas generated by the vaporizer/generator unit 22 of FIG. 3, etc., and the prepared resin is injected into the mold cavity at a high speed and a high pressure, and then subjected to a high pressure keeping, and the mold is compressed if necessary to reduce the size of foaming cells or eliminate them completely to obtain molded articles presenting a faithful transcription conforming to the mold. A liquid foaming agent like an alcohol and an ether has the function and effect to augment the mobility of a molten thermoplastic resin by providing it with foaming properties.

(The 9th form of embodiment)

The foamed structure of a phenol resin can be obtained by mixing the phenol resin before molding with a liquid foaming agent consisting of, for example, a 1:1 mixture of water and ethanol, and then injecting the mixed resin into the mold and heating it.

(The 10th form of embodiment)

The foamed structure of a BMC can be obtained by using a BMC (Bulk Molding Compound) of unsaturated polyester instead of the phenol resin in the 9th form of embodiment.

(The 11th form of embodiment)

The foamed structure of a silicone rubber can be obtained in a molding process of the silicone rubber by using a liquid foaming agent consisting of a single ingredient of water, an alcohol or an ether or a mixed solution of them. The means for molding the foamed structure of a silicone rubber can be any process among injection molding, extrusion molding, and block molding of non-compressed type or compressed type.

(The 12th form of embodiment)

Soft molded articles containing a paraffin oil can be obtained by injecting separately into the heating cylinder an aliquot of 20 wt % of a paraffin oil and an aliquot of 8 wt % of sodium bicarbonate water in proportion to the weight of a styrene-based elastomer by using the device shown in FIG. 6. Here, the sodium bicarbonate water can be replaced with ethanol, dimethyl ether or a mixed solution of these substances.

(The 13th form of embodiment)

An embodiment in cast molding or block molding is possible by pouring into a cast or a mold a styrene-based thermoplastic elastomer containing a paraffin oil that has been prepared by starting from a molding material of the 12th form of embodiment, i.e., mixture of a styrene-based thermoplastic elastomer and a paraffin oil, and then by heating and melting the mixture into which an aqueous solution of potassium hydrogen carbonate is injected to provide foaming properties.

(The 14th form of embodiment)

The 14th form of embodiment is the one applying the OGCP to the 8th form of embodiment.

In the 14th form of embodiment, first the inside of the sealed mold is pressurized by air at a pressure of between 0.5 MPa and 2.0 MPa. Into the molten resin in the heating cylinder on the molding machine, during its measuring operation, is injected an aliquot of between 0.5 wt % and 2.5 wt % of ethyl alcohol, diethyl ether or the like in proportion to the weight of the said molten resin. By this operation, the said molten resin becomes a resin presenting foaming properties into which ethyl alcohol or diethyl ether, etc. has dispersed or dissolved under pressure. The said resin presenting foaming properties is injected into the mold cavity, and then subjected to pressure keeping in order to improving the transcription performance. The compressed air that has been used to pressurize at a pressure of between 0.5 MPa and 2.0 MPa (OGCP) is blown out during injection, after completion of injection, during the resin pressure keeping, or after completion of the resin pressure keeping.

Incidentally, the gas to be used in the OGCP can be also nitrogen or carbon dioxide gas.

Furthermore, the resin to be used in the 14th form of embodiment can be any resin as long as it is a transparent resin. Transparent resins include for example: PS, AS, PC, PMMA, transparent elastomers, PET (polyethylene terephthalate), PEN (polyethylene naphthalate), MS resin, PEI (polyether imide), PES, transparent PA (polyamide), cyclic polyolefin, ZEONEX (trade name), ZEONOR (trade name), APEL (trade name), ARTON (trade name), etc.

Next, the present invention is described based on embodiments.

(Resin Used)

The resins used in the embodiments are described.

The resins used in injection molding and cast molding were: STYLAC 121 (trade name) of Asahi Kasei Corp. as an ABS resin; STYLON 492 (trade name) of Asahi Kasei Corp. as an HIPS resin; XYLON 100Z (trade name) of Asahi Kasei Corp. as an m-PPA resin; MULTILON T3714 (trade name) of Teijin Chemicals Ltd. as a PC/ABS resin; IUPILON S2000 (trade name) of Mitsubishi Engineering-Plastics Corp. as a PC resin; SUMITOMO NOBLEN H501 (trade name) of Sumitomo Chemical Co., Ltd. as a PP resin.

The resins used in extrusion molding were: STYLAC ABS A4130 (trade name) of Asahi Kasei Corp. as an ABS resin; STYLON 475D (trade name) of Asahi Kasei Corp. as an HIPS resin; GRAND POLYPRO J101 (trade name) of Grand Polymer Co., Ltd. as a PP resin.

Embodiment 1

(Device for manufacturing molded articles)

FIG. 1 is a schematic view of a manufacturing device 201 for manufacturing molded articles relating to the present invention.

The manufacturing device 201 has: heating cylinder 7 for melting and mixing a thermoplastic resin; measuring device 202 that measures in the outside of the heating cylinder the volume or mass of a liquid with a vaporization temperature lower than that of the molten thermoplastic resin in the heating cylinder; first liquid injection device 4 that injects the liquid measured by the measuring device 202 into the molten thermoplastic resin in the heating cylinder 7; and injection device 203 that injects into the mold cavity 10 the said molten thermoplastic resin into which the liquid has been injected by the first liquid injection device 4 within the heating cylinder 7.

FIG. 34 is a schematic view of a manufacturing device 201 for manufacturing molded articles by an extrusion molding process relating to the present invention.

(Heating Cylinder)

Heating cylinder 7 is a device for plasticizing a thermoplastic resin fed by the hopper 6 to turn it into a molten state. The heating cylinder is equipped with the screw 8 in the inside and the heaters on the external side (not shown). The thermoplastic resin in the heating cylinder 7 fed by the hopper 6 is heated and plasticized efficiently by the heat of the heaters and that generated by the shearing force of the screw rotation.

(Liquid injection device)

Liquid injection device 4 can suck in a liquid into the syringe 11 and discharge it outside the syringe 11 by activating the plunger 12 by a driving device 3 such as an electric motor etc. That is to say, the liquid injection device 4, by retracting the plunger 12 by the driving device 3, can receive a volume of liquid proportional to the distance of retraction of the plunger 12. Moreover, the liquid injection device 4, by advancing the plunger 12 by means of the driving device 3, can discharge the liquid from the liquid injection device 4 to inject it into the heating cylinder 7.

The liquid is stored in the cistern 1 and fed to the liquid injection device 4 through the ductwork 9 linking the cistern 1 and the liquid injection device 4. A check valve 2 is provided in the ductwork 9 linking the cistern 1 and the liquid injection device 4. The backward flow of liquid is prevented by the check valve 2 and the liquid flows only in the direction from the cistern 1 toward the liquid injection device 4.

(Measuring Device)

Measuring device 202 is an apparatus to measure in the outside of the heating cylinder 7 the volume or mass of a liquid to be injected into the thermoplastic resin in the heating cylinder 7. In other words, the measuring device 202 is an apparatus to measure the volume or mass of a liquid received in the liquid injection device 4.

In the case of injection molding, the measuring device 202 has the function to measure the volume or mass of the liquid in the liquid injection device 4 by identifying the position of the plunger 12. With the measuring device 202, the liquid volume can be given as $L\pi r^2$ wherein L is the displacement distance of the plunger 12 from the extremity of the syringe 11 having a liquid discharge port and r is the radius of the plunger 12. If the liquid has a density of B, the liquid mass can be given as $BL\pi r^2$.

In the case of extrusion molding, a plunger can be used as well, but as it is needed to inject the liquid continuously, it is preferable to use a diaphragm pump 145 as shown in FIG. 34, FIG. 35, FIG. 36, etc.

As means to obtain the displacement distance L, any type of available means can be used. For example, in the case where the driving device is an electric motor, if the displacement distance m of the plunger 12 per unit rotation of the motor is known, the distance L can be calculated by the equation L=nm. Alternatively, it is also possible to obtain the displacement distance L of the plunger 12 by mounting a magnet on the plunger 12 and by mounting on the outer surface of the syringe 11 a sensor to detect the position of the magnet.

(Injection Device)

The injection device 203 is an apparatus to inject into the mold cavity 10 of the mold 20 a molten thermoplastic resin into which a liquid has been injected within the heating cylinder 7.

(Method for Manufacturing Molded Articles)

Next the method for manufacturing molded articles by using the molding device 201 is described. The resin and other factors applied are as follows:

Thermoplastic resins: ABS (acrylonitrile-butadiene-styrene copolymer resin);
Liquid: water;
Molded article: molded article 110, of 200 mm in height, 300 mm in width and 8 mm in thickness;
Molding machine: straight hydraulic mold clamping type injection molding machine with a clamping capacity of 350 ton (Toshiba Machine Co., Ltd.);
Mold: mold (not shown) to form a side gate 108 on a molded article 110.

The driving device 3 was operated to retract the plunger 12, starting from the position at which the liquid injection device 4 contained almost no liquid, to fill the liquid injection device 4 with a portion of water stored in the cistern 1. The water mass which was determined by the measuring device 202 according to the position of the plunger 12 was 3.6 g (measuring process).

This water was injected into the ABS that was heated and melted at 240° C., kneaded and compressed in the heating cylinder of the molding machine (liquid injection process). Through this process, as the water vaporized, the molten ABS in the heating cylinder turned into the ABS provided with foaming properties. It is preferable to use purified or ion-exchanged water but tap water will do as well.

The molten ABS in the heating cylinder was injected into the mold cavity to mold a molded article 110 (injection process). The injection volume of the molten ABS in the heating cylinder into the mold cavity was selected for a value sufficient to make approximately a full-shot of 100% in respect to the volume of mold cavity. Later, when the mold was cooled down, the molten ABS was cooled and solidified to turn into the molded article 110. Incidentally, the back pressure of the molding machine at the time of measurement was selected for a value of 1.5 MPa by the indicated pressure on the pressure gauge. The rotational speed of screw diameter was set at 30 rpm. Regarding the injection conditions, the injection speed was set at 65% of the maximum injection speed and the injection pressure was set at 70% of the maximum injection pressure.

The injection of liquid foaming agent into the heating cylinder was carried out through a single fill port 5 as shown in FIG. 1 continuously from the beginning of the measurement process to its end. It was also possible to carry out the injection of water as a liquid foaming agent through two fill ports as shown in FIG. 5. simultaneously or by staggering slightly the injection timings, and furthermore it was possible to obtain foam molded articles with an almost equal level of expansion factor even if the liquid injection is carried out by using two units of the liquid injection device separately as shown in FIG. 6, measuring 1.8 g of a liquid foaming agent and injecting it through the two fill ports simultaneously or at slightly staggered timings.

When the molding operation was carried out with these conditions to make 10 shots individually, the variation of mass of 10 molded articles 110 was confirmed to be less than 0.5% and the expansion factor thereof was about 7%. Incidentally, regarding the jetting (snake pattern) occurring in the vicinity of the gate, the problem can be reduced by slowing down once the injection speed of the molten resin at the position of its entry into the mold cavity and by injecting it again at 65% of the speed and 70% of the pressure after it has passed through the gate. In order to reduce further the jetting, it is preferable to provide a concave groove 111 of 35 mm in length, 2 mm in width and 6 mm in depth in the vicinity of gate of the molded article 110 (FIG. 28). In this case, in order to make the molten resin flow smoothly it is preferable to machine every corner of the concave groove 111 to give a round chamfer of about 1 mm.

Figure 29:
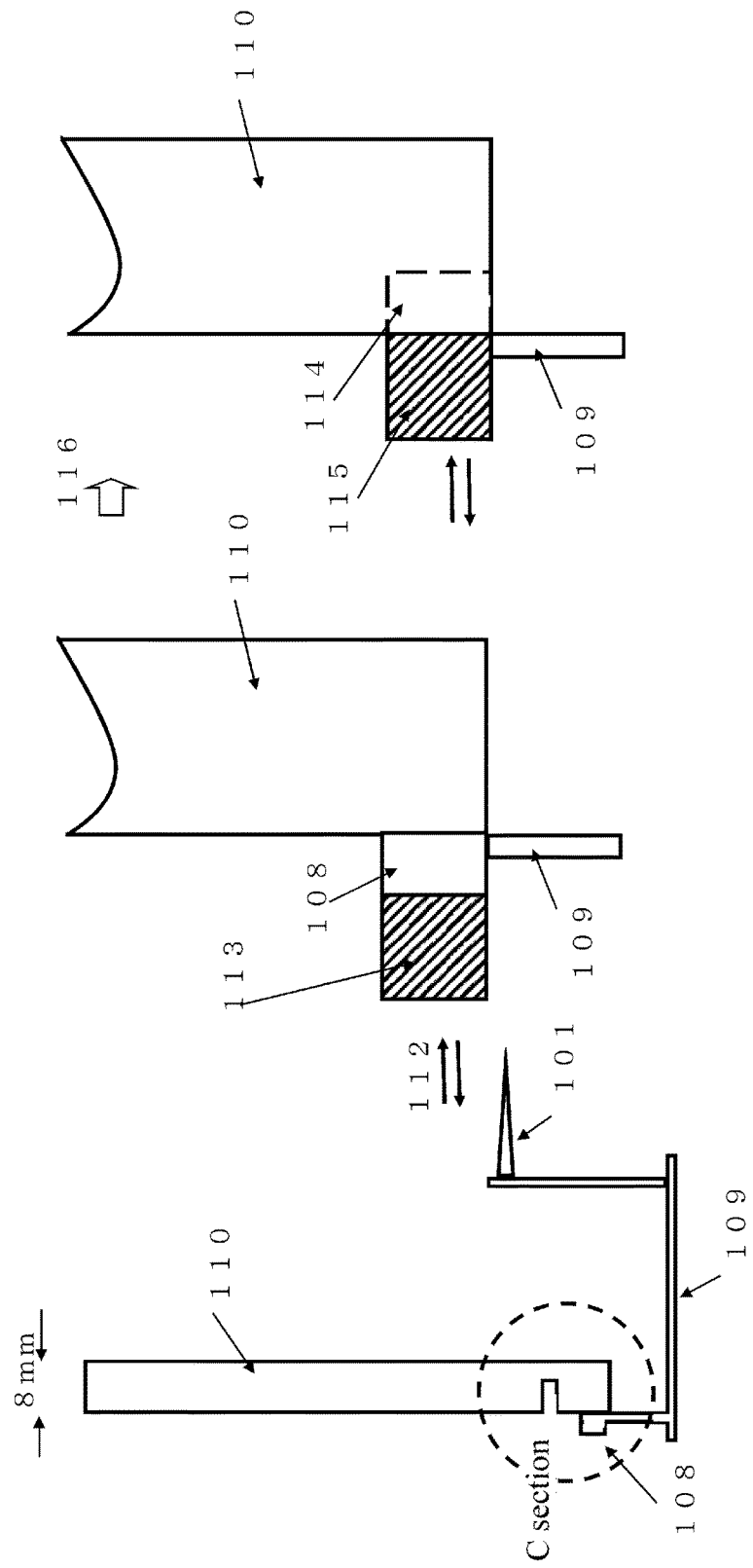
FIG. 29 is a diagram to illustrate the automatic gate disposal.

The mold for manufacturing a molded article 110 is provided with a mechanism of automatic gate disposal. In the foam molding of a thermoplastic resin, as it does not use the step of pressure keeping as in the case of solid molding, after the mold cavity was filled with the resin, and before the gate sealing occurred (the cooling and solidification of the gate portion was completed), the removal of the gate portion was carried out by pushing the gate portion into the molded article by means of a hydraulic cylinder or the like (FIG. 29).

The molded article obtained in this way has a foamed structure containing non-contiguous minute foaming cells with an approximate size of 0.05 mm to 0.5 mm and presents no sink marks on the surface but the surface of the molded article is also foamed and swirl marks are observed.

In this embodiment, talc can also be used as a foam-nucleating agent. In this case, talc was mixed with the resin and kneaded in the pelletizing step in advance. Incidentally, the foam molding can be carried out also even without using a foam-nucleating agent.

In the foam molding, as the step of pressure keeping is not used, if measures are devised to facilitate the simultaneous injection into every mold cavity, it is also possible to obtain easily numbers of differently-shaped articles at a time. Such measures include: varying the cross-sectional area of at least either runner or gate; injecting the resin into respective mold cavities by providing the structure of opening/closing gate 102 as shown in FIG. 26 on the gate portion of a molded article.

Embodiment 2

In the embodiment 2, the device of FIG. 1 was replaced by that of FIG. 2. An aliquot of 3.6 ml of water was measured out by the measuring device 202, injected into the vaporizer/generator unit 22, and heated by means of high-frequency induction heating unit to 180° C. and evaporated. The injection pressure of the water vapor was set by the pressure control valve 23, the injection volume was regulated by the flowrate control valve 26, the automatic on-off valve 158 was opened, and the water vapor was injected into the molten ABS undergoing plasticization within the heating cylinder of the molding machine over the period from the start of measurement until the end of it to provide foaming properties to the said ABS which was to be processed by molding to make molded articles by using the similar mold and molding conditions as the embodiment 1.

Incidentally, in this embodiment 2, the automatic on-off valve 158 was closed simultaneously with the end of injection, but the system can work also with the automatic on-off valve 158 kept open.

In regard to the timing for heating the vaporizer/generator unit 22, it can be heated after a liquid foaming agent has been injected into it or it can be heated beforehand and then the liquid foaming agent can be injected into it. In the embodiment 2, water was first injected into the vaporizer/generator unit as a liquid and heated and evaporated.

The fill port 5 for injecting a gasified foaming gas into the heating cylinder can be at a single location, but it can be also at two or more locations as shown in FIG. 5.

In the embodiment 2, the invention was implemented with the fill port 5 disposed at a single location as well as at two locations, and it derived an expansion factor of 7% for molded articles with respective cases.

Embodiment 3

In the embodiment 3, the water in the embodiment 1 was replaced by a 1:1 (by volume) mixture of water and methanol, and the injected volume was 5 ml. In this case also, the fill port 5 for injecting a liquid foaming agent into the heating cylinder can be at a single location, but it can be also at two or more locations as shown in FIG. 5.

In the embodiment 3 also, the invention was implemented with the fill port 5 disposed at a single location as well as at two locations, and it derived an expansion factor of 7% for molded articles with respective cases.

Embodiment 4

In the embodiment 4, the water used in the embodiment 2 as a liquid foaming agent was replaced by a 1:1 (by volume) mixture of water and methanol, and the injected volume was 5 ml.

In the embodiment 4 also, the invention was implemented with the fill port 5 disposed at a single location as well as at two locations, and it derived an expansion factor of 7% for molded articles with respective cases.

Embodiment 5

In the embodiment 5, the ABS used in the embodiment 1, embodiment 2, embodiment 3 and embodiment 4 was replaced with HIPS, m-PPE, PC/ABS and PC respectively. The molten resin temperature in the case of HIPS was set at 230° C. and that in the cases of m-PPE, PC/ABS and PC was set at 265° C. and other conditions for injection were the same as those in the embodiment 1. The degree of variation in weight and the expansion factor of molded articles also were almost the same as the case of ABS.

Embodiment 6

In the embodiment 6, the ABS used in the embodiment 1, embodiment 2, embodiment 3 and embodiment 4 was replaced with PP. The molten resin temperature was set at 230° C., and other conditions for injection were the same as those in these embodiments. The swirl marks in appearance were fewer than those with styrene-based resins in the embodiment 1 and the embodiment 2. The expansion factor and the weight variation in derived molded articles were around 8.5% and less than 0.5%.

Embodiment 7

In the embodiment 7, the foaming agent used in the embodiment 1, embodiment 2, embodiment 3, embodiment 4, embodiment 5 and embodiment 6 was replaced by methanol alone. The injection volume of the liquid foaming agent was 6.4 ml and other injection conditions were the same as those in these embodiments. The expansion factor in derived molded articles was around 7% except for that of around 8.5% with the case of PP.

Embodiment 8

In the embodiment 8, instead of methanol in the embodiment 7 as a liquid foaming agent, an aliquot of 9.2 ml of ethanol was used. Other injection conditions were the same as those in respective embodiments. The expansion factor in derived molded articles was around 7% except for that of around 8.5% with the case of PP.

Embodiment 9

In the embodiment 9, instead of methanol in the embodiment 7 as a liquid foaming agent, an aliquot of 12 ml of IPA was used. Other injection conditions were the same as those in respective embodiments. The expansion factor in derived molded articles was around 7% except for that of around 8.5% with the case of PP.

Embodiment 10

In the embodiment 10, instead of methanol in the embodiment 7 as a liquid foaming agent, an aliquot of 10 ml of diethyl ether was used as a liquid foaming agent of. Other injection conditions were the same as those in respective embodiments. The expansion factor in derived molded articles was around 7% except for that of around 8.5% with the case of PP.

Embodiment 11

In the embodiment 11, instead of methanol in the embodiment 7 as a liquid foaming agent, an aliquot of 6.4 ml of a 1:1 mixture of water and ethanol was used. Other injection conditions were the same as those in respective embodiments. The expansion factor in derived molded articles was around 7% except for that of around 8.5% with the case of PP.

Embodiment 12

In the embodiment 12, instead of methanol in the embodiment 7 as a liquid foaming agent, an aliquot of 7.8 ml of a 1:1 mixture of water and IPA was used. Other injection conditions were the same as those in respective embodiments. The expansion factor in derived molded articles was around 7% except for that of around 8.5% with the case of PP.

Embodiment 13

In the embodiment 13, instead of methanol in the embodiment 7 as a liquid foaming agent, an aliquot of 6.8 ml of a 1:1 mixture of water and diethyl ether was used. Other injection conditions were the same as those in respective embodiments. The expansion factor in derived molded articles was around 7% except for that of around 8.5% with the case of PP.

Embodiment 14

In the embodiment 14, instead of methanol in the embodiment 7 as a liquid foaming agent, an aliquot of 7.8 ml of a 1:1 mixture of methanol and ethanol was used. Other injection conditions were the same as those in respective embodiments. The expansion factor in derived molded articles was around 7% except for that of around 8.5% with the case of PP.

Embodiment 15

In the embodiment 15, instead of methanol in the embodiment 7 as a liquid foaming agent, an aliquot of 9.2 ml of a 1:1 mixture of methanol and IPA was used. Other injection conditions were the same as those in respective embodiments. The expansion factor in derived molded articles was around 7% except for that of around 8.5% with the case of PP.

Embodiment 16

In the embodiment 16, instead of methanol in the embodiment 7 as a liquid foaming agent, an aliquot of 10.6 ml of a 1:1 mixture of ethanol and IPA was used. Other injection conditions were the same as those in respective embodiments. The expansion factor in derived molded articles was around 7% except for that of around 8.5% with the case of PP.

Embodiment 17

In the embodiment 17, instead of methanol in the embodiment 7 as a liquid foaming agent, an aliquot of 9.2 ml of a 1:1:1 mixture of methanol, ethanol and IPA was used. Other injection conditions were the same as those in respective embodiments. The expansion factor in derived molded articles was around 7% except for that of around 8.5% with the case of PP.

Embodiment 18

In the embodiment 18, instead of methanol in the embodiment 7 as a liquid foaming agent, an aliquot of 9.2 ml of a 1:1 mixture of methanol and diethyl ether was used. Other injection conditions were the same as those in respective embodiments. The expansion factor in derived molded articles was around 7% except for that of around 8.5% with the case of PP.

Embodiment 19

In the embodiment 19, instead of methanol in the embodiment 7 as a liquid foaming agent, an aliquot of 9.6 ml of a 1:1 mixture of ethanol and diethyl ether was used. Other injection conditions were the same as those in respective embodiments. The expansion factor in derived molded articles was around 7% except for that of around 8.5% with the case of PP.

Embodiment 20

In the embodiment 20, instead of methanol in the embodiment 7 as a liquid foaming agent, an aliquot of 11 ml of a 1:1 mixture of IPA and diethyl ether was used. Other injection conditions were the same as those in respective embodiments. The expansion factor in derived molded articles was around 7% except for that of around 8.5% with the case of PP.

Embodiment 21

Figure 38:
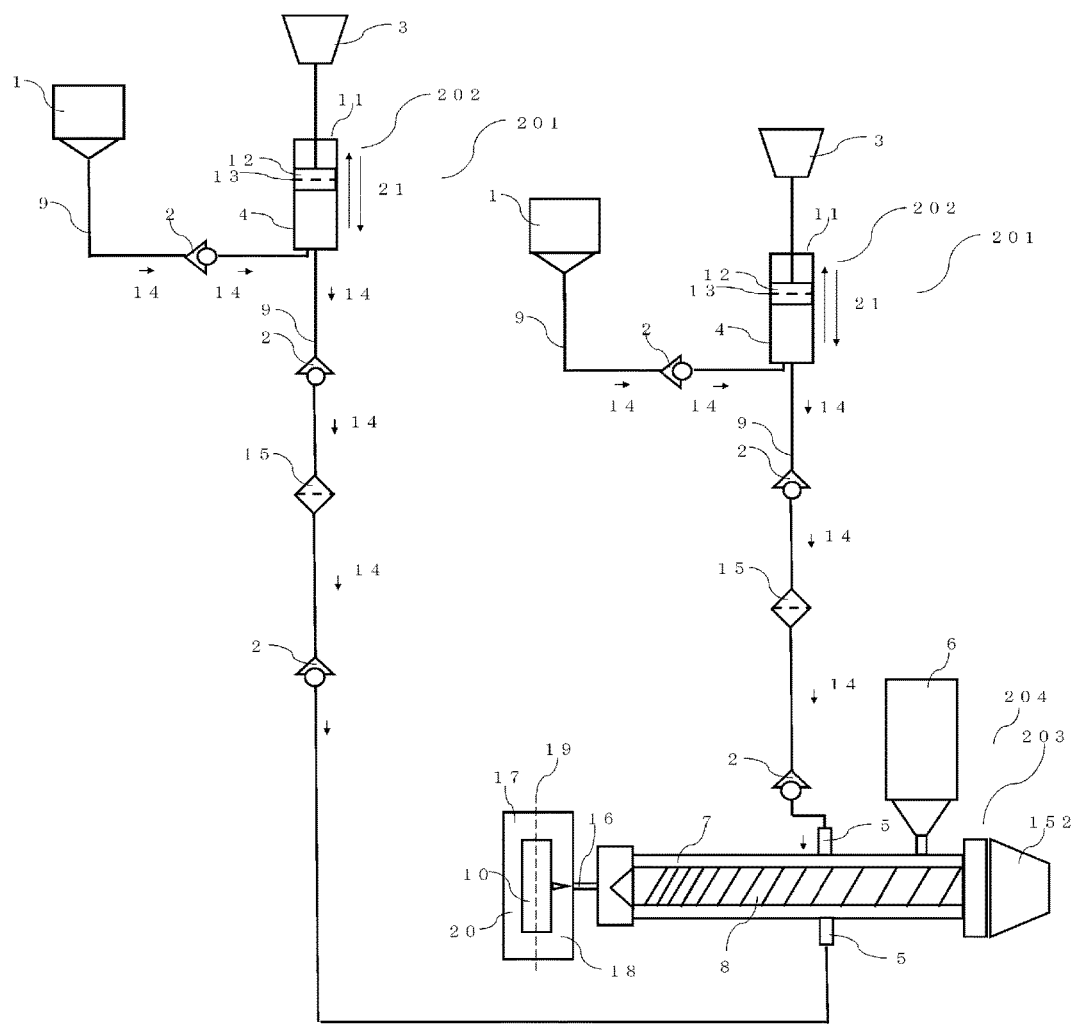
FIG. 38 is a schematic view of a device for manufacturing molded article.

In the embodiment 4, a 1:1 mixed solution of water and methanol was used and injected into the heating cylinder of the injection molding machine by means of the device shown in FIG. 1. In the embodiment 21, two units (groups, sets) of device for injecting a liquid foaming agent were used as shown in FIG. 38, wherein the cistern 1 for storing a foaming agent on one unit was filled with water and the cistern 1 for storing a foaming agent on the other unit was filled with methanol. In the embodiment 21, an aliquot of 1.8 ml of water as well as an aliquot of 3.2 ml of methanol were measured out respectively, and water (tap water was also used in this embodiment) and ethanol were injected separately through two fill ports 5 provided on different locations as shown in FIG. 6 into the heating cylinder of the injection molding machine, gasified therein, agitated by the screw 8, dispersed finely and dissolved under pressure into the molten resin to provide it with foaming properties.

A molding operation was carried out as in the embodiment 1 and molded articles with an expansion factor of 7% were obtained.

In the embodiment 21, the injection of water and that of methanol were carried out simultaneously, but either water or methanol can be injected first to carry out the injection of the other liquid at a staggered timing, and the result such as expansion factor was approximately the same in either case.

Alternatively, the number of locations of fill ports 5 was reduced from two as in FIG. 6 to one as in FIG. 7, and water and methanol injected separately were mixed together within the fill port 5 and injected into the heating cylinder 7 of the molding machine, gasified, agitated by the screw 8, dispersed finely and dissolved under pressure into a thermoplastic resin to provide it with foaming properties.

A molding operation was carried out as in the embodiment 1 and molded articles with an expansion factor of 7% were obtained.

Embodiment 22

In the embodiment 22, methanol in the embodiment 21 was replaced by ethanol, and the injection was made with 1.8 ml of water and 4.6 ml of ethanol. The results like expansion factor presented no difference from those of the embodiment 21.

Embodiment 23

In the embodiment 23, methanol in the embodiment 21 was replaced by IPA, and the injection was made with 1.8 ml of water and 6 ml of IPA. The results like expansion factor presented no difference from those of the embodiment 21.

Embodiment 24

In the embodiment 24, methanol in the embodiment 21 was replaced by diethyl ether, and the injection was made with 1.8 ml of water and 5 ml of diethyl ether. The results like expansion factor presented no difference from those of the embodiment 21.

ABS was replaced by HIPS, m-PPE, PC/ABS or PC respectively. The temperature of a molten resin was 230° C. in the case with HIPS, or 265° C. in the case with m-PPE, PC/ABS or PC, and other injection conditions were the same as those in the case of the embodiment 1. The degree of variation in weight of derived molded articles was less than 0.5%, and the expansion factor was around 7%, i.e., these values also being approximately similar to those in the case with ABS.

Molding process was carried out also with PP, and the expansion factor was 8.5%, i.e., the same value as that with PP in other embodiments.

Moreover, aforementioned resins of HIPS, m-PPE, PC/ABS and PC were processed in the embodiments 21-23. The degree of variation in weight of derived molded articles was less than 0.5%, and the expansion factor was around 7%, i.e., these values also being approximately similar to those in the case with ABS.

Embodiment 25

In the embodiment 25, the water in the embodiment 1 was replaced by sodium bicarbonate water of 15 wt % and an aliquot of 3.6 ml thereof was injected into the resin. Other factors used, i.e., resin, injection molding machine, mold, etc. were the same as those in the embodiment 1. The expansion factor of the derived molded articles was around 7%.

Embodiment 26

In the embodiment 26, the water in the embodiment 1 was replaced by an aqueous solution of potassium bicarbonate of 25 wt % and an aliquot of 3.6 ml thereof was injected into the resin. Other factors used, i.e., resin, injection molding machine, mold, etc. were the same as those in the embodiment 1. The expansion factor of the derived molded articles was around 7%.

Embodiment 27

In the embodiment 27, the water as a foaming agent in the embodiment 2 was replaced by sodium bicarbonate water of 15 wt % and an aliquot of 6 ml thereof was measured out and heated at 300° C. in the vaporizer/generator unit 22 wherein the solvent water was vaporized and sodium bicarbonate was pyrolyzed into water vapor and carbon dioxide gas. With regard to the mixture of water vapor and carbon dioxide gas to be injected eventually into the resin, the injection pressure was set by the pressure control valve 23 and the injection volume was regulated by the flowrate control valve 26. By opening the automatic on-off valve 158, the mixture of water vapor and carbon dioxide gas was injected into the molten ABS undergoing plasticization in the heating cylinder on the injection molding machine during the period from the start to the end of measurement, in order to provide foaming properties to the resin. The molding operation was carried out by using the ABS prepared in this way and the molding conditions and the mold that were similar to those of the embodiment 1. The expansion factor of the derived molded articles was around 7%. The automatic on-off valve 158 was closed upon completing the injection of foaming gas.

As to the heating of the vaporizer/generator unit 22, it was heated by a high-frequency induction device with a view to heating it in a short time.

As the residual sodium carbonate resulting from the pyrolysis of sodium bicarbonate remained in the vaporizer/generator unit 22, the foaming agent residues were cleansed after every 10 shots by the following means: at first the automatic on-off valve 158 was closed to prevent a fluid from flowing into the heating cylinder 7 of the injection molding machine; the normally closed automatic on-off valve 159 for introducing cleansing liquid into the vaporizer/generator unit 22 and the automatic on-off valve 153 for discarding the cleansing liquid were opened; water was let in through the inlet port 155 for the cleansing liquid to fill the vaporizer/generator unit 22 with it; the vaporizer/generator unit 22 was heated to 80° C. to facilitate dissolving and vibrated externally by such means as an ultrasonic device to dissolve sodium carbonate, residues of foaming agent, into water; and finally the cleansing liquid was discarded to outside through the outlet port 156. After completion of these steps, air was let in through the inlet port 155 and the cleansing liquid still remaining in the vaporizer/generator unit 22 and the ductwork 154 was expelled by the air pressure, and the device was dried to complete the cleansing process. Afterwards, nitrogen gas was introduced through the inlet port 15 to replace the content inside the device with nitrogen.

Embodiment 28

In the embodiment 28, the sodium bicarbonate water of 15 wt % used in the embodiment 27 was replaced by an aqueous solution of 25 wt % of potassium bicarbonate, and the embodiment was carried out by changing the injection amount to 6 ml. Other factors such as the applied resin and means for cleansing of residues of foaming agent were the same as the embodiment 27.

Embodiment 29

In the embodiment 29, instead of ABS in the embodiments 25-28, HIPS, m-PPE, PC/ABS, PC and PP were used. The results such as expansion factor etc. were similar to the case with the said ABS. In the case with PP, the expansion factor was around 8.5%.

In the embodiment 25 and the embodiment 26, the injection of a foaming agent into the heating cylinder on the molding machine was carried out with two alternative timings, either over the period from the start of measurement when the plasticization began until the end of it or at a time (at a stroke) two seconds after the start of measurement (in the present invention it is called "single burst injection").

However, the injection timings produced no difference in results in such parameters as expansion factor, cell shape, etc.

The single burst injection was carried out also in the embodiment 1 and the embodiment 3, and the results were almost the same as the cases where the injection was carried out continuously over an extended duration from the start of measurement until its end.

Embodiment 30

By using two liquid injection devices shown in an upper part of the FIG. 1, wherein 100 ml of an aqueous solution of an equivalent of citric acid was stored in the cistern 1 for storing a foaming agent on one unit and 300 ml of aqueous solution of an equivalent of sodium bicarbonate was stored in the cistern 1 on the other unit, an aliquot of 3 ml of potassium bicarbonate water and an aliquot of 3 ml of aqueous solution of citric acid were measured out respectively, and injected separately through different fill ports 5 as shown FIG. 6 into the heating cylinder on the molding machine, wherein the sodium bicarbonate water and the aqueous solution of citric acid came into contact with each other and underwent a chemical reaction to generate carbon dioxide gas, the solvent water vaporized, and both the carbon dioxide gas and the water vapor were made to become a foaming gas.

In the embodiment 30, the molding operation was carried out by using ABS, mold and injection molding machine in the embodiment 1, and it was confirmed for the system to be able to obtain molded articles presenting an expansion factor of 1.5%.

Embodiment 31

In the preceding embodiment 30, instead of sodium bicarbonate water, an aqueous solution of one equivalent of potassium bicarbonate was used and the results almost similar to those of the preceding embodiment 30 were obtained.

Embodiment 32

An ABS resin in the heating cylinder on a molding machine was provided with foaming properties by using the device shown in FIG. 3 through the following steps: 150 ml of water containing one equivalent of sodium bicarbonate and 150 ml of aqueous solution of one equivalent of citric acid were measured out and filled into the vaporizer/generator unit 22 that was not heated but the temperature of which was kept only above the critical temperature of carbon dioxide (around 35° C.) to let a chemical reaction take place for generating carbon dioxide; the automatic on-off valve 158 was opened simultaneously with the start of measurement; the injection pressure of carbon dioxide gas was set up by means of pressure-control valve 23; the volume of carbon dioxide gas to be injected into the heating cylinder was set up by means of the flowrate control valve 26; the carbon dioxide gas was injected into the ABS undergoing plasticization through two fill ports as shown in FIG. 5. The automatic on-off valve 158 was closed simultaneously with the end of measurement, and the gas injection was completed. A molding operation was carried out by using the mold of the embodiment 1. The expansion factor was 2%.

The discharge of liquid remaining in the vaporizer/generator unit 22 wherein the gas generation had been completed was carried out by closing the automatic on-off valve 158, by opening the automatic on-off valve 159 for filling the vaporizer/generator unit 22 with a cleansing liquid, by opening the automatic on-off valve 153 for discarding the cleansing liquid, and by expelling the cleansing liquid through the outlet port 156 for the cleansing liquid by means of the pressure of the air that was introduced through the inlet port 155 for cleansing water.

The same results were obtained also in the cases where the foaming gas was generated by the chemical reaction between an aqueous solution of potassium bicarbonate, sodium carbonate or potassium carbonate and diluted acetic acid or an aqueous solution of citric acid with a concentration of around 3 wt %.

These basic salts, bicarbonates or carbonates can be used not only as an aqueous solution of a single substance but as an ingredient of a mixture of several substances, and diluted acetic acid or an aqueous solution of citric acid also can be used not only as a single acid but as an ingredient of a mixed solution of these acids.

Embodiment 33

In contrast to the embodiment 32 wherein the foaming gas, i.e., carbon dioxide gas, was generated only by a chemical reaction without heating the vaporizer/generator unit 22, in the embodiment 33, simultaneously with the chemical reaction, the vaporizer/generator unit 22 was heated to 180° C. and the solvent water also was vaporized to make a foaming gas, and consequently the expansion factor increased from 2% to 7%.

The residues remaining in the vaporizer/generator unit was removed by the same procedures as described previously in the embodiment 27.

Embodiment 34

In the embodiment 34, the ABS used in the embodiments 30-33 was replaced by HIPS, m-PPE, PC/ABSPC or PP respectively. The temperature of a molten resin was 230° C. in the case with HIPS or PP, or 265° C. in the case with m-PPE, PC/ABS or PC, and other injection conditions were the same as those in the case of the embodiment 1. The presence of created foamed cells within the molded articles was confirmed.

Embodiment 35

In the embodiment 35, the molding process was carried out similarly as in the case of the embodiment 1 but by: using a sealed mold as presented in the FIGS. 23 and 25 and the device as illustrated in FIG. 24; pressurizing the said mold to 1 MPa by compressed air; injecting the resin with foaming properties of the embodiment 1; and blowing out (discharging the gas) 0.5 second after the completion of resin injection the pressurized gas by opening the blow-out [discharging to the atmosphere (venting)] valve 87 for the pressurized gas within the mold cavity 10 and the ejector box 78 in FIG. 24.

The obtained molded articles presented the appearance with a clean surface without swirl marks having occurred in the embodiment 1, and the inner foamed layer similar to that in the embodiment 1. The surface portion presented a skin (solid) layer of up to 1 mm-2 mm. The expansion factor was around 7%.

In the embodiments 2-33 as well, the application of OGCP technique enabled to obtain molded articles with clean appearance.

Embodiment 36

In the embodiment 36, the molding process was carried out by using the mold provided at the end portion of resin flow with a dummy shape (disposable shape) 106 as shown in FIG. 26 having a volume of 30% of 480 cm$^3$ of the volume of the molded article 110 in FIG. 27, and by using thermoplastic resins and foaming agents applied in the embodiments 1-33. The injection was carried out with short-shots wherein the dummy shape 106 was filled only partially with resin. Results of molding operations demonstrated the effect to increase the expansion factor in comparison with the embodiment 1, owing to the lower pressure of the molten resin filled into the mold cavity due to the dummy shape and because of the observation that the foaming resin within the mold cavity extended into the dummy shape 106 (migration to the dummy shape 106).

In the embodiment 36, the mechanism of opening/closing gate (shutter) 102 was not used, and it was kept open before the filling of the molten resin.

Embodiment 37

In the embodiment 37, the molding process was carried out similarly as in the case of the embodiment 36 but by: making full-shots as fully as up to the volume within the mold cavity after providing a shutter 102 on the location (site, position) of the dummy shape 106 shown in FIG. 26; and opening immediately the said shutter 102 in order to lower the pressure of the resin filled into the mold cavity 10 and thus to increase the expansion factor. Results of molding operations demonstrated the effect to increase the expansion factor by slightly less than 0.5% in respective embodiments. As a result of this embodiment 37, it was observed that the lowering, by means of the dummy shape 106, of the pressure of the resin filled into the mold cavity had the effect to increase the expansion factor. In comparison with the embodiment 36, in the embodiment 37, the transcription conforming to the mold improved because a full-shot was made once without fail.

Embodiment 38

In the embodiment 38, because the OGCP was combined with the embodiment 37, the molded articles presenting a skin layer with clean appearance were obtained. In comparison with the molded articles of the embodiment 1, a further improvement was confirmed for the expansion factor. The air was used as a pressurization gas of the OGCP and its pressure was 1.6 MPa. The embodiment 38 was carried out with the cases of thermoplastic resins and liquid foaming agents in the embodiments 2-33 as well, and the effect to increase the expansion factor was observed.

Embodiment 39

In the embodiment 39, the molding process was carried similarly as the embodiment 1 but by letting the screw of the injection molding machine make a suck-back simultaneously with filling the mold with a resin with foaming properties. Results of molding operations demonstrated a slight increase of the expansion factor in comparison with the embodiment 1. The technique of the embodiment 39 (lowering the pressure within the mold cavity by letting the screw make a suck-back after completing the injection) was carried out with the cases of thermoplastic resins and liquid foaming agents in the embodiments 2-33 as well, and the effect to increase the expansion factor was observed.

Embodiment 40

In the embodiment 40, the mold in FIG. 28 was configured so that a part of the mold [the portion 118 represented by broken lines in FIG. 30: a rectangle of 160 mm by 50 mm] could recede for a distance of 8 mm (breathing). Therefore, this part alone had a total thickness of 16 mm by adding 8 mm of breathing distance to the original thickness of 8 mm. As a consequence of maneuvers wherein, immediately after filling fully the mold with the thermoplastic resin of the embodiment 1, the said mold was moved (made to breathe) to depressurize the foaming resin in the mold cavity and to facilitate foaming, it was confirmed that the expansion factor increased by 10-13% in comparison with the embodiment 1. The breathing speed was made to be around 0.5 second/8 mm.

The technique of embodiment 40 was carried out with the cases of thermoplastic resins and liquid foaming agents in the embodiments 2-33 as well, and the increase of the expansion factor by 9-15% due to the breathing was observed.

Embodiment 41

In the embodiment 41, the molding process was carried out similarly as the embodiment 40 but furthermore in combination with the OGCP technique and the molded articles with clean appearance (without swirl marks) were obtained. The pressure of pressurization gas was 1.6 MPa, and in the embodiment 41, the nitrogen gas was used as an OGCP gas in order to prevent discolorations and burns (as the molten resin was injected into the mold cavity at a high pressure and with a high speed, discolorations and burns due to the adiabatic compression were likely to occur).

Embodiment 42

In the embodiment 42, unlike the embodiment 40 and the embodiment 41 wherein only a part of the mold was expanded (made to breathe), the mold as a whole was expanded (made to recede) by 5 mm, and the results confirmed that the technique enabled to obtain the molded articles with a much higher degree of expansion factor. The increase of the expansion factor by around 15% to 25% due to the mold recession was confirmed.

The structure of a mold that can be made to recede is described. The PL (parting line) consists of a vertical PL and a horizontal PL. When the PL of a mold is completely clamped (clamping state), the PL becomes a horizontal PL.

Figure 31B:
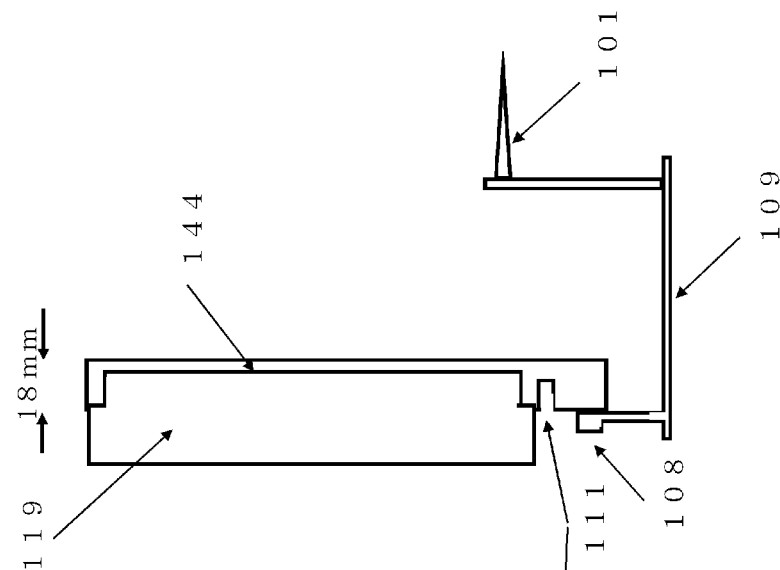
FIG. 31B is a lateral view of the molded article in FIG. 31A.
Figure 31A:
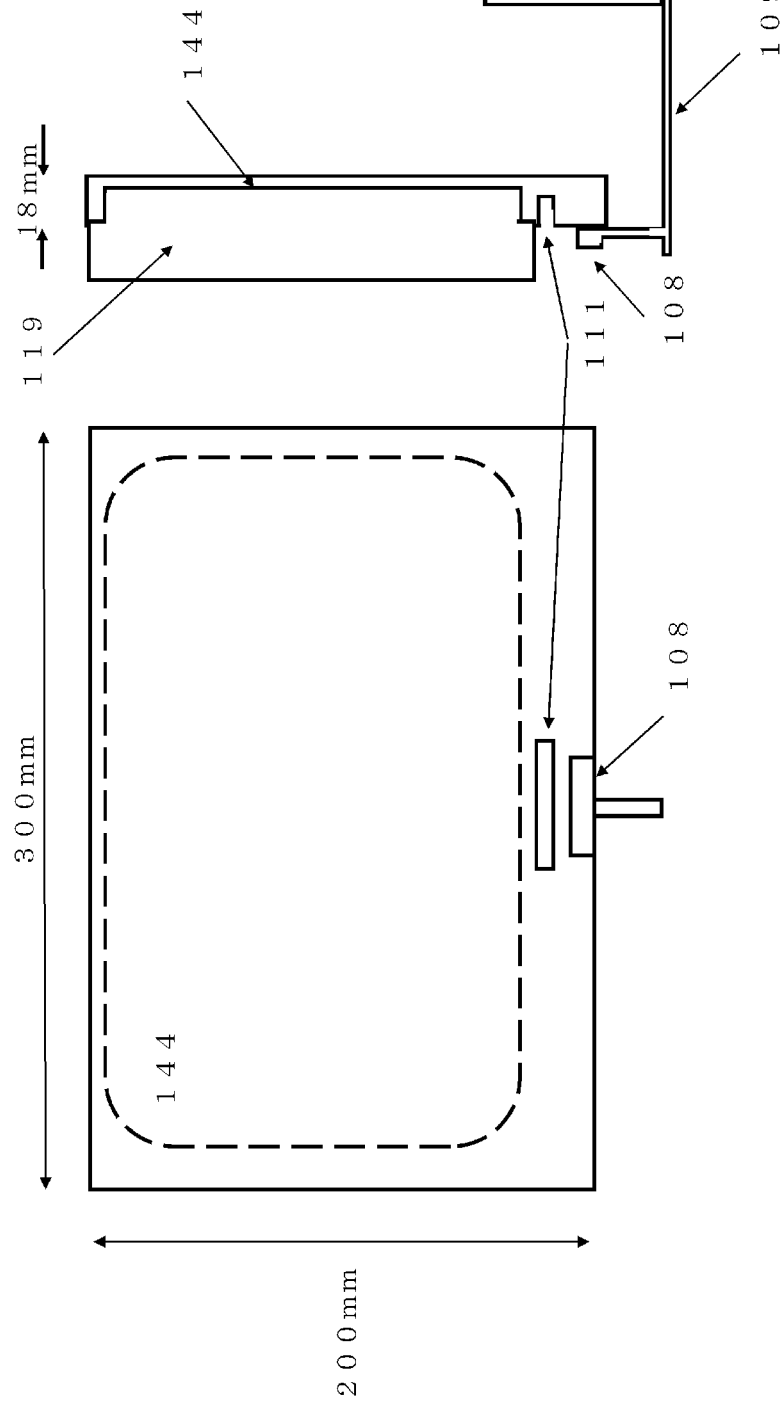
FIG. 31A is a plan view of a molded article.

In this state, the foaming resin of the embodiment 1 was filled fully into the mold cavity; the mold on the mobile side was made to recede 5 mm immediately after the completion of resin injection in order to depressurize the foaming resin filled into the mold cavity and to facilitate its foaming action. The molding operation enabled to obtain the molded articles with an expansion factor of around 20 to 35% (FIG. 31).

The technique of the embodiment 42 was carried out also by using thermoplastic resins and foaming agents of the embodiments 2-33 and the molded articles presenting a high expansion factor of higher than 30% were obtained.

The structure of a mold that can be made to recede in the embodiment 42 is almost similar to that used for the first stage mold opening in TAF, USM and $H^2M$. The recession of the mold was carried out by means of the mold opening force of the molding machine and the mold opening distance was regulated by equipping the mold with puller bolts. The receding speed was made to be around 0.3 second/5 mm. Since the coefficient of contraction of crystalline resins such as PP is high, their expansion factor became higher than in the case with uncrystallized (amorphous) resins such as ABS. Incidentally, the mode of mold opening can be single-staged, 2-staged or multi-staged.

Embodiment 43

In the embodiment 43, the molding process was carried out similarly as in the embodiment 42 but in combination with the OGCP using the compressed air at a pressure of 1.5 MPa. It resulted in producing molded articles presenting no swirl marks but a clean skin layer on the surface and a foamed inner layer.

Embodiment 44

Figure 32:
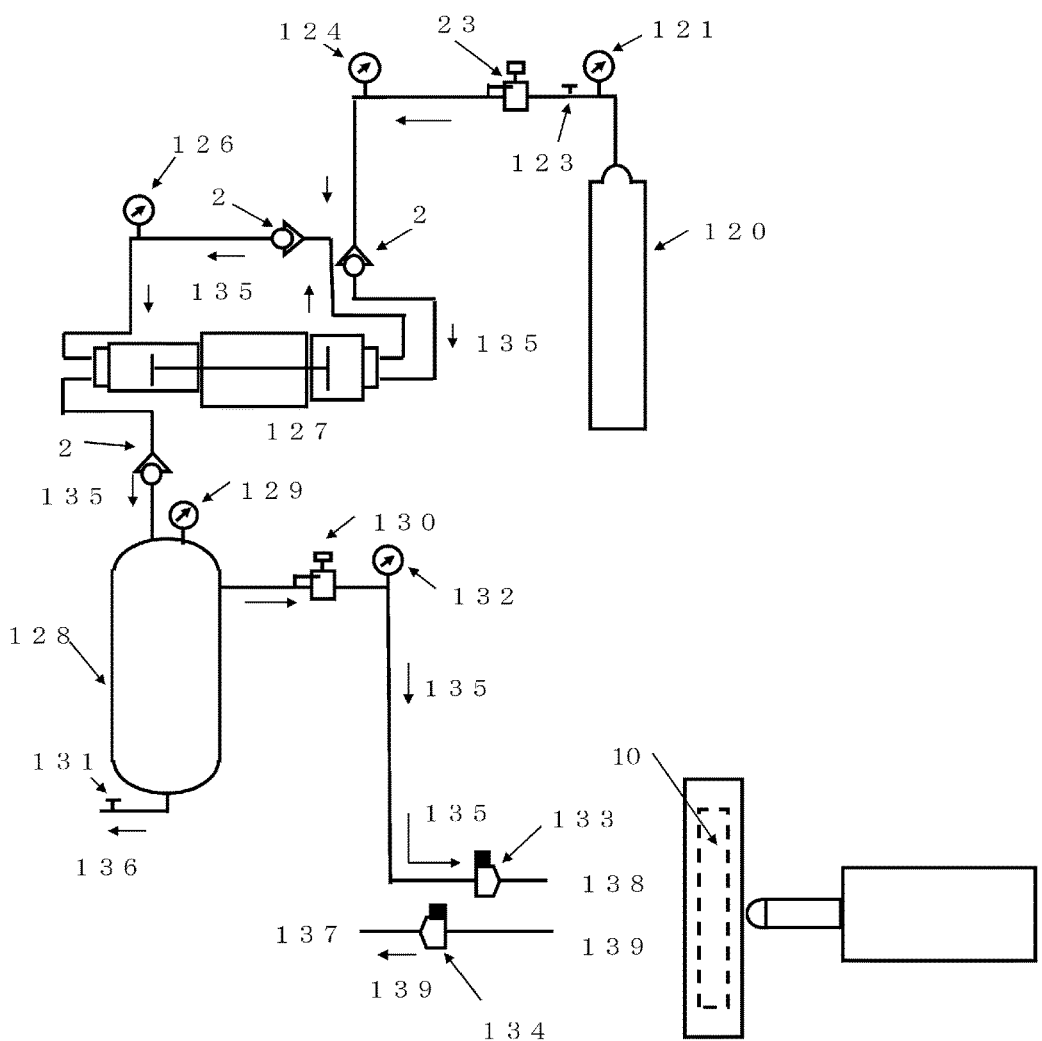
FIG. 32 is a schematic view of an IGPC device.

The embodiment 44 presented the means for obtaining the molded articles with a high expansion factor by using the IGCP. FIG. 32 illustrates a gas-assisted molding device, but it can be converted into an IGCP device or device for MuCell and the like as long as the interface with the molding machine is modified. In the following sections, the IGCP device is described.

The pressure of nitrogen gas to be used for IGCP is regulated by: depressurizing the nitrogen gas derived from a gas cylinder 120 filled with the gas at 15 MPa [the nitrogen gas can be that which has been obtained by PSA (pressure swing absorption method, a mode of separation of nitrogen gas by means of absorption by activated carbon) or that obtained by separation from the air by using a separation membrane] to a pressure around 1 MPa; compressing the nitrogen gas to around 50 MPa by using, for example, a gas booster 127 or a high pressure compressor; and storing the gas under pressure in the receiver tank 128 for the compressed high pressure nitrogen gas. The stored gas is used by depressurizing it to a required pressure by means of a high-pressure regulator 130.

In the case with the IGCP, upon receiving from the molding machine a signal of the start or the completion of resin injection, the automatic valve 133 for injection is opened and the nitrogen gas stored in the receiver tank 128 is injected into the molten resin provided with foaming properties having been filled into the mold cavity 10, through the nozzle or the spool runner of the molding machine or directly into the molten resin provided with foaming properties in the mold cavity 10. After the elapse of a certain period of time following the gas injection, the automatic valve 133 for injection is closed, and immediately or a little while later, the automatic valve 134 for discharging gas is opened and the injected nitrogen gas is discharged into the atmosphere.

In FIG. 32 the IGCP circuit from the pressure regulation valve 130 after the receiver tank 120 to the usage 138 of high pressure gas and then to the automatic valve 134 for discharging gas is represented as a single circuit, but it can be consisted of several circuits, and it is also possible to carry out the IGCP process by using the multiple circuits and by applying a same pressure or different pressures to a single molded article, or by injecting the gas with a uniform injection timing or with different injection timings.

As described in the embodiment 1, in the case where the molding process is carried out to obtain numbers of differently-shaped articles at a time, the gas injection can be made at a same pressure or at a different pressure and with a same timing or with a different timing for each one of molded articles respectively.

If this device is used with a molten resin without foaming properties, the operation becomes the blow molding or the GPI. It was shown in the usages 138 1)-4) that if this device is connected to the heating cylinder on an injection or extrusion molding machine for injecting the high pressure nitrogen gas into a molten thermoplastic resin undergoing plasticization, it can be used as a device for carrying out the MuCell technique, etc.

In the embodiment 1, after the resin was injected into the mold cavity with a short-shot of around 85 vol %, a step of 10 seconds of IGCP was carried out directly into the resin at 15 MPa by using the IGCP device of the present embodiment 44, and then the high pressure gas was blown out. The molded articles produced by these processes presented an expansion factor of around 25%. The expansion factor depends on the amount of the resin injected into the mold cavity, and if the resin is injected with a short-shot and then inflated (blown and once made to form hollows) with the high pressure nitrogen gas, a molded article with a higher expansion factor can be obtained. In this case, if the injection amount (additive amount, quantity of use) of a liquid foaming agent is insufficient, because foaming action does not progress (resin does not expand, does not produce molded articles with a high expansion factor) and hollows occur, the foaming agent is injected (added, used) in a relatively larger quantity. In order to obtain molded articles with a higher expansion factor, it is only needed to add (carry out the operation in combination with) the maneuver of recession, as in the cases of TAF, USM, etc. that were described in the embodiment 44 and the embodiment 42. It is possible to produce molded articles with a higher strength by carrying out the H$^2$M technique (enabling to construct ribs inside to reinforce the structure by making the retarded core recede). The molding operations that were also carried out by using the thermoplastic resins and liquid foaming agents of the embodiments 2-33 resulted in deriving molded articles with a high expansion factor higher than 30%.

Embodiment 45

While only the IGCP was used in the embodiment 44, in the embodiment 45, by using the combination of both IGCP and OGCP, it was possible to obtain molded articles with a high expansion factor and clean appearance without swirl marks.

Embodiment 46

Figures 33A, 33B:
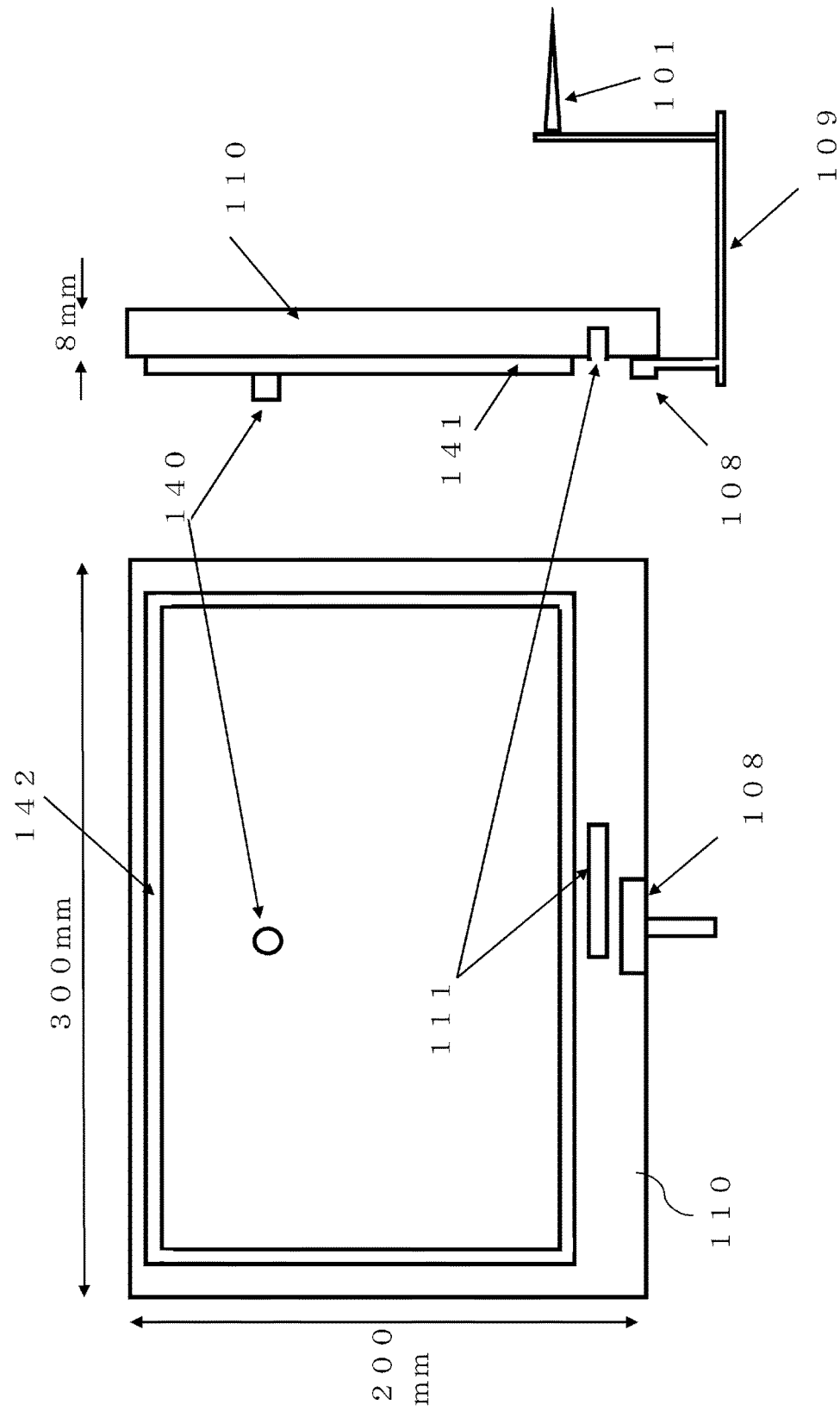
FIG. 33A is a plan view of a molded article.
FIG. 33B is a lateral view of the molded article in FIG. 33A.

In contrast to the embodiment 45 wherein the high pressure nitrogen gas was injected into a molten resin provided with foaming properties in the mold cavity, in the embodiment 46 the final foaming (expansion) action of the resin toward the mobile side of the mold was effected by blowing out the nitrogen gas to depressurize the molten resin provided with foaming properties in the mold cavity after having completed once the transcription conforming to the cavity onto the resin by pressing it from the mobile side to the stationary side by exerting a gas pressure [Gas-Press (GP)] at a pressure of 15 MPa from the mobile side of PL of the mold. With a view to preventing the gas from leaking to the outside of the mold, the rib (141 in FIG. 33) with a height of 5 mm and a thickness of 1.5 mm was provided (FIG. 33).

By using this means, it was expected to obtain the same function and effect as those obtained by the recession of the mold carried out in the embodiment 42. The ABS applied in the embodiment 1 was used as a material. The expansion factor was at a high value of 25%. However, as the product thickness in the embodiment 46 was as thick as 8 mm, the gas penetrated into the inside of the molded article as it was feared.

In the case where the product thickness was 3 mm, gas did not penetrate into the inside of the molded article.

Embodiment 47

In the embodiment 47, the OGCP was also applied to the molded articles of the embodiment 46, and as a result the molded articles with clean appearance without swirl marks were obtained.

Embodiment 48

In the embodiment 48, the injected amount of liquid foaming agent was made double that in the embodiment 1 to augment the expansion factor, and the molding process of H$^2$M was carried out by using the ABS of the embodiment 1. The operation proceeded as follows: the mold was advanced to make the thickness of the mold cavity to 5 mm; the aforementioned resin with foaming properties was filled almost fully into the mold cavity; then the pressure was lowered by at least either cutting off the mold clamping force or lowering the mold clamping force; the nitrogen gas was injected into the resin in the mold cavity from the mobile side at a pressure of 10 MPa by means of the IGCP device; the mold was retracted [made to go backward {retreat (recede, make a recession)}] simultaneously with the gas injection to augment the volume of the mold cavity by means of a mechanical action as well as the pressure of the injected gas; the aforementioned injected nitrogen gas was blown out into the atmosphere simultaneously with the completion of the mold recession. The operation resulted in obtaining molded articles presenting in the inner portion a foamed layer with an expansion factor higher than 40%. Later on, a part of the mold was retracted mechanically to make a rib in the inner foamed layer.

The injected nitrogen gas in the present embodiment 48 has the effects of expanding the foaming resin in the mold cavity, making the mold recede, and serving as an IGCP gas. It is needless to say that if the OGCP is applied, molded articles with clean appearance can be obtained. The molding processes by using the thermoplastic resins and the liquid foaming agents of the embodiments 2-33 have also produced the almost similar results.

Embodiment 49

The liquid foaming agent 001M in a sol form containing 35 wt % of ADCA was prepared by dissolving AS with n-butanone, and by suspending ADCA in the solution. When this suspension of ADCA was used instead of the liquid foaming agent in the embodiment 1, the results almost similar to those of the embodiment 1 were obtained. A liquid foaming agent of aforementioned AS, PS was used to prepare the liquid foaming agent 002M. When this liquid foaming agent 002M was used instead of the liquid foaming agent in the embodiment 1 and PS was used as resin, the results almost similar to those of the embodiment 1 were obtained. Incidentally, the injected amount of respective foaming agents containing ADCA was 0.5 wt % of the weight of a molded article.

The liquid foaming agent 001M used in the embodiment 49 can be used, besides ABS, for PC/ABS and PC as well, and the liquid foaming agent 002M can be used also for m-PPE.

Embodiment 50

The pellets of masterbatch 001A of foaming agent containing 10 wt % of ADCA were manufactured by using ABS as a base (carrier) resin. In order to obtain molded articles of ABS, for example, the pellets of both ingredients are mixed together before feeding them into the heating cylinder of a molding machine. In the case of the embodiment 1, in order to obtain a molded article with approximately the same level of expansion factor by using only the masterbatch 001A as a foaming agent, the needed amount of the masterbatch is relatively large, accounting for 1/25 to 1/30 of the weight of a molded article, and hence this option is not economical. However, the nitrogen gas generated from ADCA is a useful gas for the foam molding process.

As a means to solve this economic problem, if a liquid foaming agent of the present invention is used in combination with the masterbatch 001A, it is possible to reduce the consumption of the latter. The residues from a foaming reaction can also be reduced.

In the embodiment 1, the aforementioned liquid foaming agent was injected at a rate of 0.3 wt % into the ABS provided with foaming properties by the nitrogen gas and the carbon dioxide gas, etc. generated through pyrolysis of the ADCA plasticized in the heating cylinder of the injection molding machine, wherein the ADCA derived from first mixing the ABS pellets with the masterbatch 001A at a ratio of 80 to 1. The operation resulted in obtaining the molded articles almost similar to those obtained in the embodiment 1. The means described in the present embodiment 50 can be carried out in the embodiments 2-49 as well.

Embodiment 51

As mentioned in the embodiment 50, the nitrogen gas is useful as a foaming gas. In such a process as MuCell, the nitrogen gas is mainly used, but because the volume injected into the resin in the heating cylinder is obtained only by its pressure, there is an inherent problem that the expansion factor of molded articles varies greatly. In order to alleviate this problem, the embodiment 51 uses techniques like MuCell along with the use of a liquid foaming agent of the present invention. By this solution, it was possible to alleviate the problem in techniques like MuCell.

In the embodiment1, the nitrogen gas that had been compressed at 35 MPa by means of the gas-assist molding machine in the FIG. 32 was injected into the ABS undergoing plasticization process in the heating cylinder of an injection molding machine, and at the same time, an aliquot of 5 ml of a 1:1 mixture of ethanol and water, instead of water, was injected as a foaming agent into the heating cylinder of the injection molding machine by means of the device of the FIG. 1, to make up a compound foaming gas consisting of nitrogen gas, water vapor and ethanol vapor. The operation resulted in obtaining the molded articles almost similar to those obtained in the embodiment 1. The means described in the present embodiment 51 can be carried out in the embodiments 2-49 as well.

While the present embodiment 51 used the nitrogen gas, the technique can be carried out as well by using other types of substances including: hydrogen, helium, neon, argon, methyl ether vapor, chlorofluorocarbon vapor as well as an organic substance which presents a state of gas with a pressure of 1 atm and at a temperature of 20° C. among those organic substances including chain saturated hydrocarbons represented by a general formula $C_nH_{2n+2}$ (n≥2) (alkanes), and alkenes, alkadienes, alkatrienes, etc. represented by a general formula $C_nH_{2n}$(n≥2).

Among the aforementioned organic substances, alkanes, alkenes, alkadienes, alkatrienes, etc., those substances which present a state of liquid with a pressure of 1 atm and at a temperature of 20° C. can be used also as a liquid foaming agent of the present invention.

Embodiment 52

An ABS resin was made to present foaming properties by: injecting water as a liquid foaming agent continuously into the said ABS resin in a molten state in the heating cylinder of the injection molding machine by means of a diaphragm pump 145 through a fill port 5 at a rate of 0.75 wt % based on the weight of the said molten resin within the heating cylinder of the injection molding machine; vaporizing the said injected water; dispersing finely and dissolving under a pressure the said vapor into the said molten resin.

The aforementioned resin provided with foaming properties was extruded through a die 149, to derive extruded articles in a form of single-layered sheet with a thickness of 8 mm presenting a foamed internal layer with an expansion factor of 5%.

The injection rate (control of injection volume) of a liquid foaming agent in the injection molding denotes the proportion of amount [weight] of a single stroke of injection of foaming agent to the amount [weight] of a single stroke of injection of molten resin and is expressed by a percentage value by multiplying by 100 the quotient obtained by dividing the weight of liquid foaming agent by that of the injected resin.

For example, in the case where an aliquot of 1.25 g of liquid foaming agent is injected into an aliquot of 500 g of injected resin per stroke in the heating cylinder of the injection molding machine, the injection rate of a liquid foaming agent is expressed as 0.25%.

The injection rate (control of injection volume) of a liquid foaming agent in the extrusion molding denotes the proportion of amount [weight] of injection of foaming agent to the amount [weight] of extrusion of molten resin per unit of time and is expressed by a percentage value by multiplying by 100 the quotient obtained by dividing the weight of liquid foaming agent by that of the extruded resin.

For example, in the case where an aliquot of 1.25 g of liquid foaming agent is injected into 500 g of extruded resin per minute in the heating cylinder of the extrusion molding machine, the injection rate of a liquid foaming agent is expressed as 0.25%.

For other types of liquid foaming agents different from water, the injection rate was respectively as follows: 1 wt % for a 1:1 mixture of water and methanol; 1.3 wt % for a 1:1 mixture of water and ethanol; 1.6 wt % for a 1:1 mixture of water and IPA; 1.4 wt % for a 1:1 mixture of water and diethyl ether; 1.6 wt % for a 1:1 mixture of methanol and ethanol; 1.9 wt % for a 1:1 mixture of IPA and methanol; 2.2 wt % for a 1:1 mixture of ethanol and IPA; 1.9 wt % for a 1:1:1 mixture of methanol, ethanol and IPA; 1.7 wt % for a 1:1 mixture of methanol and diethyl ether; 2 wt % for a 1:1 mixture of ethanol and diethyl ether; and 2.3 wt % for a 1:1 mixture of IPA and diethyl ether. The molding processes carried out by using these mixtures resulted in deriving molded articles of single-layered extruded sheet presenting an expansion factor from 5% to 7% in the case of ABS.

In the embodiment 53, in addition to the aforementioned ABS, the molding processes were carried out also by using HIPS and PP. In the cases where HIPS was processed with water or other liquid foaming agents, the expansion factor was 5% respectively, and where PP was processed likewise, the expansion factor was 8%.

Embodiment 53

By using two units of the device of FIG. 34, water was filled into the cistern 1 for storing a liquid forming agent on one device, methanol was filled into the cistern 1 for storing a liquid foaming agent on the other device, and then the two types of liquid foaming agent were injected respectively into the heating cylinder on an extrusion molding machine by means of diaphragm pumps 145 on respective devices. They were injected at two locations as illustrated in FIG. 6, wherein water as a liquid foaming agent was injected through a fill port 5 located nearer to the extrusion unit 148 at a rate of 0.35 wt % of the resin weight, and methanol was injected through the other fill port at a rate of 0.65 wt % of that respectively. Water and methanol thus injected were vaporized in the heating cylinder on the extruder, and the respective gas were dispersed finely and dissolved under pressure into the molten ABS resin in the heating cylinder of the extruder to provide foaming properties to the ABC resin which is then extruded through the die 149 to derive molded articles in a form of single-layered sheet with a thickness of 8 mm presenting a foamed internal layer with an expansion factor of 5%.

As liquid foaming agents other than water, mixture of 0.35 wt % of water and 0.95 wt % of ethanol, mixture of 0.37 wt % of water and 1.25 wt % of IPA, and mixture of 0.37 wt % of water and 1 wt % of diethyl ether were used in extrusion processes. Various types of liquid foaming agents were prepared including: mixture of 0.65 wt % of methanol and 0.95 wt % of ethanol; mixture 0.65 wt % of methanol and 1.25 wt % of IPA; mixture of 0.65 wt % of methanol and 1 wt % of diethyl ether; mixture of 0.95 wt % of ethanol and 1 wt % of diethyl ether; mixture of 1.25 wt % of IPA and 1 wt % of diethyl ether. When these liquid foaming agents were applied, the extrusion processes in the case of using ABS resulted in deriving molded articles in a form of single-layered sheet presenting an expansion factor of 5%-7%.

Embodiment 53, in addition to the aforementioned ABS, the molding processes were carried out also by using HIPS and PP. In the cases where HIPS was processed with water or other liquid foaming agents, the expansion factor was 5% respectively, and where PP was processed likewise, the expansion factor was 8%.

Embodiment 54

In the embodiment 54, by using two units of the device illustrated in FIG. 34, respective liquid foaming agents were injected separately into the heating cylinder on the extruder as shown in FIG. 6, and made to foam in the heating cylinder. In the embodiment 55, the fill port 5 was found only at a single location, and each liquid foaming agent was mixed in this fill port 5 with other agents, injected into the heating cylinder 7 of the extruder, then made to evaporate, agitated by the screw 8, dispersed finely and dissolved under a pressure into the molten thermoplastic resin in the cylinder which was then extruded through the die 149 to enable to derive extruded articles of single-layered sheet with a foamed structure.

Embodiment 55

While in the embodiment 53, a liquid foaming agent was injected in a liquid state into the heating cylinder on the extruder and evaporated, in the embodiment 55, each type of liquid foaming agent was first injected into the vaporizer/generator unit 22 by means of the device illustrated in FIG. 35, heated externally and gasified, and the injection pressure of the thus generated gas was regulated by the pressure control valve 23, and its injection volume was regulated by the flowrate control valve 26, and the said generated gas was injected continuously into the heating cylinder on the extruder to provide foaming properties to the concerned resin.

Embodiment 56

While in the embodiment 54, each of liquid foaming agents was injected separately into the heating cylinder of the extruder, in the embodiment 56, two units of the device illustrated in FIG. 35 were used and each of the liquid foaming agents was injected into the vaporizer/generator unit 22 respectively, heated externally and gasified respectively, and the injection pressure of each of the thus generated gas was regulated by the pressure control valve 23, and its injection volume was regulated by the flowrate control valve 26, and the said generated gas was injected into the heating cylinder on the extruder to provide foaming properties to the concerned resin.

Embodiment 57

In the embodiment 57, as a liquid foaming agent, the water of 15 wt % of sodium bicarbonate was used and injected into the heating cylinder on the extruder at an injection rate of 0.75 wt %, gasified and pyrolyzed to generate a foaming gas, and was able to derive articles in a form of a single-layered extruded sheet of ABS with an expansion factor of 8%.

Incidentally, the same process was carried out also with HIPS and PP and able to derive articles in a form of a single-layered extruded sheet with a foamed structure of each of the thermoplastic resins.

A similar extrusion process was carried out by replacing the water of 15 wt % of sodium bicarbonate with an aqueous solution of 25 wt % of potassium bicarbonate and at the same injection rate of 0.75 wt %, and was able to derive articles in a form of a single-layered extruded sheet with a foamed structure of each of the thermoplastic resins.

Embodiment 58

In the embodiment 58, the liquid foaming agent of the embodiment 52 was replaced with the water of 15 wt % of sodium bicarbonate. The vaporizer/generator unit 22 illustrated in FIG. 35 was heated externally at 300° C., the water of 15 wt % of sodium bicarbonate was injected continuously into it by means of the diaphragm pump 14, the solvent water evaporated and the sodium bicarbonate pyrolyzed to generate carbon dioxide and water vapor, and the thus generated foaming gas, with its pressure regulated by the pressure control valve 23 and its flowrate (injection volume) regulated by the flowrate control valve 26, was injected into the heating cylinder on the extruder to be dispersed finely and dissolved under pressure into the molten resin.

The thermoplastic resin provided with foaming properties by these processes was extruded through a die 149 to derive articles in a form of a single-layered extruded sheet with a foamed structure.

In the embodiment 58, in addition to the aforementioned ABS, the extrusion processes were carried out also by using HIPS and PP, and in the cases where the above mentioned liquid foaming agents were used, the results showed the expansion factor of 5%, and where PP was processed likewise, the expansion factor was 8%.

Incidentally, the injection rate of 15 wt % sodium bicarbonate water for each of thermoplastic resins was set at 0.75 wt %.

Extrusion processes were carried out by replacing the 15 wt % sodium bicarbonate water with an aqueous solution of 25 wt % potassium bicarbonate at the same injection rate of 0.75 wt % and able to derive articles in a form of a single-layered extruded sheet with a foamed structure of respective thermoplastic resins.

Embodiment 59

By using the device in FIG. 36, the water of 15 wt % sodium bicarbonate as well as an aqueous solution of 15 wt % citric acid were injected continuously into the vaporizer/generator unit 22 without heating it to make them undergo a chemical reaction to generate carbon dioxide; the automatic on-off valve 158 was opened; the injection pressure was regulated by using the pressure control valve 23; the rate of carbon dioxide injection into the heating cylinder was regulated by the flowrate control valve 26 while the gas injection into the ABS undergoing plasticization was proceeding as shown in FIG. 5 through the two locations to provide foaming properties to the resin. The thermoplastic resin thus provided with foaming properties was extruded through the die 149 to enable to derive articles in a form of a single-layered extruded sheet with a foamed structure of ABS presenting an expansion factor of around 2%.

However, since the carbon dioxide liquefies when the pressure is increased, the circuit starting from vaporizer/generator unit to the heating cylinder on the extruder is heated to a temperature higher than the critical temperature of carbon dioxide.

The liquid that remained (residual liquid) in the vaporizer/generator unit 22 that had completed the gas generation reaction was discharged regularly through the outlet port 156 for cleansing liquid, by closing the automatic on-off valve 158, by opening the automatic on-off valve 159 for introducing the cleansing liquid into the vaporizer/generator unit 22 and the automatic on-off valve 153 for discharging the cleansing liquid, and by introducing air through the inlet port 155 for cleansing liquid, so that the residual liquid was able to be discharged with the air pressure through the outlet port 156 for cleansing liquid.

In the case of extrusion molding process, because it was necessary to inject the foaming gas continuously into the heating cylinder on the extruder, when the discharge of the residual liquid was carried out, a device used separately and illustrated in FIG. 36 was made available separately.

The reactions between an aqueous solution of potassium bicarbonate, an aqueous solution of sodium carbonate or an aqueous solution of potassium carbonate and an around 3 wt % diluted acetic acid or aqueous solution of citric acid also produced the same results.

Incidentally, if the technique of the embodiment 58 is applied, other types of gas can also be used as a foaming gas, for example, carbon dioxide generated by filling the vaporizer/generator unit 22 with dry ice and pouring water onto it, acetylene generated by filling it with calcium carbide ($CaC_2$) instead of dry ice and pouring water onto it, hydrogen generated by filling it with a metal, for example, zinc (Zn), instead of dry ice, and making it contact with an acid (for example, diluted sulfuric acid) or an alkali (for example, aquatic solution of sodium hydroxide), or hydrogen generated by contact between sodium borohydride ($NaBH_3$) and an acid or by pyrolysis of the former.

Embodiment 60

While in the embodiment 58, carbon dioxide was generated to make a foaming gas without heating the vaporizer/generator unit 22, in the embodiment 59, the vaporizer/generator unit was heated to 180° C. simultaneously with the reaction, and thus the solvent water was also evaporated to be used as a foaming gas, and as a result of this measure, the expansion factor augmented from 2% to 7%.

The residues remaining in the vaporizer/generator unit 22 were eliminated by the same means and procedures as the embodiment 57.

Embodiment 61

In the embodiments 53-59, since foaming extended as far as the surface, in order to obtain clean appearance, multi-layered extrusion molding was practiced. In the embodiment 60, by making the surface PET without foaming, it was possible to obtain a foamed 3-layered sheet with clean surface having a three-layered structure comprising a non-foaming PET sheet, a foamed thermoplastic resin sheet of ABS and a non-foaming PET sheet.

Furthermore, in order to leave embossing patterns on the surface, a process of pressing a roller with an embossing pattern against the surface was carried out.

Embodiment 62

Since pressure-keeping is not used in the process of foam injection molding of a thermoplastic resin, it is possible to carry out the automatic gate disposal, by pushing the mounting portion of side gate (mounting gate 108 of the side with dimensions of 25 mm in length, 5 mm in width and 3 mm in thickness) into the molded article by a mechanical action with rod shaft 113 (gate 114 pushed into the molded article shown in FIG. 29), immediately after the mold cavity is filled with a thermoplastic resin provided with foaming properties. By adopting automatic gate disposal by this method, the number of processes for carrying out the troublesome gate disposal is reduced.

Since it is possible to carry out a molding process with a single wide and thick gate by applying the automatic gate disposal technique, and therefore it is possible to reduce the pressure of filling resin into the mold cavity, the molded articles with clean appearance, a higher expansion factor, a higher transcription performance and without weld lines can be obtained.

In the embodiment 61, the process of automatic gate disposal was carried out on the mold in the embodiments 1-44, and its effect was confirmed. (FIG. 29)

Embodiment 63

It was confirmed that in the embodiments 1-4, 25-28, 30 and 31, the manufacturing of foamed structural body by using thermoplastic elastomers was possible. The types of liquid foaming agents and the levels of injection rate were chosen to be the same as those for respective embodiments.

The thermoplastic elastomers used in the embodiments 63 were as follows: olefin-based elastomer {Sumitomo TEE3572 (trade name)}, styrene-based elastomer {Sumitomo TPE-SB2400 (trade name)}, polyester elastomer {PELPRENE P-30 (trade name)}, SEBS (hydrogenated SBS)-based elastomer {RABALON SJ4400 (trade name)}.

Furthermore, it was confirmed that the creation of molded articles with a high expansion factor was possible by applying such means as breathing and recession, and IGCP presented in embodiment 36, embodiment 37, embodiments 39-40, embodiment 42, embodiment 44, embodiment 46 and embodiment 48, and also that the creation of molded articles with clean appearance was possible by applying the OGCP also presented in these embodiments.

Embodiment 64

In embodiment 1, embodiment 2, embodiment 53 and embodiment 56, also in the case where pentane was used as a liquid foaming agent, the results like expansion factor were almost the same as those of these embodiments.

The injection volume of pentane in the case of injection molding in embodiment 1 and embodiment 2 was set at 14.4 mL. The injection rate of pentane in the case of extrusion molding in embodiment 53 and embodiment 56 was set at 3 wt %.

Embodiment 65

In embodiment 1, embodiment 2, embodiment 53 and embodiment 56, in the case where a mixed solution of 96 wt % of ethanol and 4 wt % of water (azeotropic mixture) was used as a liquid foaming agent, the results were almost the same as those of these embodiments.

The injection volume of mixed solution of 96 wt % of ethanol and 4 wt % of water in the case of injection molding in embodiment 1 and embodiment 2 was set at 9 mL. The injection rate of mixed solution of 96 wt % of ethanol and 4 wt % of water in the case of extrusion molding in embodiment 53 and embodiment 56 was set at 1.8 wt %.

Embodiment 66

In the embodiment 66, a polynuclear aromatic ester flame retardant {CR735 (trade name) of DAIHACHI CHEMICAL INDUSTRY} presenting a liquid state was used to provide flame retardant properties to foam molded articles.

In the embodiment 66, by using PC/ABS of the embodiment 5, two units of device for injecting a liquid foaming agent into the heating cylinder in FIG. 1 were used as shown in FIG. 38. In the embodiment 66, each of a liquid flame retardant CR735 and a 1:1 mixture of water and ethanol was filled separately into a cistern 1, and measured separately by the injector 5 and injected by it into the heating cylinder simultaneously with the start of resin measurement and stopped simultaneously with the end of resin measurement. Through these processes, the injection molding of a thermoplastic resin provided with foaming properties and containing a flame retardant was carried out by using the mold of the embodiment 1.

When a comparison was made, by setting afire the object articles, between a molded article of PC/ABS in the embodiment 5 and that of PC/ABS containing a flame retardant in the embodiment 65, the results clearly demonstrated that the article of PC/ABS containing a flame retardant in the embodiment 65 was difficult to ignite. Incidentally, a fluorine compound as an auxiliary flame retardant had been mixed into the ABS to be foamed and melted and kneaded in advance.

Moreover, the injection rate of CR735 was set at 5 wt % and that of the 1:1 mixture of water and ethanol was set at 0.5 wt %.

As the melting point of PX200 (trade name) of DAIHACHI CHEMICAL INDUSTRY, a flame retardant, is 96° C., it can be used as a liquid by either heating to liquefy it or dissolving it with an organic solvent. In the cases of other types of flame retardant also, they can be utilized if they are dissolvable in any one of liquid foaming agents useful for the present invention, for example an alcohol, an ether, or an aliphatic hydrocarbon, etc., and injectable into the heating cylinder on an injection molding machine by means of the device illustrated in FIG. 1.

Moreover, the liquid foaming agent of the present invention can be applied also to those resins made to present flame retardant properties (containing a flame retardant, provided with flame retardant properties).

Embodiment 67

Regarding the embodiment 66, examples of the case with injection molding were shown. In the embodiment 67, in the case with extrusion molding, two units of device for injecting a liquid foaming agent into the heating cylinder in FIG. 34 were used, as shown in FIG. 39.

In the embodiment 67, while, from one unit of injection device, a flame retardant instead of a liquid foaming agent is being injected into the heating cylinder on the extruder, a liquid foaming agent is injected into the heating cylinder from the other unit.

Figure 39:
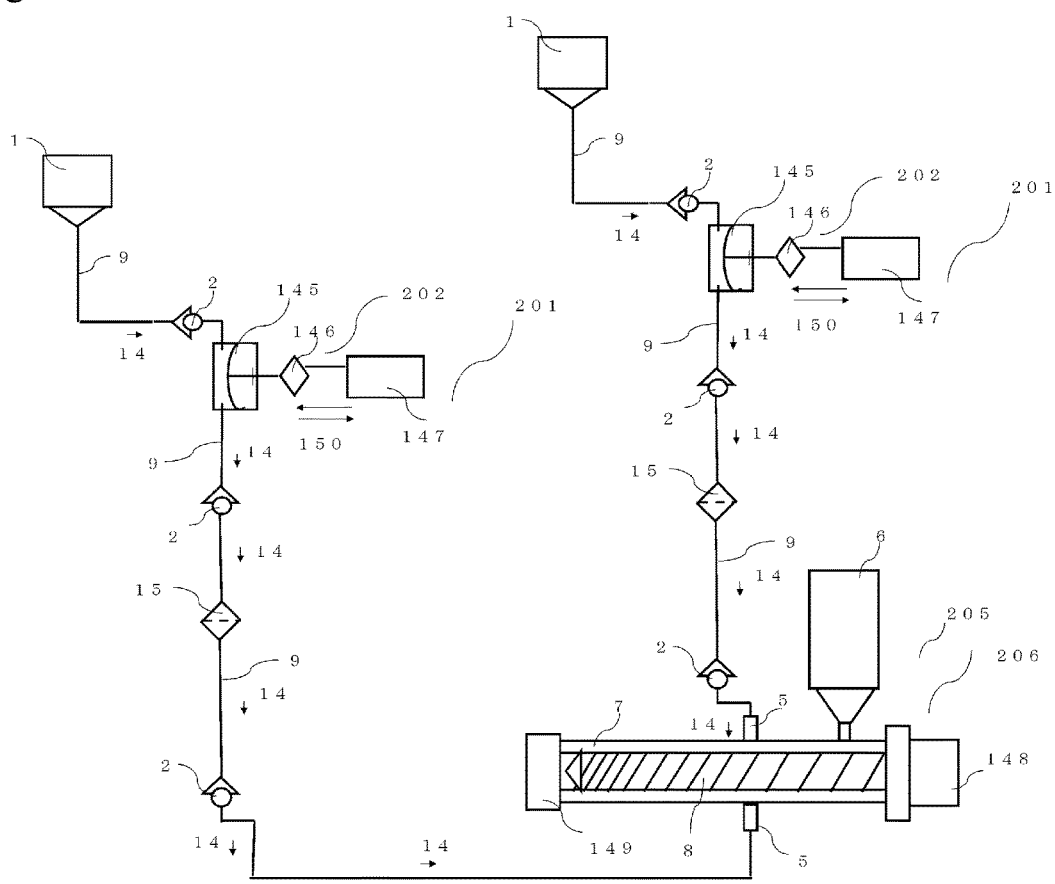
FIG. 39 is a schematic view of a device for manufacturing molded article.

FIG. 39 illustrates the case where two units of device of FIG. 34 for injecting a liquid foaming agent into the heating cylinder are used, but an extrusion molding process can be carried out also by other means where one unit of the liquid injection device of FIG. 39 is replaced with a gas injection device of FIG. 35 or 36 in order to inject a liquid foaming agent or a foaming gas into the molten thermoplastic resin undergoing plasticization in the heating cylinder on an extruder, with a view to providing foaming properties to the said molten thermoplastic resin.

In the embodiment 67, CR735 was injected at an injection rate of 5 wt % into the heating cylinder on an extruder by using the device of FIG. 39, and at the same time, a 15 wt % of sodium bicarbonate water was injected therein at a rate of 0.75 wt % by using the device of FIG. 39, and an extrusion process was carried out which resulted in deriving an article of PC/ABS containing a flame retardant.

When the molded article was set afire for combustion, the obtained result showed that the article containing a flame retardant was difficult to ignite. Incidentally, a fluorine compound as an auxiliary flame retardant had been mixed into the PC/ABS to be foamed and melted and kneaded in advance.

Embodiment 68

Those resins of the embodiments 1-32, i.e., ABS, HIPS or m-PPE, and the like provided with foaming properties were let out of the nozzle of an injection molding machine and poured into the mold cavity of the lower cast 161 (having 100 mm in length, 500 mm in width, and 50 mm in height) and left as they were until cooling and solidification were completed to derive an article of block molding with a foamed layer.

As the aforementioned article of block molding was created simply by pouring a molten resin into an open mold without a cap (lower cast 161 only was used) and therefore without compression, the foaming action progressed freely, the resin was inflated and did not make a block (cuboid) with a clean shape, in the next step, the upper cast 160 was put in place to compress the resin and apply a pressure to it, and the molded article was taken out after cooling and solidification, and a cubic block 100 mm long, 50 mm wide and 50 mm deep was obtained.

It was confirmed that it was possible to manufacture with ease a foamed block also by using TPE of the embodiment 63.

Embodiment 69

What is denoted by "block molding" mentioned in the present invention is a means to obtain a molded article by: mixing a resin (for example in a state of bulk, pellet, powder, etc.) with a liquid foaming agent; filling the mixture into a cast; heating it; at least either vaporizing or pyrolyzing the liquid foaming agent within the cast.

Figure 37:
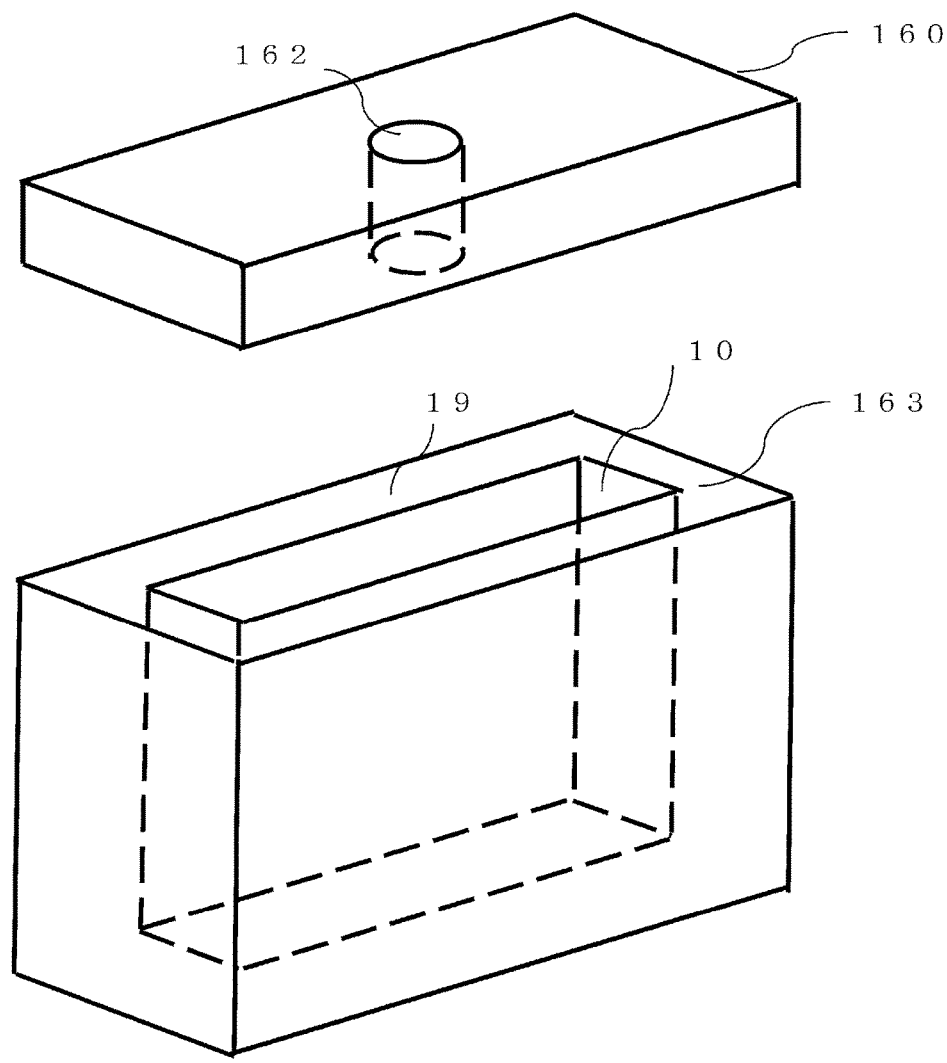
FIG. 37 is a schematic view of the mold for cast molding and block molding.

A powder of ABS was mixed with 3 wt % IPA, the mixture was filled into the mold cavity 10 as shown in FIG. 37, the mold cavity was covered with the upper mold 160, the whole unit of mold was heated to a temperature of 300° C. to melt the ABS and vaporize the IPA, the resin was made to foam by the vapor of IPA, and the excess foaming resin due to the expanded volume leaked out of the vent 162.

In this way, a foam molded article of ABS with an expansion factor of about 8% was manufactured. Instead of the aforementioned IPA, a 15 wt % sodium bicarbonate water was mixed at a rate of 0.5 wt % with ABS, the mixture was similarly heated to melt ABS and evaporate solvent water and pyrolyze sodium bicarbonate, the derived steam and gas caused foaming of the resin and enabled to produce foam-molded articles with an expansion factor of about 8% almost similar to the case with IPA. (FIG. 37)

Embodiment 70

For the purpose of cleansing the inside of heating cylinder on an extruder or an injection molding machine, purging (cleansing) agents [for example ASACLIN, Z-CLEAN (respectively trade names)] are normally used. In the embodiment 70, it is shown that the liquid foaming agent of the present invention is a useful means for that purpose.

As ordinary cleansing agents, a mixture of a surface-active agent represented by sodium alkylbenzene sulfonate (in order to distinguish it from ABS resin, abbreviated as "ABS-Na" in the present invention) and AS containing glass fiber (GF), PC containing glass fiber, high density polyethylene (HDPE), PP, or acryl (PMMA) is used. In certain cases where a higher cleansing efficiency is desired, a chemical foaming agent like ADCA is used, but there have been concerns about residues of ADCA remaining in the heating cylinder.

Since the liquid foaming agent of the present invention like, water, an alcohol, an ether, or an emulsion of water and an organic solvent like pentane does not leave residues from foaming, it can be used instead of ADCA, and combined with AS or PC containing more than 10 wt % of glass fiber, along with HDPE, PP, acryl, etc., it can serve as the main ingredient of a cleansing material and provide a high cleansing capacity.

In an ordinary application, such substances as AS, HDPE, ABS-Na as a surface-active agent, foaming agent, etc. are mixed to make up a pelletized cleansing material, but if simply the pellets of AS and those of HDPE are mixed, the composition can be modified easily, and moreover the pelletizing expenses can also be saved, and the overall process becomes economical.

A cleansing material having AS containing a 40 wt % of glass fiber as a main ingredient of the material was filled into the heating cylinder and made to constitute a cleansing material by using a liquid foaming agent of the embodiment 3 consisting of water and methanol during the plasticization phase.

In another application, the main ingredient of cleansing material in a form of mixed resin pellets was prepared by mixing 50 parts of AS containing 40 wt % glass fiber and 50 parts of Novatech HB330 (trade name). A cleansing process was carried out by injecting into it the liquid foaming agent of the embodiment 3 at an injection rate of 0.5 wt %.

Another cleansing process was carried out by using a liquid foaming agent in a form of emulsion consisting of a 1:1 mixture of water and pentane mixed with 1 wt % of ABS-Na. In this case if there are concerns as to the residues of ABS-Na in the heating cylinder, the problem can be solved, with a view to washing down the residues of ABS-Na, by repeating another cleansing operation by using water as the liquid foaming agent in the embodiment 1 or a mixed solution of water and an alcohol in the embodiment 3, etc., that produce no residue at all.

Embodiment 71

In the embodiment 71, water, liquid used in the embodiment 1, was replaced with an aqueous solution of 50 wt % citric acid. Other conditions like injection condition were made to be the same with those in respective embodiments. However, as the decomposition temperature of an organic acid like citric acid is high, the resin temperature was raised to a high value of 285° C. In the result, the derived molded articles 110 had an expansion factor of around 7% and the variation of weight was less than 0.5%. Moreover, the molded articles 110 were manufactured by replacing the aqueous solution of 50 wt % citric acid with an aqueous solution of 15 wt % tartaric acid. In this case also, the obtained results were almost identical to those of the case where sodium bicarbonate water was used. Moreover, it was also possible to use an aqueous solution of potassium sodium tartrate as a liquid foaming agent.

Embodiment 72

In the embodiment 72, two units of device for injecting a liquid foaming agent into the heating cylinder in the device illustrated in FIG. 1 were used. The entire system is shown in FIG. 38.

The cistern of each of the two units of device for injecting a liquid foaming agent into the heating cylinder as illustrated in FIG. 38 was filled with an aqueous solution of sodium bicarbonate with a concentration of 9.5 wt % at the liquid temperature of 25° C., or an aqueous solution of sodium dihydrogen carbonate with a concentration of 20 wt % at the liquid temperature of 25° C.

The injection of a liquid foaming agent into the heating cylinder of injection molding machine was effected by injecting each one of the aqueous solutions separately into the heating cylinder as illustrated in FIG. 6. The resin used was ABS. The injection volume rate measured by the weight of molded article was 1 wt % for the aqueous solution of 9.5 wt % sodium bicarbonate and 0.05 wt % for the aqueous solution of 20 wt % sodium dihydrogen carbonate. The injection was made by the method by which the liquids were injected into the ABS in the process of melting and kneading in the heating cylinder (the resin temperature of molten ABS undergoing plasticization process was 250° C.) and the respective types of foaming agent were mixed in the heating cylinder. The molding was carried out by making use of processes for molded articles of the embodiment 1. The expansion factor was 6%.

Incidentally, although it is not illustrated, the device of FIG. 1 is designed so that it may be able to be heated to prevent the molten substances like sodium bicarbonate from recrystallizing.

Molding was carried out also with HIPS and m-PPE instead of ABS, and the results similar to the case of ABS were obtained.

It was confirmed that sodium dihydrogen carbonate reacted on a foam-nucleating agent and generated foaming cells finer than those generated by an aqueous solution of sodium bicarbonate alone. The mixing ratio between sodium bicarbonate and sodium dihydrogen citrate is approximately in a range 100:20-1 and the optimum is around 100:5.

Incidentally, the liquid foaming agents in the present embodiment 72 can be utilized also in the extrusion molding.

Embodiment 73

As the aqueous solution of sodium bicarbonate and the aqueous solution of sodium dihydrogen citrate react when they are mixed together, they cannot be stored in a mixed state. In the embodiment 73, the respective aqueous solutions were injected into the heating cylinder through separate fill ports as illustrated in FIG. 6.

In the embodiment 73, as illustrated in FIG. 5, the respective liquid foaming agents (aqueous solutions) were mixed together just before the fill port and then injected. In the result, similarly as the embodiment 72, molded articles of ABS, HIPS, m-PPE with an expansion factor of 6% were obtained.

Incidentally, the liquid foaming agents in the present embodiment 73 can be utilized also in the extrusion molding.

Embodiment 74

In the embodiment 74, the aqueous solution of 9.5 wt % sodium bicarbonate used in the embodiment 72 and the embodiment 73 was replaced with an aqueous solution of 30 wt % potassium bicarbonate. The results with respect to state of foaming, size of foamed cells, expansion factor, etc. were almost similar to those in the embodiment 72 and the embodiment 73.

Embodiment 75

In the embodiment 75, the 20 wt % sodium dihydrogen citrate used in embodiment 72, embodiment 73 and embodiment 74 was replaced with a 20 wt % potassium dihydrogen citrate. The results with respect to state of foaming, size of foamed cells, expansion factor, etc. were almost similar to those in the embodiments 72-74.

Embodiment 76

In the embodiment 76, the aqueous solution of sodium bicarbonate and the aqueous solution of potassium bicarbonate used in the embodiments 72-75 were replaced with ethanol, diethyl ether, an aqueous solution of 40 vol % ethanol, and an aqueous solution of 60 vol % diethyl ether.

In the result, it was confirmed that, in comparison with the cases where ethanol, diethyl ether, an aqueous solution of 40 vol % ethanol or an aqueous solution of 60 vol % diethyl ether was used alone, the foamed cells were finer, and that both sodium dihydrogen citrate and potassium dihydrogen citrate reacted as foam-nucleating agents even in the cases where agents other than the aqueous solution of sodium bicarbonate were used.

Embodiment 77

In the embodiment 77, an aqueous solution of 20 wt % sodium dihydrogen citrate was used instead of water as a liquid foaming agent in the embodiment 1. The injection rate of the aqueous solution of 20 wt % sodium dihydrogen citrate was set at 4 ml. The expansion factor of obtained molded articles was 6%, and as a consequence of the action of sodium dihydrogen citrate as a foam-nucleating agent, derived foamed cells were finer than those of the embodiment 1.

Embodiment 78

In the embodiment 78, instead of the aqueous solution of 20 wt % sodium dihydrogen citrate in the embodiment 77, an aqueous solution of 20 wt % potassium dihydrogen citrate was used. The expansion factor of obtained molded articles was 6% similarly as in the embodiment 77, and the fine foamed cells were confirmed as in the case of sodium dihydrogen citrate. It was confirmed that 20 wt % potassium dihydrogen citrate reacts as a foam-nucleating agent as in the case of 20 wt % sodium dihydrogen citrate.

Embodiment 79

In the embodiment 79, the effectiveness of the method for manufacturing lenses as presented in the 14th form of embodiment is confirmed.

With respect to the mold, a mold for a diffraction grating of 1,200 lines/mm was created from PROVA400 (trade name) selected as a material for mold making by means of a diamond cutter. The dimensions of a molded article by using this mold are 25 mm×25 mm×2 mm, and the dimensions of a diffraction grating are 10 mm×10 mm.

(Solid molded article)

A solid molded article as a reference case was molded by injecting PC into the above-mentioned mold cavity.

(Foam-molded article)

Firstly, the inside of the above-mentioned mold was pressurized (OGCP) by the air at a pressure of 1 MPa, and at the same time, ethanol was injected into the molten PC in the heating cylinder at a rate of 1.5 wt %. Subsequently, the thermoplastic resin, PC, provided with foaming properties by dispersing ethanol in the heating cylinder was injected into the mold cavity, and the mold cavity air was blown out upon completion of the injection of the foaming thermoplastic resin, and a molded article was obtained. The set values for injection parameters were as follows. Temperature of molten resin, PC: 285° C. Injection speed: 50% of the maximum injection pressure speed available on the injection molding machine. Injection pressure: 50% of the maximum injection pressure available on the injection molding machine. Pressure keeping: at 35% of the maximum injection pressure, for 5 seconds.

(Verification of mold transcription performance)

The performance of transcription conforming to the mold was verified by focusing a red laser pointer beam (wave length=635 nm–690 nm) on each one of molded articles, in order to verify visually the resolution of the diffraction grating in a simplified manner. In the result, the improvement in the mold transcription performance was observed with molded articles made by using OGCP in comparison with solid molded articles.

Incidentally, with the manufacturing method in the present embodiment 79, the molded articles were also produced by replacing ethanol with diethyl ether. With respect to such articles also, an improvement in the transcription performance was observed.

(Verification of other aspects)

In the manufacturing method relating to the present embodiment 79, three types of molded articles were produced by selecting the gas used for OGCP technique from among nitrogen gas alone, carbon dioxide gas alone, or mixed gas of nitrogen and carbon dioxide. These three types of molded articles and the above-mentioned solid molded article were compared for the above-mentioned mold transcription performance by the said method of verification. In the result, with all the foam molded articles, the improvement in transcription performance was observed in comparison with the solid molded articles. Incidentally, the difference in transcription performance due to the different types of gas used in OGCP was not observed.

Moreover, in the manufacturing method relating to the present embodiment 79, molded articles processed from four different types of resins, i.e., AS, PMMA, APEL, ZEONEX, were compared for the above-mentioned mold transcription performance by the said method of verification. With the foam molded articles from any type of resin among them, the improvement in transcription performance was observed in comparison with the solid molded articles.

Embodiment 80

Because the mold surface temperature in the embodiment 1 was 40° C. and the water in the liquid foaming agent condensed on the mold surface, the mold surface temperature was raised to 120° C., and consequently the condensation of water on the surface of mold cavity disappeared.

When the mold surface temperature in the embodiments 2-10 as well was raised to 80° C. or 120° C., although a little bit of water condensation was observed on the mold surface at 80° C., the condensation of ethanol disappeared. At 120° C., no condensation of either water or ethanol was observed.

Since diethyl ether, product with a low boiling point, was used as a liquid foaming agent in the embodiment 10, the condensation of diethyl ether on the mold surface did not occur even when the mold surface temperature was at 40° C. As just described, the condensation of a liquid foaming agent on the surface of the mold cavity was able to be coped with by raising the mold temperature.

It was confirmed that the condensation did not occur if the mold surface temperature was raised above the boiling point of a liquid foaming agent to be used.

The above described embodiments and forms of embodiment have been exemplified only for the purpose of presentation, and hence the present invention is not restricted to them and they are susceptible to modifications or additions, as long as these changes in no way contradict the technical concepts of the present invention that can be construed by the parties concerned from the scope of patent claims, detailed description of the invention and illustrated drawings.

INDUSTRIAL APPLICABILITY

The invention can be applied to manufacturing of foam molded articles of thermoplastic resins or thermosetting resins.

DESCRIPTION OF THE REFERENCE NUMERALS

1: cistern, 2: check valve, 3: driving device, 4: liquid injection device, 5: fill port (valve), 6: hopper, 7: heating cylinder, 8: screw, 9: ductwork, 10: mold cavity, 11: syringe (cylinder), 12: plunger (pumping element), 13: plunger ring, 14: flow direction of a liquid foaming agent, 15: filter, 16: shut-off nozzle, 17: mold on the mobile side (movable type), 18: mold on the stationary side (fixed type), 19: PL (parting or parting-line), 20: mold, 21: direction of plunger action, 22: vaporizer/generator, 23: pressure control valve (regulator), 24: pressure gauge before injection, 25: pressure gauge during injection, 26: flowrate control valve, 27: injection of at least either liquid foaming agent or foaming gas, 28: passageway of at least either liquid foaming agent or foaming gas, 29: inner core, 30: outer hollow cylinder, 31: fixing nut for fixing object to heating cylinder, 32: heat-resistant sheet to preventing leakage, 33: mechanical agitation, 34: air-bubble agitation, 35: inert gas like air or nitrogen gas, 36: foam (bubble), 37: upper embedded bolt for fixing inner core 29, 38: lower embedded bolt for fixing inner core 29, 39: clearance, 40: core body, 41: seat of ball check-valve, 42: ball check-valve, 43: retainer of ball check-valve, 44: clearance through which at least either liquid foaming agent or foaming gas is injected to heating cylinder, 45: seat of cylindrical valve (outer hollow cylinder), 46: cylindrical valve, 47: cylindrical valve (extreme end of advance of cylindrical valve), 48: retainer of cylindrical valve, 49: lock volt of cylindrical valve, 50: groove of passageway of at least either liquid foaming agent or foaming gas, 51: cylindrical valve operating by the spring 52, 52: spring pushing down the cylindrical valve 51, 53: rod shaft for fixing spring pushing down cylindrical valve 51 (connecting with cylindrical valve 51), 54: movement of cylindrical valve 51, 55: slide valve, 56: part to be slid to right and left for opening and closing valve, 57: nozzle, 58: spider (functioning also as joint connecting nozzle 57 to barrel head 62 of injection molding machine), 59: needle, 60: lever (arm), 61: driving device of lever and needle, 62: barrel head of injection molding machine, 63: slide type on-off valve, 64: flow passage of resin, 65: joint connecting nozzle 57 to barrel head 62 of injection molding machine, 66: movement of the slide type on-off valve 63, 67: rod shaft holding spring for driving needle of 66 (fixed on nozzle 57), 68: rod shaft holding spring for driving needle 59 (connected to the needle 59), 69: O-ring of spool bush, 70: O-ring between the mold plate on the stationary side and the mounting plate, 71: O-ring in PL, 72: O-ring between mold plate on mobile side and ejector box, 73: O-ring between ejector box and mounting plate, 74: O-ring between ejector plate 75 and mounting plate on mobile side 77, 75: ejector plate, 76: inlet holes ejector rod, 77: mounting plate on mobile side, 78: ejector box, 79: structure of sealing ejector pin by O-ring (not utilized in the present invention), 80: mold plate on stationary side, 81: mounting plate on stationary side, 82: spool bush, 83: ejector pin, 84: entry or exit port of pressurization gas into ejector box 78 (details are shown as 100 in FIG. 24, FIG. 25), 85: entry or exit port of pressurization gas into mold cavity (details are shown as 100 in FIG. 24, FIG. 25), 86: solenoid valve for injecting pressurization gas into mold cavity and ejector box, 87: blow-out [discharging to atmosphere (venting)] valve for pressurized gas within mold cavity and ejector box, 88: manometer for pressurization gas, 89: pressurization gas compressed by compressor etc., 90: pressurization gas discharged to atmosphere, 91: connecting port for pressurization gas into mold cavity 10 and into ejector box 78, 92: flow of pressurization gas, 93: flexible hose, 94: ductwork of pressurization gas, 95: circuit of entry and exit of pressurization gas, 96: pressurization gas circuit of PL, 97: pressurization gas circuit (gas groove), 98: pressurization gas vent (circuit of entry and exit of pressurization gas), 99: guide post, 100: inlet port of pressurized gas (inlet port for connecting with OGCP device), 101: spool, 102: opening/closing gate (driven by hydraulic cylinder, pneumatic air cylinder or electric motor etc., to open and close passageway into dummy shape), 103: driving device of opening/closing gate, 104: gate, 105: passageway for foaming resin filled into mold cavity (opened after mold cavity is filled with resin, to lower pressure of resin filled into mold cavity for facilitating foaming), 106: dummy shape, 107: movement of the opening/closing gate 102, 108: side gate (mounting gate) mounted on the molded article with dimensions of 25 mm in length, 5 mm in width and 3 mm in thickness, 109: runner, 110: article: molded article with dimensions of 200 mm×300 mm×8 mm, 111: concave groove having baffle plate shape (cross section) with dimensions of 35 mm in length, 2 mm in width and 6 mm in depth, 112: movement of portion of mounted gate 109 pushed into molded article by advancing rod shaft 113 after mold cavity is filled with resin, 113: rod shaft, 114: gate pushed into molded article, 115: rod shaft at advanced position, 116: details of C section and description of automatic gate disposal technique, 117: portion of rectangle of 160 mm by 50 mm that can recede for distance of 8 mm (breathing), 118: portion of rectangle of 160 mm by 50 mm after receded for distance of 8 mm (breathing tool), 119: recession (moving core, floating core), 120: gas cylinder of the nitrogen gas, 121: manometer for measuring pressure in the gas cylinder of nitrogen gas 120, 123: manually-operated opening/closing valve, 124: manometer for nitrogen gas after pressure regulation, 126: manometer for intermediate stage of compression, 127: gas booster of two-stage compression type, 128: receiver tank to store compressed high pressure nitrogen gas, 129: manometer of pressure in the receiver tank, 130: high-pressure regulator, 131: manually-operated valve for drainage, 132: manometer for IGCP: injection pressure of the compressed nitrogen gas, 133: automatic valve for injection, 134: automatic valve for discharging gas to atmosphere, 135: direction of the flow of IGCP, 136: direction of the flow of drain from receiver tank, 137: discharging of gas to atmosphere from IGCP, 138: usages of high pressure gas (1: gas injection into the mold (blow molding), 2: for GPM, 3: for IGCP, 4: for injection into heating cylinder (MuCell etc.)), 139: return gas of 1, 2, 3 among usages 138 of high pressure gas, 140: gas-pin (inlet-outlet port for high pressure gas) (in case of GPM, by installing boss and letting gas burst out on boss to make high pressure gas act on molten resin provided with foaming properties in PL and in mold), 141: rib with dimensions of 5 mm in height and 1.5 mm in thickness for preventing gas leakage, 142: flow direction of at least either evaporated liquid foaming agent or foaming gas, 143: spring for driving needle, 144: molded article: molded article with dimensions 200 mm×300 mm×18 mm resulting after mold recession, 145: diaphragm pump, 146: connecting rod, 147: electric motor, 148: extrusion unit, 149: die, 150: movement of connecting rod 146 by which rotational motion of electric motor 147 is converted to reciprocating linear motion, 151: flow direction of foaming gas generated by chemical reaction or flow direction of mixture of foaming gas generated by chemical reaction and foaming gas resulting from evaporation due to heating, 152: injection unit, 153: automatic on-off valve for discarding cleansing liquid, 154: ductwork for cleansing liquid, 155: inlet port for cleansing liquid, 156: outlet port for cleansing liquid, 157: flow direction of cleansing liquid, 158: automatic on-off valve, 159: automatic on-off valve for filling cleansing liquid into vaporizer/generator unit 22, 160: upper mold (cast), 161: lower mold (cast), 162: vent, 201: device for manufacturing molded articles, 202: measuring device, 203: injection device, 204: injection molding machine, 205: extrusion device, 206: extruder

The invention claimed is:

1. A method for manufacturing molded article, comprising:
 a step of kneading a molten resin in a heating cylinder which houses a screw for kneading;
 a step of measuring a predetermined volume of a liquid, the liquid having a vaporization temperature lower than a temperature of the molten resin in the heating cylinder;

a step of injecting the predetermined volume of the liquid into the molten resin in the heating cylinder during the step of kneading the molten resin;

a vaporization step of vaporizing the liquid injected into the molten resin in the heating cylinder; and a step of injecting the molten resin containing the vaporized liquid into a mold cavity, or pouring the molten resin containing the vaporized liquid into a cast, or extruding the molten resin containing the vaporized liquid through a die.

2. The method for manufacturing molded article according to claim 1, wherein:

the liquid contains a substance having a pyrolysis temperature lower than the temperature of the molten resin in the heating cylinder; and the method further comprises:

a step of pyrolyzing the substance injected into the molten resin in the heating cylinder to generate a gas in the heating cylinder.

3. The method for manufacturing molded article according to claim 1, wherein:

the liquid is a substance which presents a state of the liquid with a pressure of 1 atm and at a temperature of 20° C.

4. A method for manufacturing molded article, comprising:

a step of kneading a molten resin in the heating cylinder which houses a screw for kneading;

a step of measuring a predetermined volume of a first liquid and a predetermined volume of a second liquid, the first liquid containing a hydrogen carbonate or a carbonate, the second liquid containing an organic acid;

a step of injecting separately the predetermined volume of the first liquid and the predetermined volume of the second liquid into the molten resin in the heating cylinder during the step of kneading the molten resin;

a step of causing a reaction in the heating cylinder between the first liquid and the second liquid both injected into the molten resin in the heating cylinder to generate a gas; and a step of injecting the molten resin containing the gas into a mold cavity, or pouring the molten resin containing the gas into a cast, or extruding the molten resin containing the gas through a die.

5. A method for manufacturing molded article, comprising:

a step of kneading a molten resin in the heating cylinder which houses a screw for kneading;

a step of measuring a predetermined volume of a liquid, the liquid having a vaporization temperature lower than a temperature of a molten resin in a heating cylinder;

a step of injecting the predetermined volume of the liquid into a vaporizer;

a vaporization step of vaporizing the liquid injected into the vaporizer in the vaporizer;

a step of injecting the vaporized liquid into the molten resin in the heating cylinder during the step of kneading the molten resin; and a step of injecting the molten resin containing the vaporized liquid into a mold cavity, or pouring the molten resin containing the vaporized liquid into a cast, or extruding the molten resin containing the vaporized liquid through a die.

6. The method for manufacturing molded article according to claim 5, wherein:

the liquid contains a substance having a pyrolysis temperature lower than a temperature of the vaporizer; and the method further comprises:

a step of pyrolyzing the substance injected into the vaporizer to generate a gas in the vaporizer.

7. The method for manufacturing molded article according to claim 5, wherein:

the liquid is a substance which presents a state of the liquid with a pressure of 1 atm and at a temperature of 20° C.

8. A method for manufacturing molded article, comprising:

a step of kneading a molten resin in the heating cylinder which houses a screw for kneading;

a step of measuring a predetermined volume of a first liquid and a predetermined volume of a second liquid, the first liquid containing a hydrogen carbonate or a carbonate, the second liquid containing an organic acid;

a step of injecting separately the predetermined volume of the first liquid and the predetermined volume of the second liquid into a vaporizer during the step of kneading the molten resin;

a step of causing a reaction in the vaporizer between the first liquid and the second liquid both injected into the vaporizer to generate a gas;

a step of injecting the gas into a molten resin in a heating cylinder; and a step of injecting the molten resin containing the gas into a mold cavity, or pouring the molten resin containing the gas into a cast, or extruding the molten resin containing the gas through a die.

* * * * *